(12) United States Patent
Barker et al.

(10) Patent No.: US 10,417,533 B2
(45) Date of Patent: Sep. 17, 2019

(54) SELECTION OF BALANCED-PROBE SITES FOR 3-D ALIGNMENT ALGORITHMS

(71) Applicant: Cognex Corporation, Natick, MA (US)

(72) Inventors: Simon Barker, Sudbury, MA (US); Drew Hoelscher, Somerville, MA (US)

(73) Assignee: Cognex Corporation, Natick, MA (US)

( * ) Notice: Subject to any disclaimer, the term of this patent is extended or adjusted under 35 U.S.C. 154(b) by 245 days.

(21) Appl. No.: 15/232,766

(22) Filed: Aug. 9, 2016

(65) Prior Publication Data

US 2018/0046885 A1 Feb. 15, 2018

(51) Int. Cl.
*G06K 9/66* (2006.01)
*G06T 7/66* (2017.01)
(Continued)

(52) U.S. Cl.
CPC .............. *G06K 9/66* (2013.01); *G06K 9/481* (2013.01); *G06K 9/6226* (2013.01); *G06T 7/66* (2017.01); *G06T 7/75* (2017.01); *G06T 7/77* (2017.01); *G06T 2207/10028* (2013.01); *G06T 2207/20076* (2013.01); *G06T 2207/20081* (2013.01)

(58) Field of Classification Search
CPC ........... G06T 7/62; G06T 7/75; G06K 9/6201; G06K 9/66
See application file for complete search history.

(56) References Cited

U.S. PATENT DOCUMENTS 6,765,570 B1 * 7/2004 Cheung ................... G06T 15/08
345/420
7,016,539 B1 * 3/2006 Silver ..................... G06K 9/481
382/216
(Continued)

FOREIGN PATENT DOCUMENTS

EP 1193642 A1 4/2002

OTHER PUBLICATIONS

Michael E. Weiser et al. "Projection model snakes for tracking using a Monte Carlo approach"; Journal of Electronic Imaging vol. 13, No. 2, pp. 384-398, published in Apr. 2004; XP001196026.*
(Continued)

*Primary Examiner* — Chan S Park
*Assistant Examiner* — Mai H Tran
(74) *Attorney, Agent, or Firm* — Wolf, Greenfield & Sacks, P.C.

(57) ABSTRACT

Techniques include systems, computerized methods, and computer readable media for choosing placement of three-dimensional (3D) probes used for evaluating a 3D alignment pose of a runtime 3D image inside a 3D alignment system for estimating the pose of a trained 3D model image in that 3D runtime image. A plurality of features associated with a first plurality of points of interest from a 3D image are generated, wherein each feature includes data indicative of 3D properties of an associated point from the plurality of points of interest. A second plurality of points of interest are selected from among the first plurality of points of interest, based at least in part on the plurality of features associated with the first plurality of points of interest. Placements of a plurality of 3D probes are determined based at least in part on the second plurality of points of interest.

39 Claims, 48 Drawing Sheets
(35 of 48 Drawing Sheet(s) Filed in Color)

(51) Int. Cl.
*G06T 7/77* (2017.01)
*G06K 9/48* (2006.01)
*G06K 9/62* (2006.01)
*G06T 7/73* (2017.01)

(56) References Cited

U.S. PATENT DOCUMENTS

| | | | | |
|---|---|---|---|---|
| 8,259,998 | B2* | 9/2012 | Okugi | G06K 9/00791 |
| | | | | 382/103 |
| 8,705,846 | B2* | 4/2014 | Ishigami | G06T 7/55 |
| | | | | 382/154 |
| 2007/0086658 | A1* | 4/2007 | Kido | G06K 9/4604 |
| | | | | 382/199 |
| 2009/0310828 | A1* | 12/2009 | Kakadiaris | G06K 9/00208 |
| | | | | 382/118 |
| 2010/0079741 | A1* | 4/2010 | Kraehmer | G03F 7/70308 |
| | | | | 355/71 |
| 2010/0259537 | A1* | 10/2010 | Ben-Himane | G06K 9/46 |
| | | | | 345/419 |
| 2010/0298705 | A1* | 11/2010 | Pelissier | A61B 8/0833 |
| | | | | 600/443 |
| 2011/0205338 | A1* | 8/2011 | Choi | G06T 7/74 |
| | | | | 348/46 |
| 2013/0187919 | A1* | 7/2013 | Medioni | G06T 17/00 |
| | | | | 345/420 |
| 2014/0043329 | A1* | 2/2014 | Wang | G06T 17/20 |
| | | | | 345/420 |
| 2014/0105506 | A1* | 4/2014 | Drost | G06K 9/00201 |
| | | | | 382/199 |
| 2014/0267623 | A1* | 9/2014 | Bridges | G01S 17/003 |
| | | | | 348/46 |
| 2014/0285619 | A1* | 9/2014 | Acquavella | G06T 19/20 |
| | | | | 348/43 |
| 2015/0130906 | A1* | 5/2015 | Bridges | G01B 21/047 |
| | | | | 348/46 |
| 2015/0213617 | A1* | 7/2015 | Kim | G06K 9/00798 |
| | | | | 382/103 |
| 2016/0055268 | A1* | 2/2016 | Bell | G06F 17/5004 |
| | | | | 703/1 |
| 2016/0216107 | A1* | 7/2016 | Barker | G06T 7/73 |
| 2017/0164848 | A1* | 6/2017 | Nadeau | A61B 5/0008 |
| 2017/0243352 | A1* | 8/2017 | Kutliroff | G06T 7/10 |
| 2018/0046885 | A1* | 2/2018 | Barker | G06T 7/75 |
| 2018/0150974 | A1* | 5/2018 | Abe | G06T 7/60 |

OTHER PUBLICATIONS

Behrens, A. and Röllinger, H., "Analysis of Feature Point Distributions for Fast Image Mosaicking Algorithms," Acta Polytechnica Journal of Advanced Engineering, vol. 50, No. 4, pp. 12-18 (Jan. 2010) (8 pages).

Extended European Search Report issued by the European Patent Office for European Patent Application No. 16152487.1 dated Jun. 24, 2016 (12 pages).

Nistér, D., et al., "Visual Odometry for Ground Vehicle Applications," Journal of Field Robotics, vol. 23, No. 1, pp. 3-20 (2006).

* cited by examiner

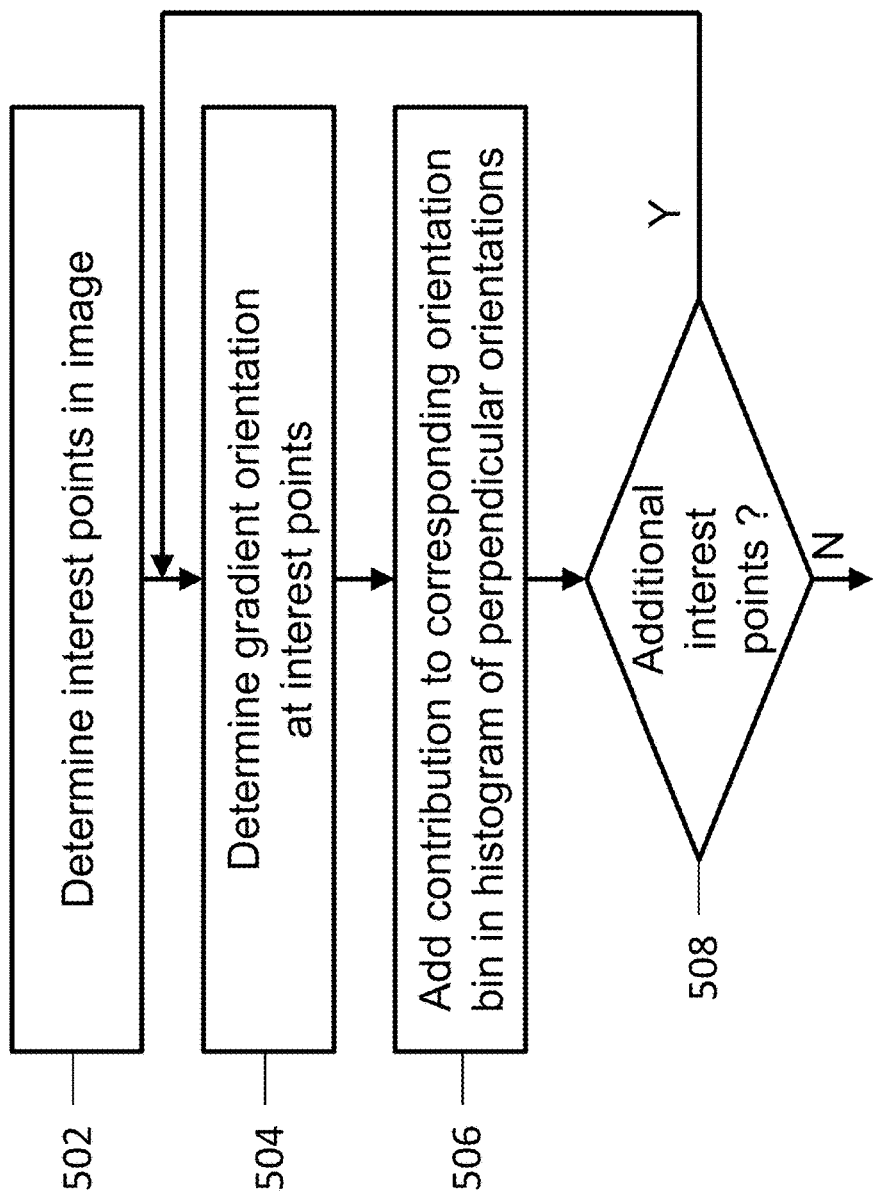

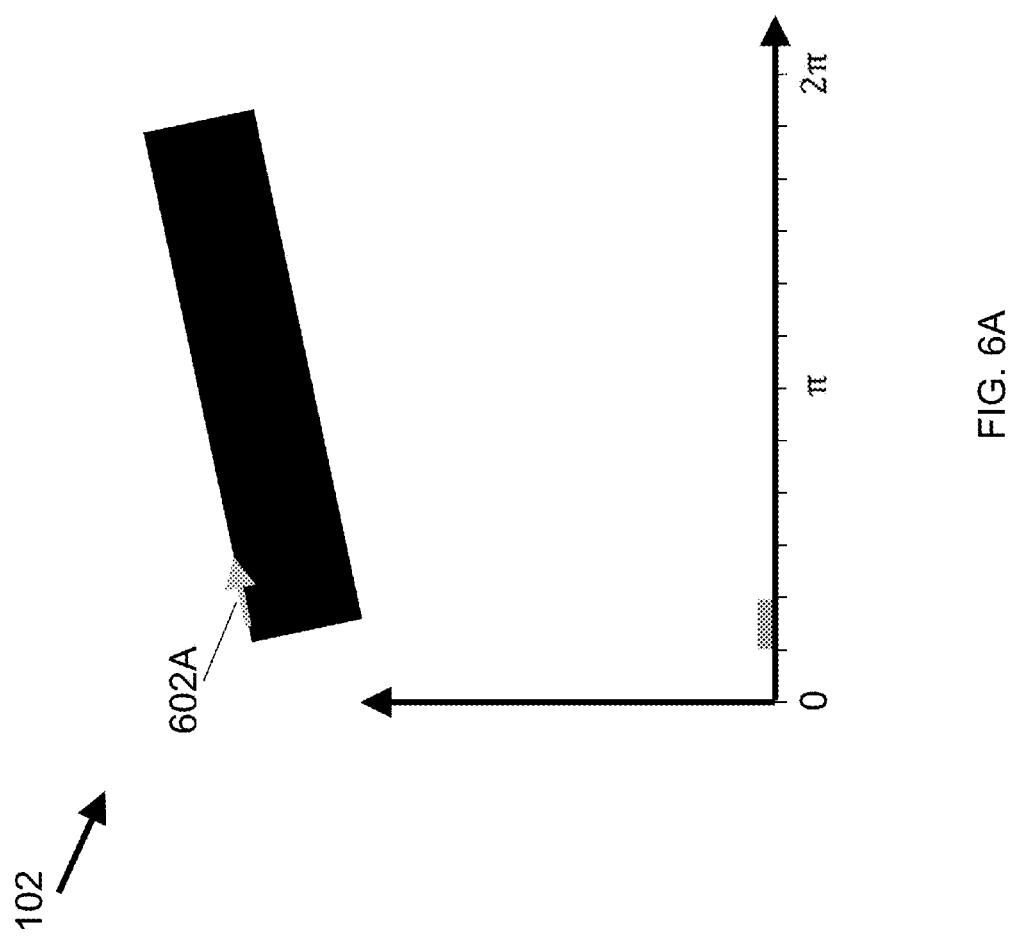

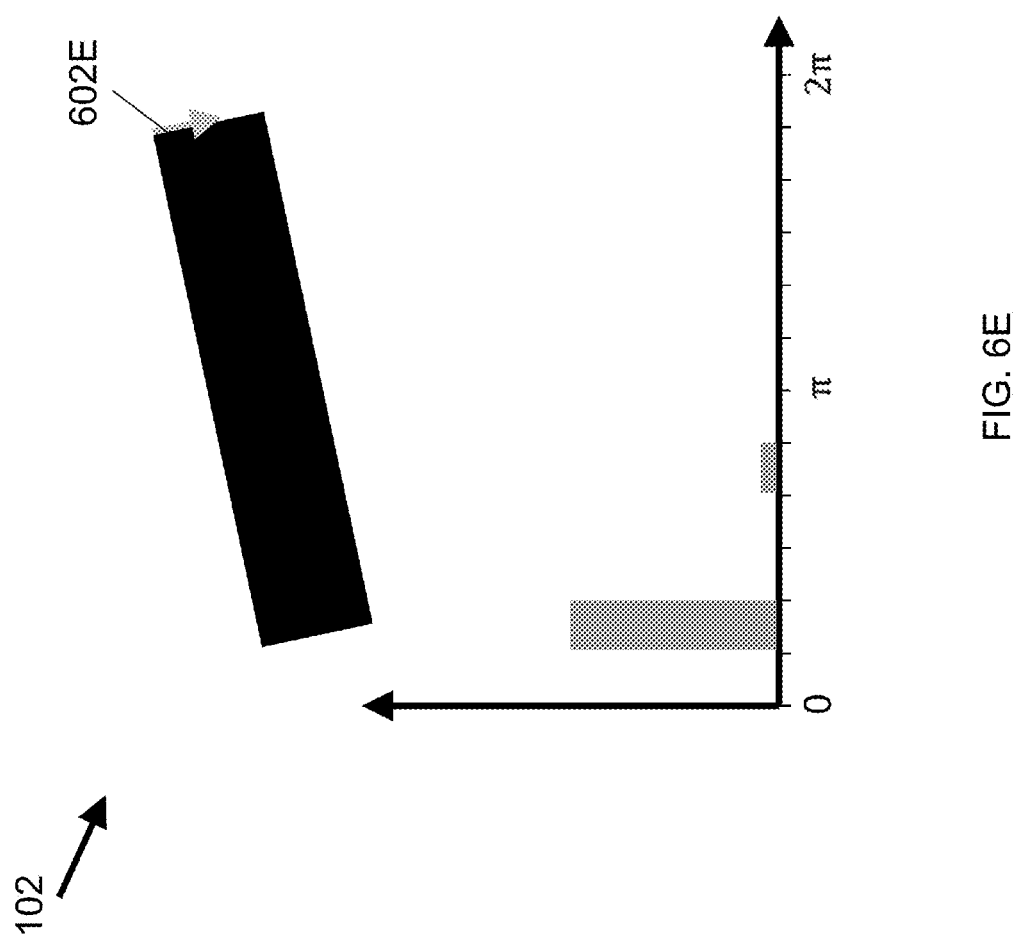

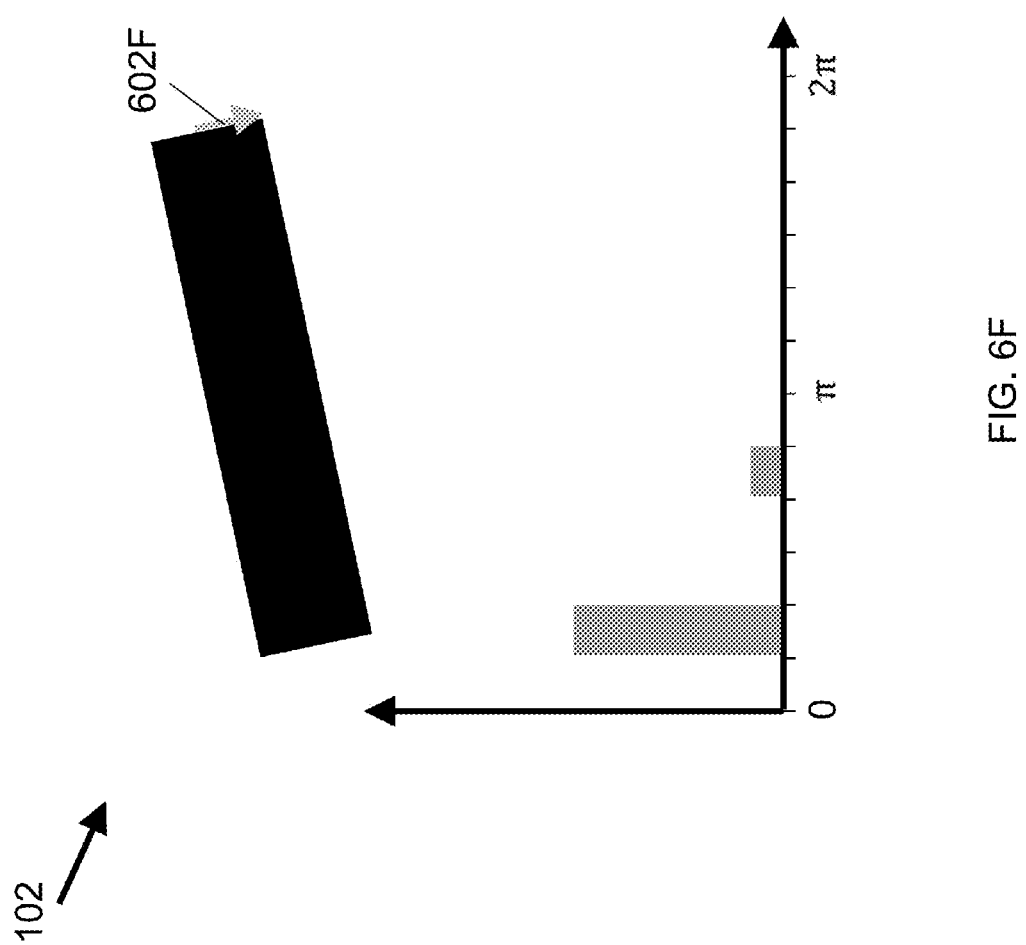

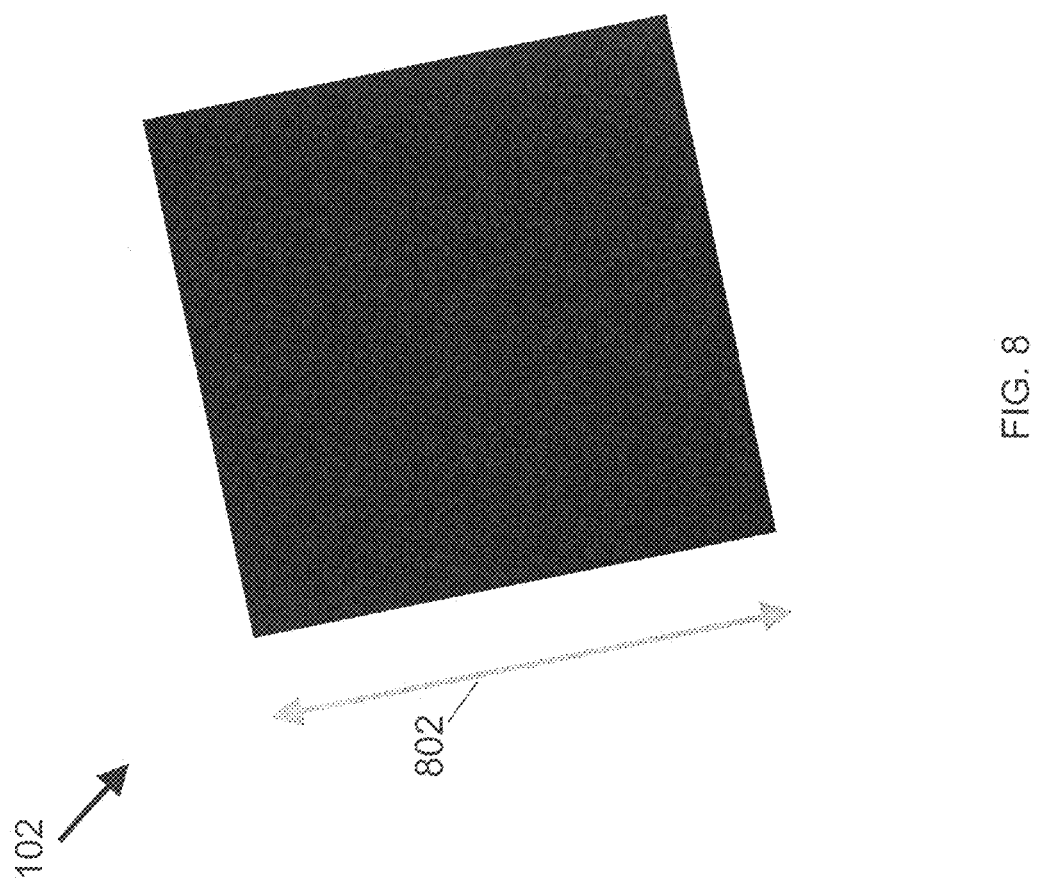

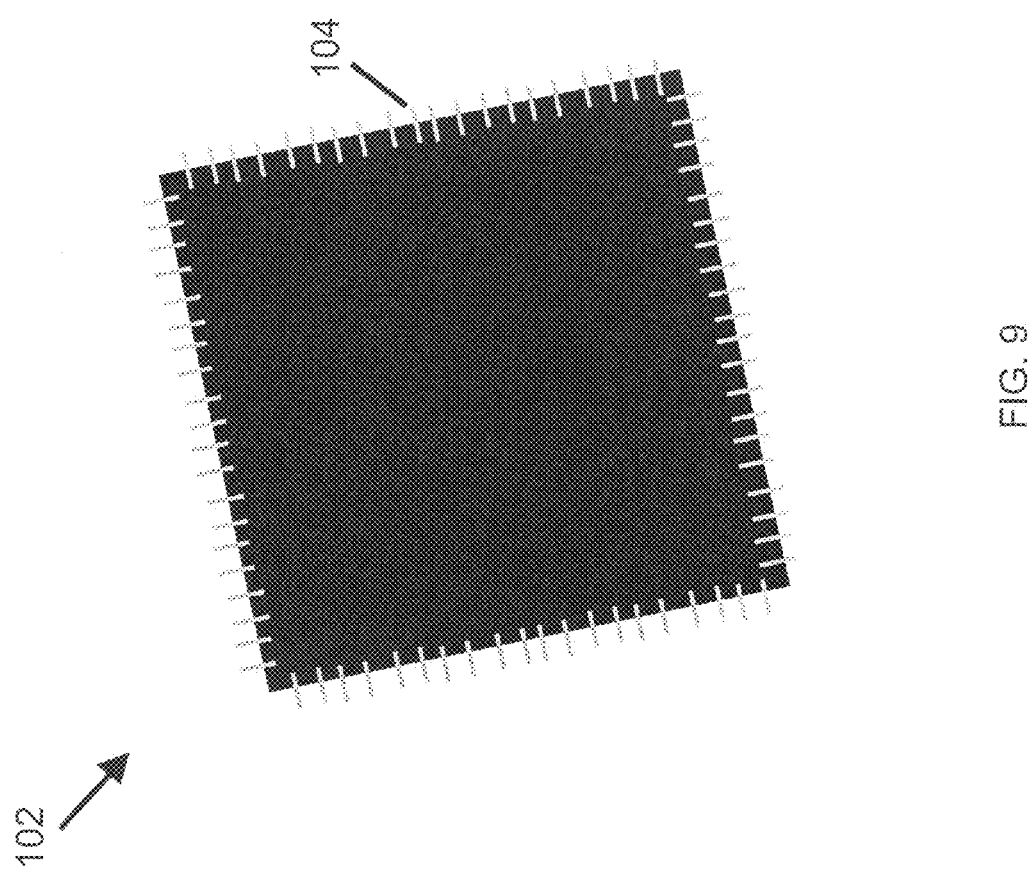

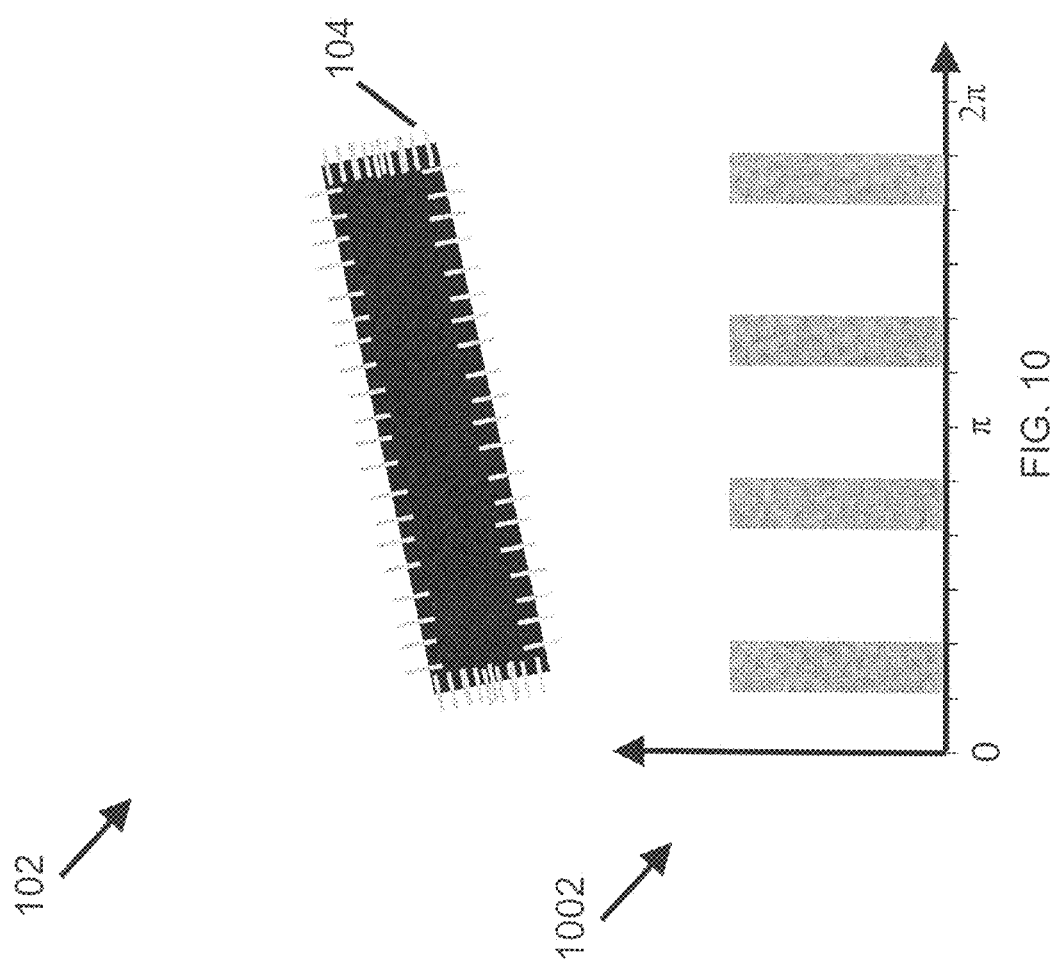

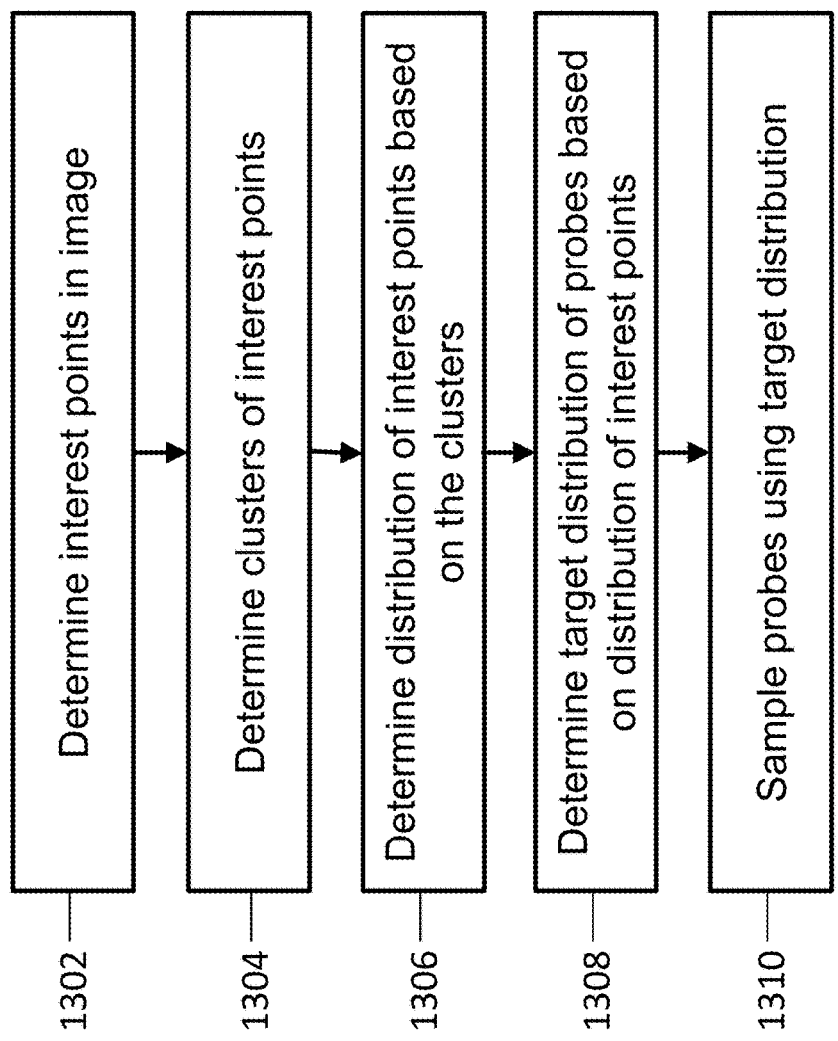

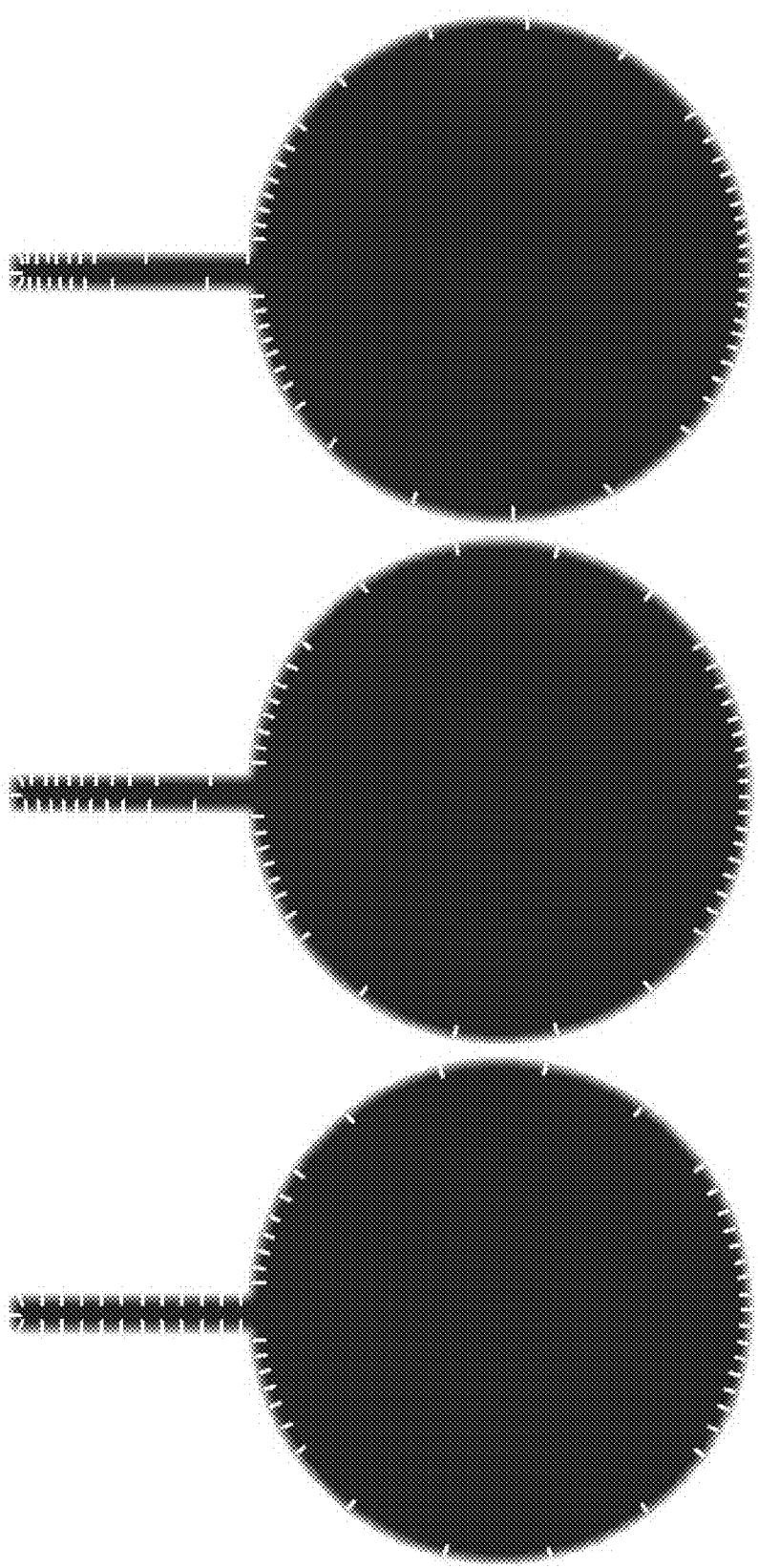

SELECTION OF BALANCED-PROBE SITES FOR 3-D ALIGNMENT ALGORITHMS

TECHNICAL FIELD

Disclosed apparatus, systems, and methods relate to placing probes on an image of a pattern for image processing applications.

BACKGROUND

Digital images are formed by many devices and used for many practical purposes. Devices include cameras with image sensors operating on visible or infrared light, such as a charge-coupled device (CCD) image sensor or a complementary metal-oxide-semiconductor (CMOS) image sensor, line-scan sensors, flying spot scanners, electron microscopes, X-ray devices including computed tomography (CT) scanners, magnetic resonance imagers, and other devices known to those skilled in the art. Practical applications are found in industrial automation, medical diagnosis, satellite imaging for a variety of military, civilian, and scientific purposes, photographic processing, surveillance and traffic monitoring, document processing, and many others.

To serve these applications, the images formed by the various devices are analyzed by machine vision systems to extract appropriate information. One form of analysis that is of considerable practical importance is determining the position, orientation, and size of patterns in an image that correspond to objects in the field of view of the imaging device. Pattern detection methods are of particular importance in industrial automation, where they are used to guide robots and other automation equipment in semiconductor manufacturing, electronics assembly, pharmaceuticals, food processing, consumer goods manufacturing, and many others.

In some cases, pattern detection methods can model patterns using one or more probes. A probe can refer to a position in an image at which the pattern detection methods examine a gradient vector of the image. Therefore, each probe can be associated with a position vector and an orientation vector. Since probes can effectively indicate the position and orientation of a pattern in an image, a machine vision system can use the probes to align the position and orientation of patterns.

SUMMARY

Some embodiments include a system for choosing placement of three-dimensional (3D) probes used for evaluating a 3D alignment pose of a runtime 3D image inside a 3D alignment system for estimating the pose of a trained 3D model image in that 3D runtime image. The system includes a processor in communication with a memory, wherein the processor is configured to run a computer program stored in the memory that is configured to: generate a plurality of features associated with a first plurality of points of interest from a 3D image, wherein each feature comprises data indicative of 3D properties of an associated point from the plurality of points of interest; select a second plurality of points of interest from among the first plurality of points of interest, based at least in part on the plurality of features associated with the first plurality of points of interest; and determine placements of a plurality of 3D probes based at least in part on the second plurality of points of interest.

In some embodiments, each of the plurality of features incorporates at least one measure of usefulness of an associated point from among the first plurality of points for alignment in at least one translational degree of freedom. In some embodiments, each of the plurality of features incorporates at least one measure of usefulness of an associated point from among the first plurality of points for alignment in at least one rotational degree of freedom. In some embodiments, the placement of the plurality of 3D probes provides an increase in ensemble alignment ability in at least one less represented translational degree of freedom provided by a placement on each of the first plurality of points of interest. In some embodiments, the placement of the plurality of 3D probes provides an increase in ensemble alignment ability in at least one less represented translational degree of freedom and in a less represented rotational degree of freedom provided by a placement on each of the first plurality of points of interest. In some embodiments, the placement of the plurality of 3D probes provides an increase in ensemble alignment ability in at least one less represented rotational degree of freedom provided by placement on each of the first plurality of points of interest. In some embodiments, the processor is further configured to: determine a center of rotation that minimizes a sum of rotational moments of the plurality of features; and determine a first, second, and third axis of rotation that minimizes the sum of rotational moments of the plurality of features.

In some embodiments, a center of rotation and rotational axes that fit a subset of the first plurality of points are determined such that the center of rotation and rotational axes are associated with rotationally symmetric features of a pattern. In some embodiments, finding the center of rotation and rotational axes from a subset of the first plurality of points comprises using a RANSAC technique. In some embodiments, finding the center of rotation and rotational axes from a subset of the first plurality of points comprises using a Monte Carlo technique. In some embodiments, the plurality of features includes a plurality of surface normal vectors. In some embodiments, the plurality of features includes a plurality of edge proximity vectors. In some embodiments, the plurality of features includes a plurality of edge direction vectors. In some embodiments, the plurality of features includes a plurality of surface curvature vectors.

In some embodiments, selecting a second plurality of points of interest from among the first plurality of points of interest based at least in part on the plurality of features associated with the first plurality of points of interest comprises: fitting a probability distribution to the first plurality of points; determining a target distribution, wherein the target distribution is indicative of a desired placement of the probes on one or more of the interest points; determining placements of probes at least in part by utilizing the relative probabilities of the fitted distribution and target distribution at proposed probe sites. In some embodiments, determining the interest point distribution comprises fitting the plurality of interest points to a probability distribution comprising a mixture model, wherein the probability distribution is indicative of at least a distribution of orientations measured at the plurality of interest points. In some embodiments, the processor is further configured to determine a number of components of the mixture model of the interest point distribution by clustering the plurality of interest points into at least one cluster. In some embodiments, the processor is further configured to: identify one or more horizon points from the first plurality of interest points; and remove from consideration the one or more horizon points such that the second plurality of interest points does not comprise the one or more horizon points. In some embodiments, selecting the second plurality of points of interest comprises using a Monte Carlo technique.

Some embodiments include a method for choosing placement of three-dimensional (3D) probes used for evaluating a 3D alignment pose of a runtime 3D image inside a 3D alignment system for estimating the pose of a trained 3D model image in that 3D runtime image. The method includes: generating a plurality of features associated with a first plurality of points of interest from a 3D image, wherein each feature comprises data indicative of 3D properties of an associated point from the plurality of points of interest; selecting a second plurality of points of interest from among the first plurality of points of interest, based at least in part on the plurality of features associated with the first plurality of points of interest; and determining placements of a plurality of 3D probes based at least in part on the second plurality of points of interest.

In some embodiments, each of the plurality of features incorporates at least one measure of usefulness of an associated point from among the first plurality of points for alignment in at least one translational degree of freedom. In some embodiments, each of the plurality of features incorporates at least one measure of usefulness of an associated point from among the first plurality of points for alignment in at least one rotational degree of freedom. In some embodiments, the placement of the plurality of 3D probes provides an increase in ensemble alignment ability in at least one less represented translational degree of freedom provided by a placement on each of the first plurality of points of interest. In some embodiments, the placement of the plurality of 3D probes provides an increase in ensemble alignment ability in at least one less represented translational degree of freedom and in a less represented rotational degree of freedom provided by a placement on each of the first plurality of points of interest.

In some embodiments, the placement of the plurality of 3D probes provides an increase in ensemble alignment ability in at least one of the less represented rotational degrees of freedom provided by placement on each of the first plurality of points of interest. In some embodiments, a center of rotation is determined such that the sum of rotational moments of the plurality of features is minimized; and first, second, and third axes of rotation are determined such that the sum of rotational moments of the plurality of features is minimized. In some embodiments, a center of rotation and rotational axes that fit a subset of the first plurality of points are determined such that the center of rotation and rotational axes are associated with rotationally symmetric features of a pattern. In some embodiments, finding the center of rotation and rotational axes from a subset of the first plurality of points comprises using a RANSAC technique. In some embodiments, finding a center of rotation and rotational axes from a subset of the first plurality of points comprises using a Monte Carlo technique In some embodiments, the plurality of features includes a plurality of surface normal vectors. In some embodiments, the plurality of features includes a plurality of edge proximity vectors. In some embodiments, the plurality of features includes a plurality of edge direction vectors. In some embodiments, the plurality of features includes a plurality of surface curvature vectors.

In some embodiments, selecting a second plurality of points of interest from among the first plurality of points of interest based at least in part on the plurality of features associated with the first plurality of points of interest comprises: fitting a probability distribution to the first plurality of points; determining a target distribution, wherein the target distribution is indicative of a desired placement of the probes on one or more of the interest points; determining placements of probes at least in part by utilizing the relative probabilities of the fitted distribution and target distribution at proposed probe sites. In some embodiments, determining the interest point distribution comprises fitting the plurality of interest points to a probability distribution comprising a mixture model, wherein the probability distribution is indicative of at least a distribution of orientations measured at the plurality of interest points. In some embodiments, the method further comprises determining a number of components of the mixture model of the interest point distribution by clustering the plurality of interest points into at least one cluster. In some embodiments, the method further comprises: identifying one or more horizon points from the first plurality of interest points; and removing from consideration the one or more horizon points such that the second plurality of interest points does not comprise the one or more horizon points. In some embodiments, selecting the second plurality of points of interest comprises using a Monte Carlo technique.

Some embodiments include a non-transitory computer readable medium has executable instructions associated with a system for choosing placement of three-dimensional (3D) probes used for evaluating a 3D alignment pose of a runtime 3D image inside a 3D alignment system for estimating the pose of a trained 3D model image in that 3D runtime image. The executable instructions are operable to cause the system to: generate a plurality of features associated with a first plurality of points of interest from a 3D image, wherein each feature comprises data indicative of 3D properties of an associated point from the plurality of points of interest; select a second plurality of points of interest from among the first plurality of points of interest, based at least in part on the plurality of features associated with the first plurality of points of interest; and determine placements of a plurality of 3D probes based at least in part on the second plurality of points of interest.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objects, features, and advantages of the disclosed subject matter can be more fully appreciated with reference to the following detailed description of the disclosed subject matter when considered in connection with the following drawings, in which like reference numerals identify like elements.

FIG. 5 illustrates a process for determining a histogram of perpendicular orientations for interest points of an image in accordance with some embodiments.

FIGS. 6A-6H illustrate a process for generating a histogram of perpendicular orientations in accordance with some embodiments.

FIG. 8 illustrates scaling of act lengths associated with interest points of a 2D image in accordance with some embodiments.

FIG. 9 illustrates uniform placement of probes on scaled interest points in accordance with some embodiments.

FIG. 10 illustrates reverse scaling of scaled arc lengths associated with interest points in accordance with some embodiments.

FIG. 13 summarizes a process of sampling probes in accordance with some embodiments.

FIGS. 17A-17C illustrate how the representation of the rotational variable θ changes the probe placement in accordance with some embodiments.

DETAILED DESCRIPTION

Figure 1:
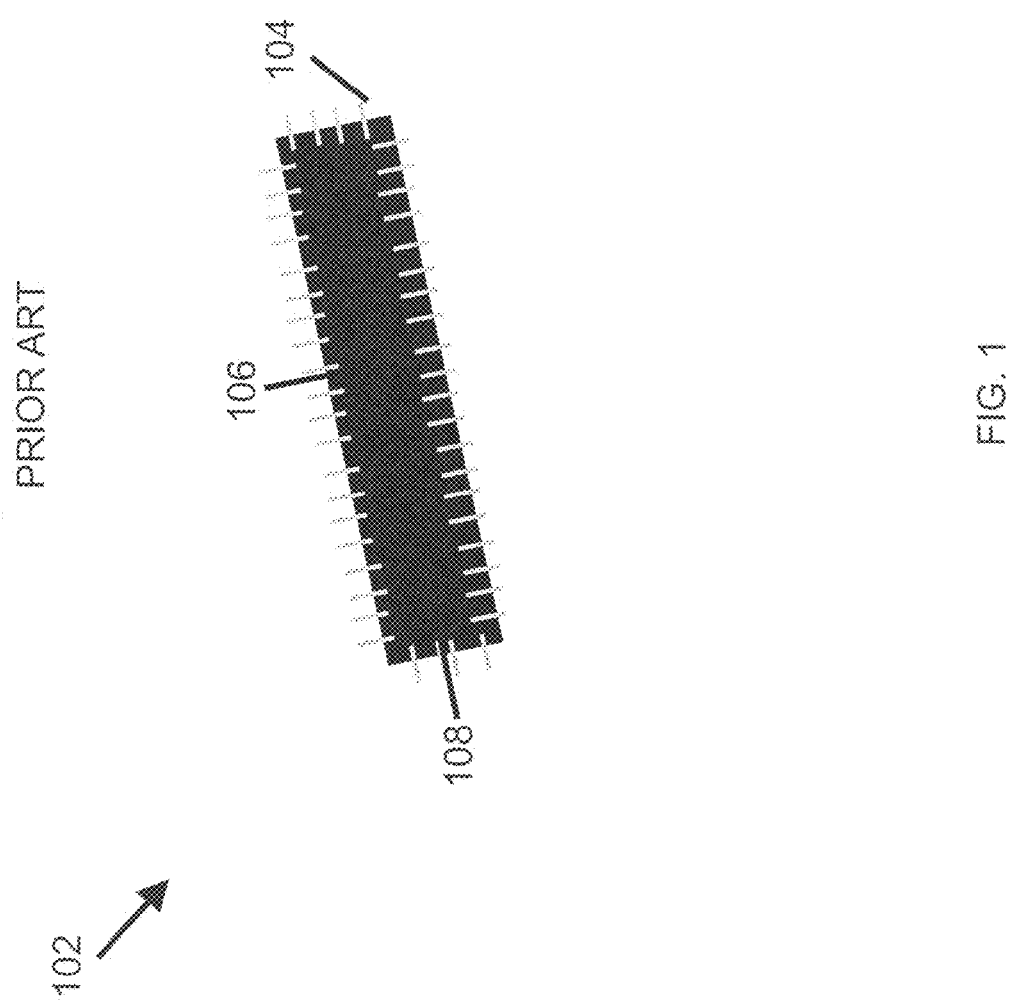
FIG. 1 illustrates a 2D pattern having an elongated rectangular shape and the probes placed uniformly on the pattern.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The specification is generally organized in the following manner. The specification begins by describing exemplary embodiments that generally relate to two-dimensional images. Some exemplary two-dimensional techniques are explained, for example, in U.S. patent application Ser. No. 14/603,969, entitled "Probe Placement for Image Processing," filed on Jan. 23, 2015, the contents of which are hereby incorporated by reference herein in its entirety. The specification then describes exemplary embodiments that generally relate to three-dimensional images. Although the first portion generally relates to exemplary embodiments involving two-dimensional images and the second portion generally relates to exemplary embodiments involving three-dimensional images, the skilled artisan will appreciate that the disclosure in one portion can be applicable to the disclosure in the other portion and vice versa. Additionally, the skilled artisan will appreciate that some exemplary embodiments rely on the teachings of both portions. For example, in some exemplary embodiments, systems and methods use both two-dimensional images and three-dimensional images. Additionally, the skilled artisan will appreciate that teachings from first portion that are also applicable to the 3D case are not necessarily repeated in full in the second section to avoid unnecessary repetition and vice versa. In other words, although the specification is generally divided into the two-dimensional and the three-dimensional case for organizational purposes and for ease of comprehension, this organization is not intended to limit the scope of the disclosure.

The following introduces exemplary explanations of terms, according to one or more embodiments. These explanations are not intended to be limiting.

Object—Any physical or simulated object, or portion thereof, having characteristics that can be measured by an image forming device or simulated by a data processing device.

Image—A 2D image is a two-dimensional function whose values correspond to physical characteristics of an object, such as brightness (radiant energy, reflected or otherwise), color, temperature, height above a reference plane (e.g., range image), etc., and measured by any image-forming device, or whose values correspond to simulated characteristics of an object, and generated by any data processing device. A 3D image can, for example, be represented as a range image or as a point cloud. A point cloud is a collection of 3D points in space where each point i can be represented as ($x_i$, $y_i$, $z_i$).

Boundary—An imaginary contour, open-ended or closed, straight or curved, smooth or sharp, along which a discontinuity of image brightness occurs at a specified granularity, the direction of said discontinuity being normal to the boundary at each point.

Gradient—A vector at a given point in an image giving the direction and magnitude of greatest change in brightness at a specified granularity at said point.

Pattern—A specific geometric arrangement of contours lying in a bounded subset of the plane of the contours, said contours representing the boundaries of an idealized image of an object to be located and/or inspected. A 3D pattern can, for example, be represented as a arrangement of contours in a range image or as a point cloud.

Model—A set of data encoding characteristics of a pattern to be found for use by a pattern finding method.

Training—A process of creating a model from an image of an example object or from a geometric description of an object or a pattern.

A machine vision system can be configured to determine the absence or presence of one or more instances of a predetermined pattern in an image, and determine the location of each found instance. The process of locating patterns in a 2D image occurs within a multidimensional space that can include, but is not limited to, x-y position (also called translation), orientation, and size. For a 3D image, location can, for example, include x-y-z position (also called translation), tilt and rotation (also called roll, pitch, and yaw).

To determine the absence or presence of one or more instances of a predetermined pattern in an image, a machine vision system can represent the pattern to be found using a model. The machine vision system can generate a model for a pattern from one or more training images or one or more synthesized images from a geometric description that contain examples of the pattern to be located and/or inspected. Once the model is available, the machine vision system can compare the model to a test image at each of an appropriate set of poses, compute a match score at each pose, and determine candidate poses that correspond to a local maximum in match score. The machine vision system can consider candidate poses whose match scores are above a suitable threshold to be instances of the pattern in the image.

A model can include a set of data elements called probes. Each probe represent a relative position at which certain measurements and tests are to be made in an image at a given pose, each such test contributing evidence that the pattern exists at the associated pose. A probe can be placed in a manner substantially perpendicular to a structure (e.g., boundary) of the underlying pattern.

During the training stage, existing machine vision systems place the probes on the boundary of a 2D pattern in a uniform manner. For example, a machine vision system places probes on the pattern boundary so that the distance between adjacent probes is roughly identical for all pairs of adjacent probes. This strategy, which is herein referred to as a "uniform placement strategy," can be effective in modeling patterns with a balanced orientation profile (e.g., a 2D pattern with a boundary that points to a large number of orientations and the proportions of the boundary pointing to various orientations are similar). For example, the uniform placement strategy has been useful in modeling square patterns because the number of probes pointing to different orientations (e.g., up, down, left, and right) is roughly the same on each edge of the pattern in the 2D image, which can lead to accurate information on the location and orientation of the 2D pattern.

Unfortunately, a uniform placement strategy is often ineffective in modeling patterns with an unbalanced orientation profile (e.g., patterns with varying side lengths). For example, the uniform placement strategy is generally not as effective in aligning 2D patterns with an elongated rectangular shape. FIG. 1 illustrates a 2D pattern having an elongated rectangular shape and the probes placed uniformly on the pattern. Because the boundary 102 has an elongated rectangular shape, under the uniform placement strategy, most of the probes 104 would be placed on the long edge 106 of the boundary and only a small number of probes 104 would be placed on the short edge 108 of the boundary. Because the number of probes along the short edge 108 of the boundary is small, it is difficult to determine, based on the probes, whether the short edge 108 exists. Furthermore, even if it is possible to determine that the short edge 108 exists, it is difficult to pin-point to the location of the short edge 108 because the number of probes 104 encoding the location of the short edge 108 is small. This can be problematic, for example, for aligning the boundary 102 horizontally with other 2D patterns.

There has been an effort to vary the distance between adjacent probes to address issues associated with the uniform placement strategy. However, the effort was limited to manual adjustment of probe locations, which can be labor intensive and expensive.

The techniques described herein provide for an automated probe placement module for placing probes on a pattern (both 2D and 3D patterns). The probe placement module is configured to place probes on interest points of an image so that the probes can accurately represent a pattern depicted in the image. The probe placement module can be configured to place the probes so that the probes can extract balanced information on all degrees of freedom associated with the pattern's movement, which improves the accuracy of the model generated from the probes. For example, when an object associated with the pattern is known to move in two dimensions (e.g., translational motion), the probe placement module can place the probes so that the probes can extract balanced information in the two dimensions (assuming a 2D pattern and image). The probe placement module can also take into account the shape of the pattern so that the probes can extract balanced information regardless of the shape of the pattern. This is in contrast to techniques that extract unbalanced information, such as extracting more vertical information compared to horizontal information when more probes are placed along the long edge compared to the short edge as shown in FIG. 1.

Figure 2:
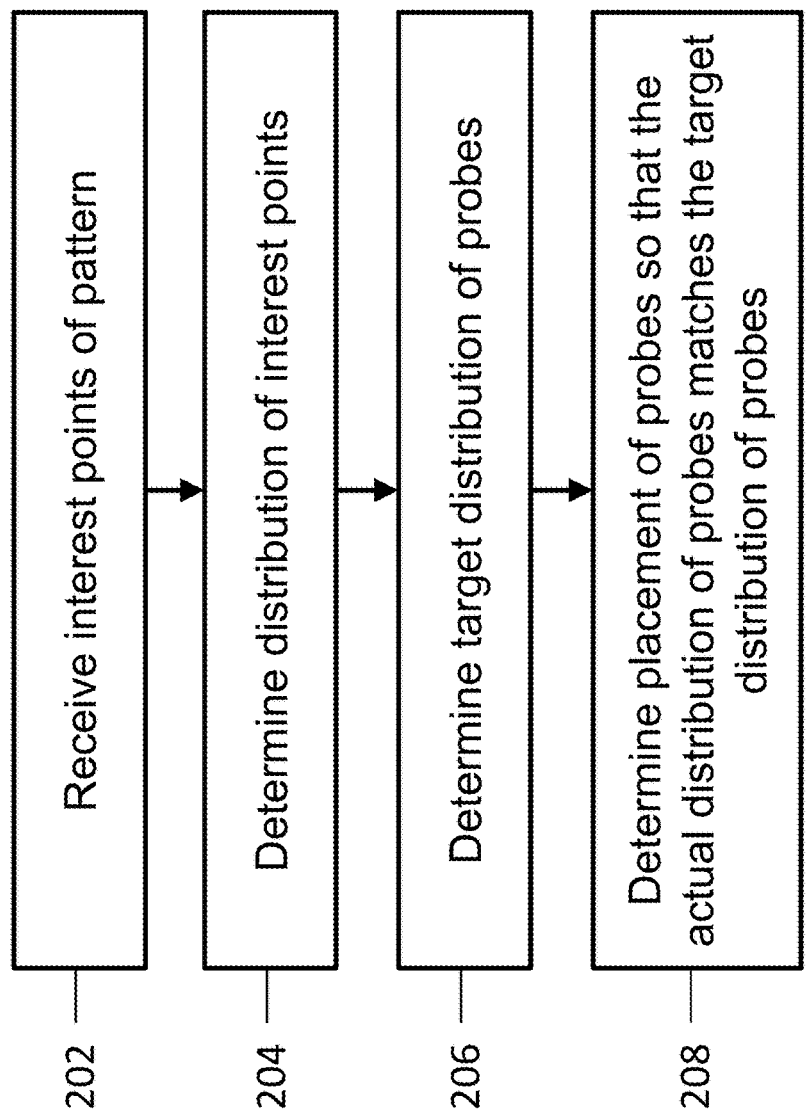
FIG. 2 illustrates a high level process for placing probes on interest points of a 2D image in accordance with some embodiments.

FIG. 2 illustrates a high level process for placing probes on interest points in an 2D image in accordance with some embodiments. Interest points can indicate candidate locations for probes. For example, the probe placement module can be configured to select a subset of interest points in an image and place probes on the selected subset of interest points.

In step 202, the probe placement module can be configured to receive information on the location of interest points in a 2D image. For example, the probe placement module can receive, from an interest point detection module, a boundary of a 2D pattern in a 2D image.

In step 204, the probe placement module can determine the distribution of the interest points. For example, the probe placement module can represent each interest point using a feature (e.g., a perpendicular orientation measured at the interest point) and determine a distribution of features associated with the interest points.

In step 206, the probe placement module can determine the target distribution of probes. In some cases, the target distribution of probes can be determined based on features associated with the interest points and/or the distribution of interest points determined in step 204. For example, the probe placement module can determine that the target distribution of probes is the inverse of the distribution of interest points determined in step 204. In step 208, the probe placement module can determine the location of probes so that the actual distribution of probes matches the target distribution of probes.

The general framework illustrated in FIG. 2 can be implemented using, for example, at least two mechanisms (e.g., either alone and/or in combination with each other). In the first mechanism, the disclosed probe placement module can be configured to place the probes so that the distribution of perpendicular orientations, as measured at probe locations, is balanced (e.g., the histogram of perpendicular orientations at the location of probes is approximately uniform). The first mechanism can be particularly useful for modeling patterns with two degrees of freedom (e.g., a translational movement).

For example, in step 204, the probe placement module can determine the histogram of perpendicular orientations measured at the plurality of interest points in a 2D image. In step 206, the probe placement module can determine that the target distribution of perpendicular orientations, as measured at probe locations, is a uniform distribution. In step 208, the probe placement module can place probes at one or more of the interest points so that the histogram of perpendicular orientations, as measured by the placed probes, is close to the uniform distribution.

Figure 3:
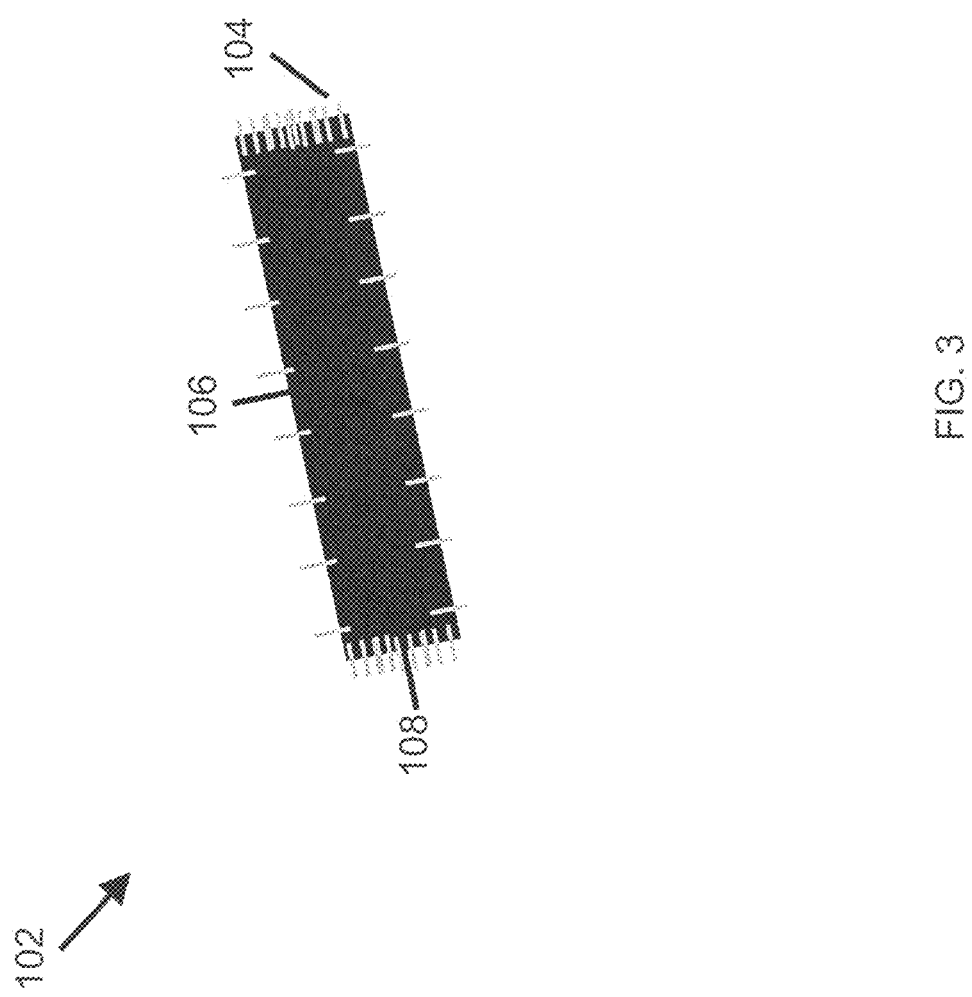
FIG. 3 illustrates a result of placing probes by matching a histogram of perpendicular orientations to a uniform distribution in accordance with some embodiments.

FIG. 3 illustrates a result of placing probes by matching the histogram of perpendicular orientations to a uniform distribution in accordance with some embodiments. In this example, the interest points can collectively form a boundary 102 of a 2D pattern. When the boundary 102 has an elongated rectangular shape, the probe placement module can reduce the number of probes 104 on the long edge 106 and increase the number of probes on the short edge 108 so that the number of probes on the long edge 106 is roughly the same compared to the number of probes on the short edge 108. This way, the orientation distribution of the placed probes 104 can be balanced. The probe placement module implementing the first mechanism is discussed throughout the specification, in particular in regards to FIGS. 5-10.

Under the second mechanism, the probe placement module can determine the location of probes such that the distribution of the probes is substantially similar to the target distribution. In step 204, the probe placement module can represent interest points using variables corresponding to the degree of freedom of the pattern. For example, when an object associated with the 2D pattern is known to move in two-dimensions, the probe placement module can represent an interest point using a two-dimensional gradient vector at the interest point. Then the probe placement module can determine the distribution of interest points by modeling the distribution of perpendicular orientations associated with the interest points.

In step 206, the probe placement module can determine the desired target distribution based on features associated with the interest points. For example, the probe placement module can determine the desired target distribution based on the perpendicular orientations measured at the plurality of interest points. More particularly, the probe placement module can determine the desired target distribution to be an inverse of the distribution of perpendicular orientations measured at the interest points. Similarly, the probe placement module can take into account the rotation vectors and scale information measured at the interest points to determine the target distribution. Subsequently, in step 208, the probe placement module can place the probes on one or more interest points by sampling from the target distribution. The second mechanism is discussed throughout the specification, and in particular in regards to FIGS. 11-18.

Figure 4:
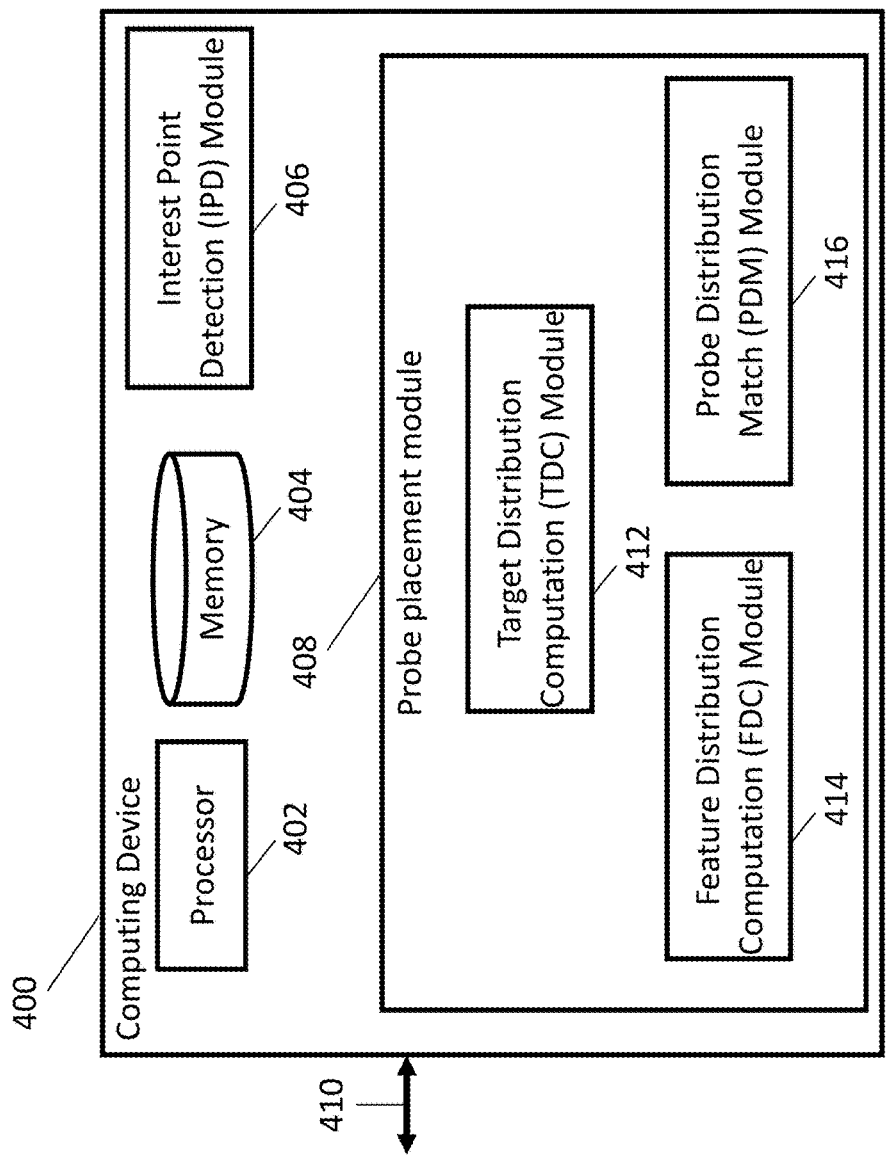
FIG. 4 illustrates a computing device that includes a probe placement module in accordance with some embodiments.

FIG. 4 illustrates a computing device that includes a probe placement module in accordance with some embodiments. The computing device 400 can include a processor 402, memory 404, an interest point detection (IPD) module 406, a probe placement module 408, and an interface 410.

In some embodiments, the processor 402 can execute instructions and one or more memory devices 404 for storing instructions and/or data. The memory device 404 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), or any other memory or combination of memories. The memory device 404 can be used to temporarily store data. The memory device 404 can also be used for long-term data storage. The processor 402 and the memory device 404 can be supplemented by and/or incorporated into special purpose logic circuitry.

In some embodiments, the IPD module 406 can be configured to detect interest points from an input image. For example, the IPD module 406 can receive, via an interface 410, an image from another device, such as a camera module or another computing device in communication with the IPD module 406. Subsequently, the IPD module 406 can perform image processing operations to detect interest points.

In some embodiments, interest points can include an edge of a 2D pattern, a boundary (e.g., a chain of edges) of a 2D pattern, a texture boundary, a pixel with a large gradient magnitude, a pixel with a large intensity difference from neighboring pixels, a pixel with a large color difference from neighboring pixels, a Scale-Invariant Feature Transform (SIFT) feature point, any pixel that is distinct from neighboring pixels, or any combinations thereof. Therefore, the IPD module 406 can be configured to perform an edge detection operation to determine a set of edges that form a boundary of a 2D pattern, a differentiation operation to detect a pixel with a large gradient magnitude, a SIFT operator to detect SIFT feature points, or any combinations thereof.

In some embodiments, the IPD module 406 can be configured to determine the orientation perpendicular to structures (hereinafter referred to as a perpendicular orientation) underlying the interest points. In some cases, the perpendicular orientation can be determined by determining a gradient orientation of the underlying structure. For example, a gradient vector of the underlying pattern can be determined at the interest point and an orientation associated with the gradient vector can be determined. In other cases, the perpendicular orientation can be determined through simple calculation. For example, two points on a boundary of the structure can be taken and a line that connects the two points can be determined. The orientation perpendicular to the line can be determined to be the perpendicular orientation. In other cases, the perpendicular orientation of a structure can be determined based on information received from other computational modules, for example, a computer aided design (CAD) modeling module.

In some embodiments, the probe placement module 408 can be configured to determine the location of probes based on interest points in an image. The probe placement module 408 can include a target distribution computation (TDC) module 412, a feature distribution computation (FDC) module 414, and a probe distribution match module (PDM) module 416. The TDC module 412 can determine a target distribution of probes to be placed on one or more interest points; the FDC module 414 can determine the distribution of interest points in an image; and the PDM module 416 can determine the location of probes so that the distribution of the probes and the target distribution of the probes are substantially matched. As discussed below, when the TDC module 412 only deals with a histogram of perpendicular orientations, the target distribution can be a uniform distribution. In other embodiments, the probe placement module 408 may include a different set of modules to perform substantially similar operations.

In some embodiments, the interface 410 can be implemented in hardware to send and receive signals in a variety of mediums, such as optical, copper, and wireless, and in a number of different protocols some of which may be non-transient.

In some embodiments, one or more of the modules 406, 408, 412, 414, 416 can be implemented in software using the memory 404. The software can run on a processor 402 capable of executing computer instructions or computer code. The processor 402 is implemented in hardware using an application specific integrated circuit (ASIC), programmable logic array (PLA), digital signal processor (DSP), field programmable gate array (FPGA), or any other integrated circuit. The processor 402 suitable for the execution of a computer program include, by way of example, both general and special purpose microprocessors, digital signal processors, and any one or more processors of any kind of digital computer. Generally, the processor 402 receives instructions and data from a read-only memory or a random access memory or both.

In some embodiments, disclosed method steps can be performed by one or more processors 402 executing a computer program to perform functions of the invention by operating on input data and/or generating output data. One or more of the modules (e.g., modules 406, 408, 412, 414, 416) can be implemented in hardware using an ASIC (application-specific integrated circuit), PLA (programmable logic array), DSP (digital signal processor), FPGA (field programmable gate array), or other integrated circuit. In some embodiments, two or more modules 406, 408, 412, 414, 416 can be implemented on the same integrated circuit, such as ASIC, PLA, DSP, or FPGA, thereby forming a system on chip. Subroutines can refer to portions of the computer program and/or the processor/special circuitry that implement one or more functions.

The modules 406, 408, 412, 414, 416 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computing device 400 can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

In some embodiments, the computing device 400 can include user equipment. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

In some embodiments, the computing device 400 can include a server. The server can operate using an operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

First Probe Placement Mechanism—Balancing Perpendicular Orientations of Probes

In some embodiments, the probe placement module 408 can be configured to place probes to balance the perpendicular orientations measured at probe locations. More particularly, the probe placement module 408 can be configured to place probes on one or more interest points in a 2D image so that the histogram of perpendicular orientations, as measured at the location of the probes, is roughly uniform. This mode of operation can allow the probe placement module 408 to improve the accuracy of a model for objects with two degrees of freedom.

In some embodiments, the histogram of perpendicular orientations can include a plurality of orientation bins. Each orientation bin can correspond to a predetermined range of orientations. For example, the histogram of perpendicular orientations can include 180 bins, in which each orientation bin can cover the 2-degree range of an angle. Therefore, the histogram of perpendicular orientations can be indicative of a profile of perpendicular orientations as measured at interest points. In some embodiments, the histogram of perpendicular orientations can be represented as a continuous distribution.

In some embodiments, the probe placement module 408 can be configured to determine the histogram of perpendicular orientations associated with interest points. To this end, the probe placement module 408 can determine a perpendicular orientation associated with each of the interest points. For example, the probe placement module 408 can receive, from the IPD module 406 module, information that is representative of the perpendicular orientation at each of the interest points. As another example, the probe placement module 408 can compute the perpendicular orientation associated with each of the interest points. Subsequently, the probe placement module 408 can determine a histogram of perpendicular orientations measured at the plurality of interest points.

FIG. 5 illustrates a process for determining a histogram of perpendicular orientations for interest points in accordance with some embodiments.

In step 502, the IPD module 406 can determine interest points in an image. In some embodiments, the interest points can comprise a boundary of a 2D pattern depicted in an image. In some cases, the IPD module 406 can identify the boundary of a 2D pattern using an edge detection technique. For example, the IPD module 406 can perform an edge detection operation to identify a set of edge points believed to correspond to an edge. Each point can be associated with a position vector and a perpendicular vector that is perpendicular to a underlying structure. Subsequently, the IPD module 406 can chain the edge points to form a coherent boundary of a 2D pattern. The edge detection technique can include, for example, a canny edge detection technique or a Hough transform technique. The edge detection technique can use one or more edge detection operators, including, for example, a Sobel operator, a Kirsch operator, a Prewitt operator, a Gabor filter, a Haar wavelet filter, any other filters that can detect a change in a pixel value in an image (e.g., a high frequency component of an image), and/or any combinations thereof.

In other embodiments, the interest points can include SIFT feature points. In such cases, the IPD module 406 can perform SIFT operations to identify SIFT feature points.

In some embodiments, the interest points can be placed uniformly on the boundary of a pattern. For example, the distance between any two adjacent interest points can be substantially identical. In this case, one may consider each interest point to be associated with the same arc length of the boundary.

Once at least one interest point is available, the FDC module 414 can receive, from the IPD module 406, the location of the at least one interest point. Then, the FDC module 414 can iterate the steps 504-508 to generate a histogram of perpendicular orientations measured at the at least one interest point.

In step 504, the FDC module 414 can select one of the at least one interest point and determine a perpendicular orientation at the selected interest point. In some embodiments, the FDC module 414 can receive perpendicular orientation information from the IPD module 406. In other embodiments, the FDC module 414 can itself determine the perpendicular orientation at the selected interest point. For example, the FDC module 414 convolves a gradient operator with the interest point to determine a perpendicular orientation. The gradient operator can include a Gabor filter, a Haar wavelet filter, a steerable filter, a x-directional gradient filter $[-1, 0, 1]$, a y-directional gradient filter $[-1, 0, 1]^T$, and/or any combinations thereof. As another example, the FDC module 414 computes the perpendicular orientation associated with each of the interest points by, for instance, determining a gradient vector of a structure underling the interest points or determining an orientation of a line that joins two nearby points on the boundary of the structure.

In step 506, the FDC module 414 can add a contribution of the perpendicular orientation at the selected interest point to the histogram of perpendicular orientations. To this end, the FDC module 414 can determine an orientation bin, in the histogram, corresponding to the perpendicular orientation determined in step 504. For example, when the perpendicular orientation is 3-degrees with respect to the x-axis, the FDC module 414 can determine that the perpendicular orientation is associated with an orientation bin #1 that covers the orientation between 2-degrees and 4-degrees with respect to the x-axis. Subsequently, the FDC module 414 can add a vote to the orientation bin associated with the perpendicular orientation. For example, the FDC module 414 can increase a value of the orientation bin by one. As another example, the FDC module 414 can increase a value of the orientation bin by a weight. The weight can depend on the gradient vector associated with the interest point. For example, the weight can depend on a magnitude of the gradient vector.

In step 508, the FDC module 414 can determine whether there is any interest point that the FDC module 414 has not considered for the histogram of perpendicular orientations. If so, the FDC module 414 can go back to step 504 and iterate steps 504-508 until all interest points are considered by the FDC module 414. If the FDC module 414 has considered all interest points, then the FDC module 414 can output the histogram of perpendicular orientations.

Figure 6B:
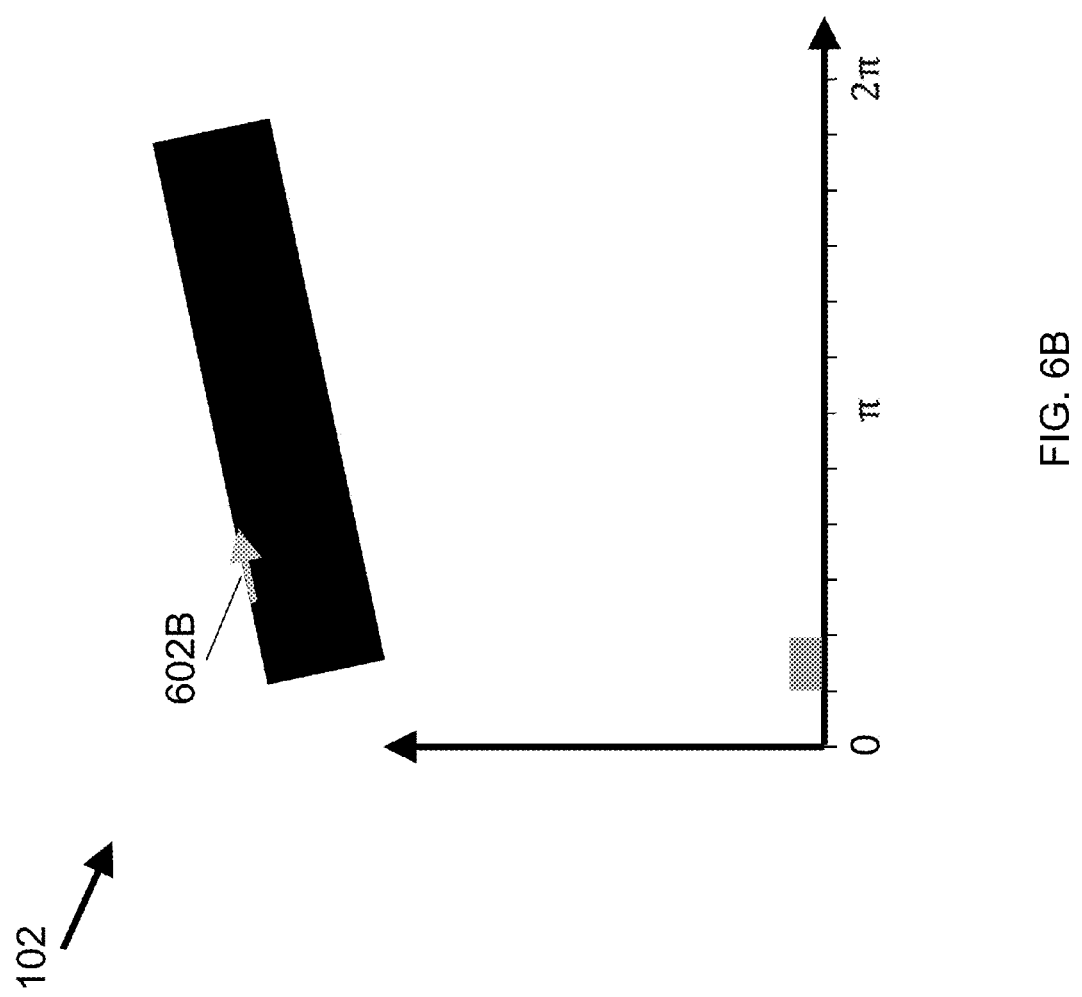
Figure 6C:
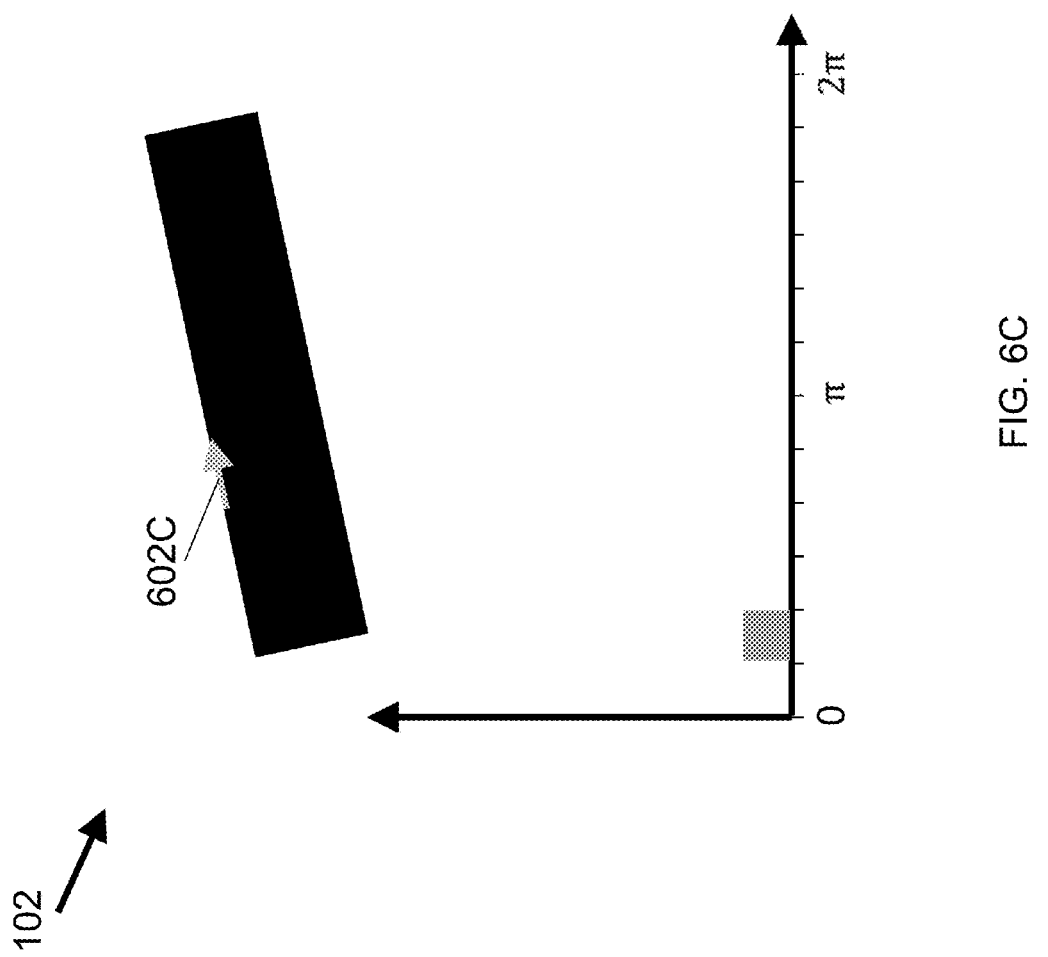
Figure 6D:
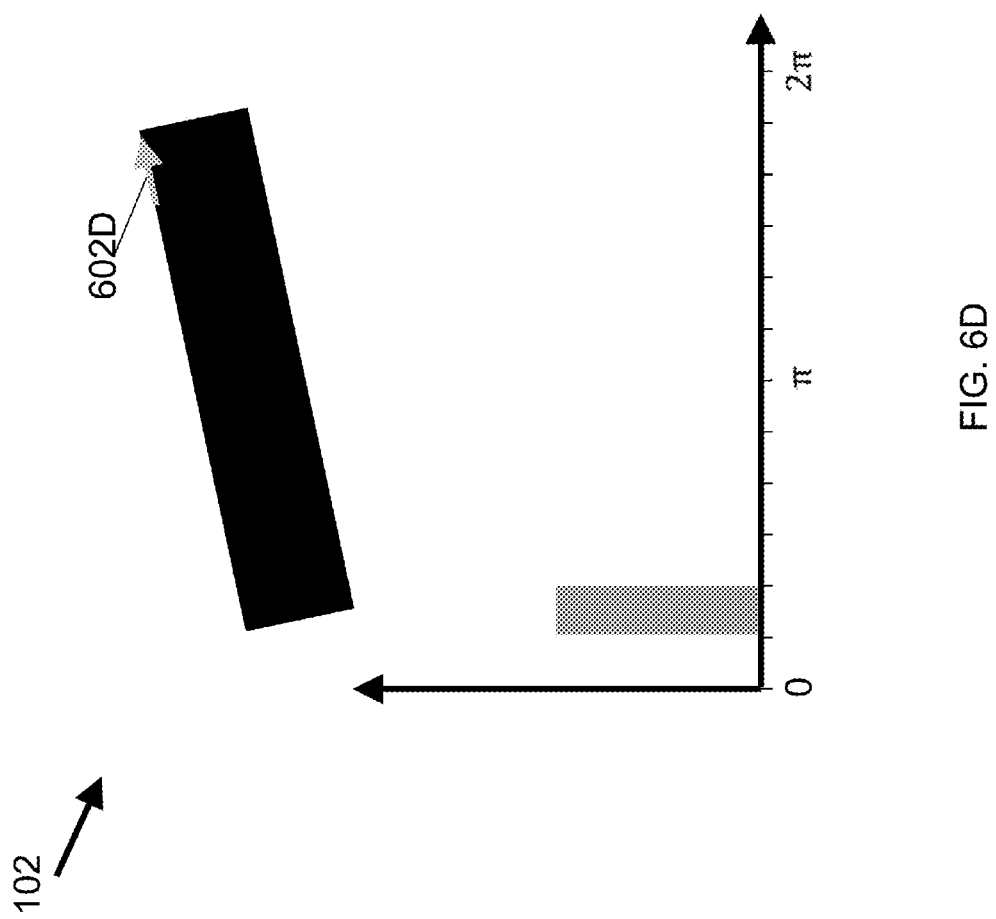
Figure 6G:
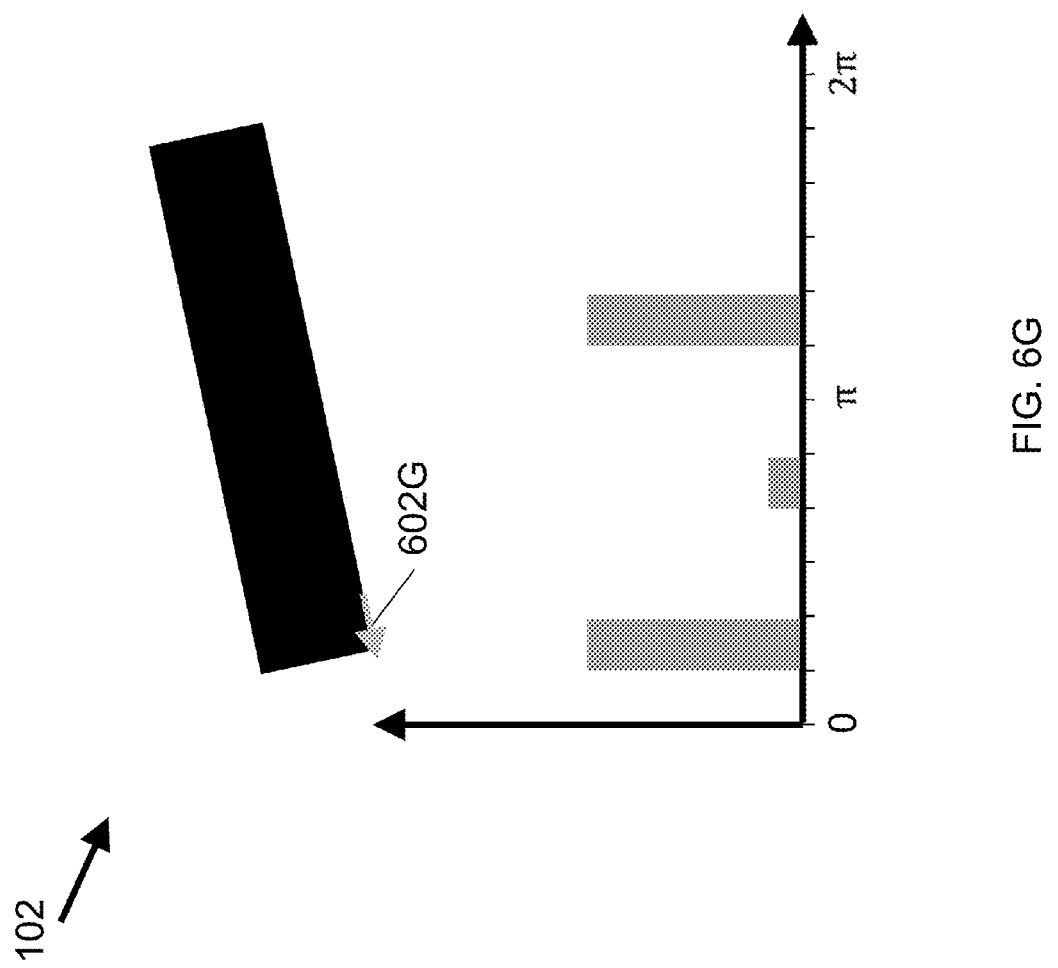
Figure 6H:
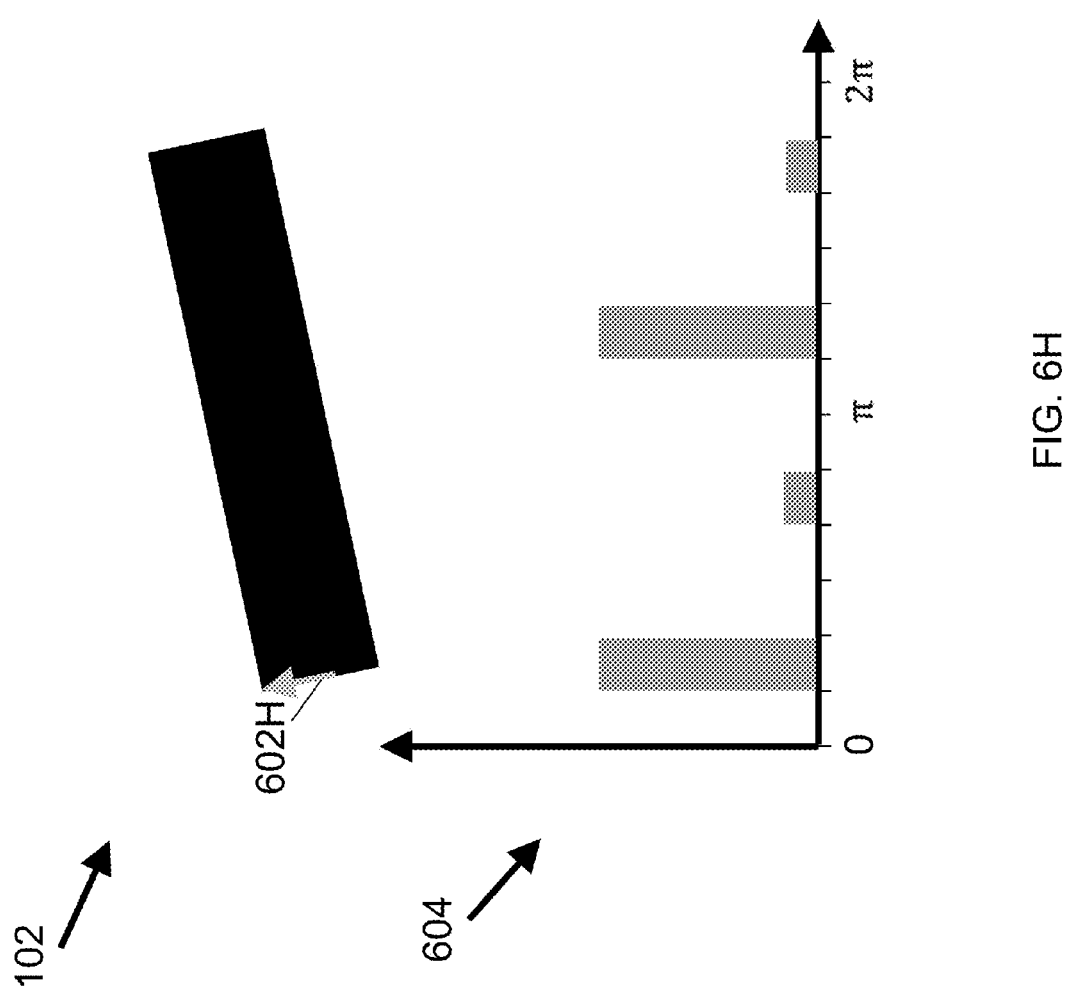

FIGS. 6A-6H illustrate a process for generating a histogram of perpendicular orientations in accordance with some embodiments. In this illustration, the center of each arrow 602 can be considered to correspond to an interest point, and the set of all interest points can be considered to comprise a boundary 102. As illustrated in FIG. 6A, the FDC module 414 can determine that the first interest point 602A is associated with an orientation bin covering a range of 0 and $$\frac{\pi}{6}.$$

Therefore, the FDC module 414 can increase a value associated with the orientation bin by one. As illustrated in FIGS. 6B-6H, the FDC module 414 can perform this operation for each interest point 602 on the boundary 102, and generate a corresponding histogram of perpendicular orientations 604.

In some embodiments, the TDC module 412 can be configured to generate a target distribution of probes. The target distribution of probes can be indicative of a desired placement of probes on one or more interest points. In some embodiments, the target distribution can include a plurality of orientation bins, where each orientation bin is associated with a value. In some cases, the target distribution can be a uniform distribution. In essence, the uniform target distribution indicates that the number of probes on interest points pointing to a particular orientation should be the same as the number of probes on interest points pointing to another orientation. This way, the probe placement module 408 can balance the number of probes pointing to different orientations.

In some cases, the target distribution can be a partially uniform distribution. For example, some of the orientation bins in the target distribution can have a value of zero and the remaining orientation bins can have the same value. In such cases, the target distribution's orientation bin can have a value of zero when the corresponding orientation bin in the histogram of perpendicular orientations 604 has a value of zero.

Once the FDC module 414 determines the histogram of perpendicular orientations and the TDC module 412 determines the target distribution, the PDM module 416 can determine the location of probes so that the distribution of the probes on one or more interest points matches the target distribution.

Figure 7:
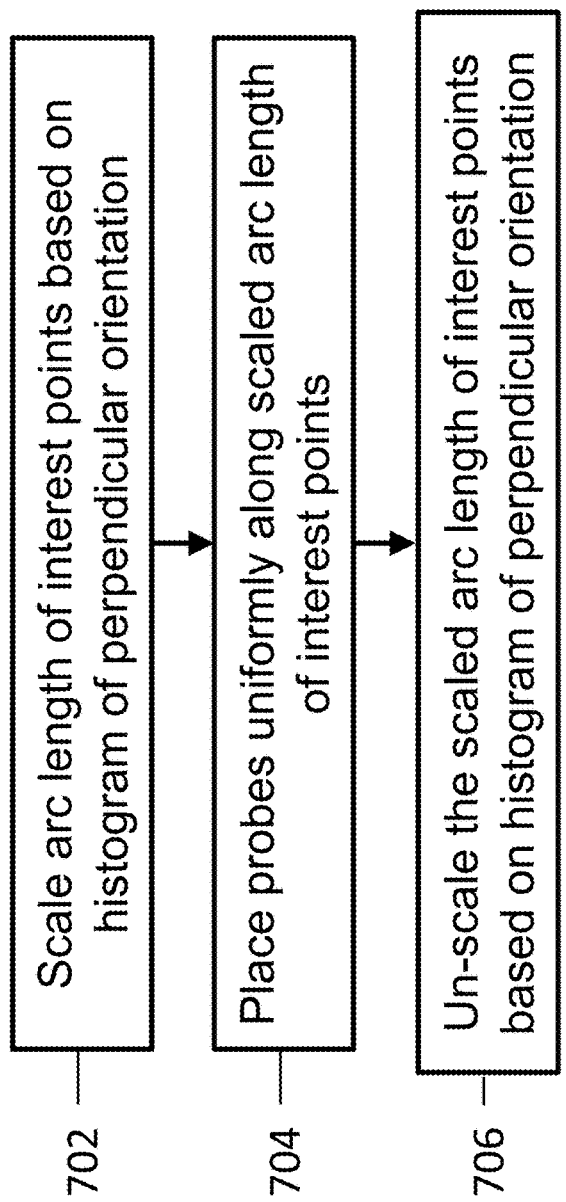
FIG. 7 illustrates a process for determining probe placements in accordance with some embodiments.

FIG. 7 illustrates a process for determining the placement of probes in accordance with some embodiments. In step 702, the PDM module 416 can use the histogram of perpendicular orientations to determine what portion of interest points are on a structure pointing to a particular orientation. For instance, when the histogram has 180 orientation bins, the PDM module 416 can use the histogram to determine a proportion of interest points pointing to a particular orientation with a 2-degree resolution. Subsequently, the PDM module 416 can scale the arc length of interest point based on the value of the histogram bin corresponding to the interest point. More particularly, the PDM module 416 can adjust the arc length of an individual interest point in a manner inversely proportional to the value of the histogram bin associated with the individual interest point.

For example, referring to an example illustrated in FIG. 3, the number of interest points along the short edge 104 can be small compared to the number of interest points along the long edge 106. Therefore, the value of a bin in the histogram corresponding to the short edge 104 can be smaller than the value of a bin corresponding to the long edge 106. Based on this, the PDM module 416 can increase the arc length of interest points (e.g., a boundary section) along the short edge 104 and reduce (or leave unaltered) the arc length of interest points along the long edge 106.

FIG. 8 illustrates the scaling of arc length of interest points for a boundary in accordance with some embodiments. Since the histogram indicates that the number of interest points on a vertical edge is less than the number of interest points on a horizontal edge, the PDM module 416 can increase the arc length of interest points on the vertical edge. The increased arc length of interest points can be thought of increasing a length of the boundary along the vertical edge, as illustrated by the arrow 802.

In step 704, the PDM module 416 can place probes on the scaled boundary in a uniform manner. FIG. 9 illustrates a uniform placement of probes on a scaled boundary in accordance with some embodiments. Since the vertical edge of the boundary has been scaled, the uniform placement of probes 104 on the scaled vertical edge can result in roughly the same number of probes 104 on vertical edges and horizontal edges.

In some embodiments, the PDM module 416 can place probes uniformly on the scaled boundary sequentially. For example, the PDM module 416 starts at an initial interest point (which may be arbitrarily selected) and place a first probe at the initial interest point. Subsequently, the PDM module 416 can place the second probe at an interest point that is separated by the predetermined distance from the first probe. This process can be iterated until the PDM module 416 has considered all the plurality of interest points.

In step 706, the PDM module 416 can reverse the scaling operation from step 702, thereby also adjusting the distance between uniformly placed probes. FIG. 10 illustrates a reverse scaling of the scaled boundary in accordance with some embodiments. Along with the reverse scaling of the boundary, the distance between two adjacent probes 104 is also scaled correspondingly. Therefore, the density of the probes along the vertical edge becomes higher compared to the density of probes along the horizontal edge. This way, as shown by the distribution 1002, the PDM module 416 can balance the histogram of perpendicular orientations measured at the probe locations. The balanced histogram of perpendicular orientations 1002 generally indicates that the directional information derived from the probes 104 is also balanced.

In some embodiments, the PDM module 416 can be configured to perform the arc length scaling and reverse scaling without actually stretching the arc length of interest points (e.g., boundary sections) graphically. For example, the PDM module 416 can be configured to increase or decrease the resolution of the underlying coordinate system around the interest point in order to effectively scale the arc length of the interest point.

In some embodiments, the PDM module 416 can merge the steps 704 and 706 by sequentially placing probes. For example, the PDM module 416 can determine the uniform distance that should separate two probes. Then the PDM module 416 starts at an initial interest point (which may be arbitrarily selected) and places a first probe at the initial interest point. Subsequently, the PDM module 416 can determine the arc length associated with the initial interest point based on the histogram of perpendicular orientations. Then, the PDM module 416 can scale the uniform distance as a function of the arc length to determine the scaled distance between the first probe and a second probe to be placed adjacent to the first probe. Subsequently, the PDM module 416 can place the second probe at an interest point that is separated by the scaled distance from the first probe. This process can be iterated until the PDM module 416 has considered all the plurality of interest points. This way, the PDM module 416 can perform the steps 704 and 706 without graphically scaling the boundary of a pattern.

In some embodiments, the FDC module 414 can perform a low-pass filtering operation on the histogram of perpendicular orientations prior to scaling the arc length of interest points in step 702. There may be several benefits to performing a low-pass filtering operation prior to scaling the arc length of interest points. First, the low-pass filtering operation can allow the probe placement module to remove noise from the histogram of perpendicular orientations.

Second, the low-pass filtering can address the division by zero problem. The PDM module 416, which performs the arc length scaling, would often use the value of an orientation bin in the histogram of perpendicular orientations as a denominator. However, there may be some orientation bins with the value of 0, which may cause the division by zero problem. The low-pass filtering operation can address this issue by effectively eliminating orientation bins with a value of zero.

Third, the low-pass filtering operation can allow the probe placement module to discount a particular orientation bin that is grossly under-represented when the neighboring orientation bins are well represented. For example, the histogram of perpendicular orientations can indicate that the pattern has 100 interest points on a structure with a perpendicular orientation of 89 degrees, 100 interest points on a structure with a perpendicular orientation of 91 degrees, but only 1 interest point on a structure with a perpendicular orientation of 90 degrees. Without low-pass filtering, the PDM module 416 would likely increase the number of probes around the interest point with a perpendicular orientation of 90 degrees while limiting the number of probes around the interest points with a perpendicular orientation of 89 or 91 degrees. Such a drastic measure to balance the histogram of perpendicular orientations may be ineffective in capturing balanced information from probes because similar orientations can capture similar information. In other words, probes pointing to a perpendicular orientation of 89 or 91 degrees can capture substantially similar information as probes pointing to a perpendicular orientation of 90 degrees. Therefore, increasing the number of probes pointing to a perpendicular orientation of 90 degrees may be ineffective in capturing balanced information across the full range of angles, especially when the total number of probes is limited.

Low-pass filtering can address this issue because by low-pass filtering the histogram of perpendicular orientations, the value of the orientation bin for 90 degrees can be smoothed (e.g., averaged) with the values of the orientation bins for 89 degrees and 91 degrees. Therefore, the low-pass filtering operation can substantially increase the value of the orientation bin for 90 degrees. This way, the PDM module 416 can recognize that the information around the perpendicular orientations of 90 degrees is well captured by probes pointing to 89 degrees and 91 degrees. Therefore, the PDM module 416 would not drastically increase the number of probes pointing to 90 degrees.

In some embodiments, the FDC module 414 can perform the low-pass filtering operation by convolving the histogram with a kernel. In some cases, the FDC module 414 can be configured to perform a circular convolution. For example, under the circular convolution, the FDC module 414 can wrap the kernel around the limits of the orientation domain (e.g., 0-2π) of the histogram. The kernel for the low-pass filtering operation can include a raised cosine kernel, a cosine-squared kernel, or any other circular functions that can smooth the histogram. The FDC module 414 can control the width of the kernel to control an amount of smoothing to be performed on the histogram. For example, the width of the kernel can cover 2π/N, where N can be any integer number.

In some embodiments, instead of increasing the density of probes along the shorter edge as in FIG. 10, the PDM module 416 can be configured to initialize probes on interest points, and determine the weights associated with the initialized probes. For example, when a probe is associated with a short edge (e.g., the probe is placed on an edge corresponding to an orientation bin with a small value), the PDM module 416 can increase the weight associated with the probe; when a probe is associated with a long edge (e.g., the probe is placed on an edge corresponding to an orientation bin with a large value), the PDM module 416 can decrease the weight associated with the probe. Subsequently, the weights can be used to vary the contribution of the probes for various applications, e.g., alignment of the boundary. Using this technique, the PDM module 416 can reduce the computational power needed to (1) increase the density of probes along the short edge and (2) match the increased number of probes during alignment. However, the PDM module 416 may reduce the resolution of the probes compared to using the process in FIG. 7.

Second Probe Placement Mechanism—Sampling Probes from a Distribution

In some embodiments, the probe placement module 408 can be configured to place probes on one or more interest points by sampling probes from a target distribution of probes. The target distribution of probes can include random variables corresponding to degrees of freedom associated with the pattern. For example, when an object associated with the pattern is allowed to move in two dimensions (e.g., translational movement), the target distribution can have two random variables: x coordinate and y coordinate (or other equivalent representations.) As another example, when an object associated with the pattern is allowed to make a translational movement and a rotational movement, the target distribution can have three random variables: x coordinate, y coordinate, and a rotational vector (e.g., an orientation.) As another example, when an object associated with the pattern is allowed to make a translational movement, a rotational movement, and a scaling movement (e.g. a movement away from or towards an imaging device), the target distribution can include four random variables: x coordinate, y coordinate, rotation, and scale.

In some embodiments, the probe placement module 408 can represent the target distribution as a non-parametric distribution. For example, the probe placement module 408 can quantize the domain of each random variable into a plurality of bins, and simply count the number of interest points that fall into corresponding bins. In other embodiments, the probe placement module 408 can represent the target distribution as a parametric distribution.

In some embodiments, the probe placement module 408 can determine the target distribution using a TDC module 412. The TDC module 412 can be configured to determine the target distribution of probes based on features associated with the interest points. For example, the TDC module 412 can determine the target distribution based on one or more of, for example, the coordinate of the interest points, the perpendicular orientation associated with the interest points, the rotation of the interest points, or the scale of the interest points.

Figure 11A:
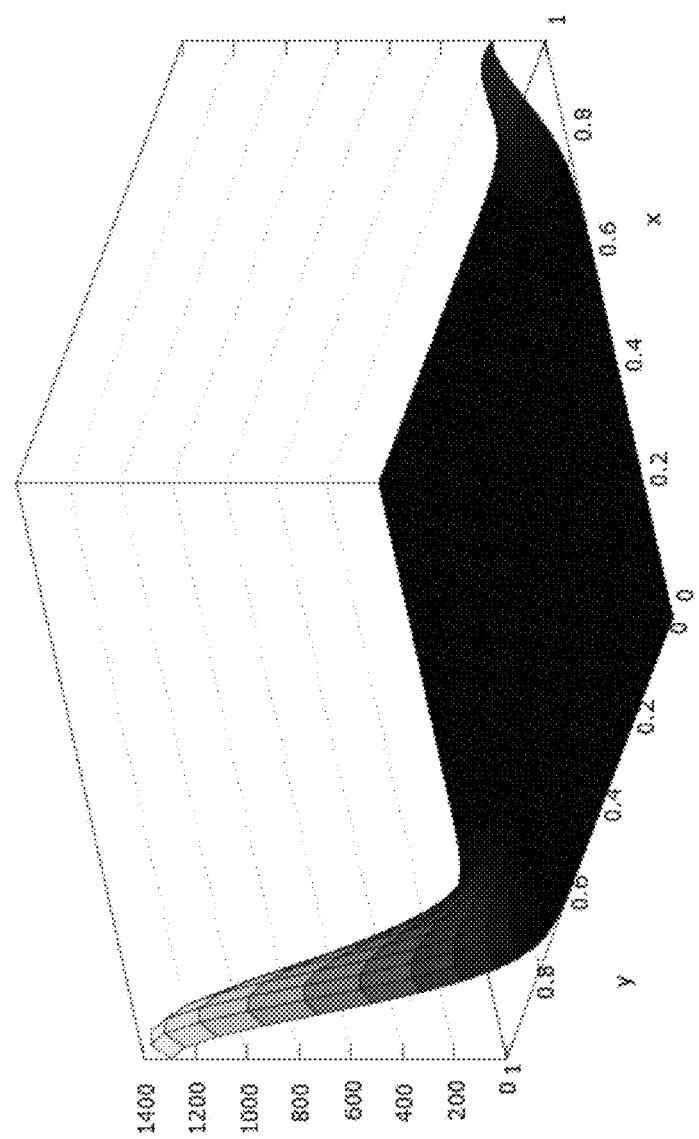
FIGS. 11A-11B illustrate probe balancing by sampling probes from a target distribution in accordance with some embodiments.
Figure 11B:
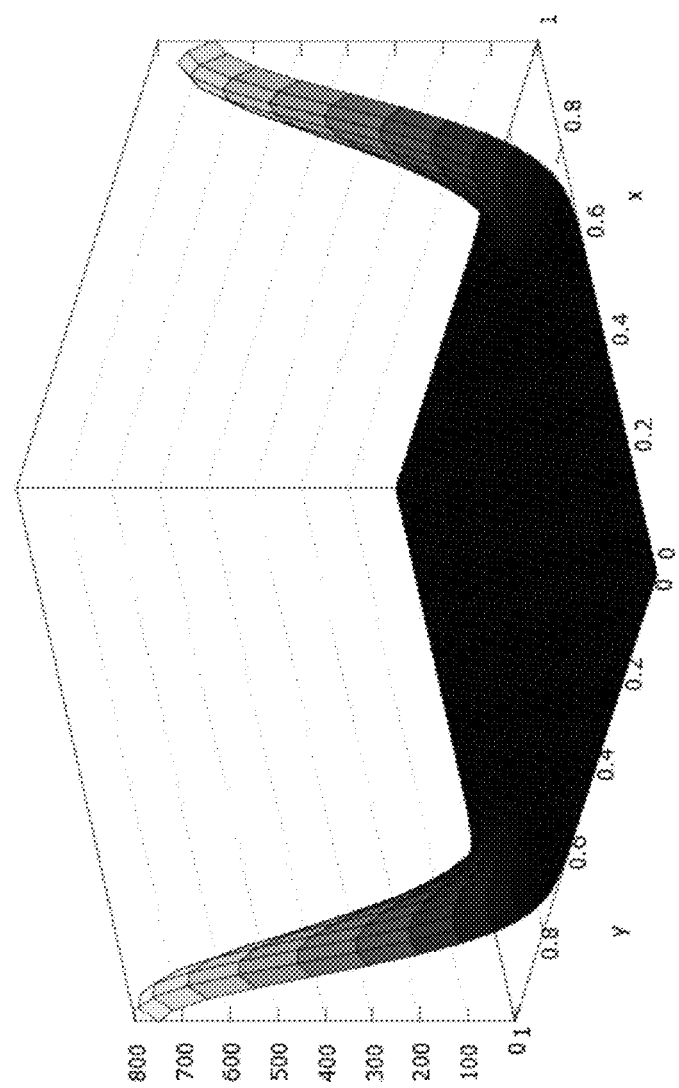

In some embodiments, the TDC module 412 is configured to determine the target distribution such that the distribution of perpendicular orientations sampled from the target distribution is substantially balanced. For instance, suppose that the pattern of interest is a horizontal rectangle, as shown in FIG. 1. Such a pattern may be associated with a model having a gradient vector distribution as shown in FIG. 11A. As shown in FIG. 11A, there are considerably more edges having a large y-directional component compared to edges having a large x-directional component. Therefore, the target distribution for the pattern in FIG. 1 should be such that the probes drawn from the target distribution would have a balanced gradient distribution as shown in FIG. 11B.

In some embodiments, the TDC module 412 is configured to determine the target distribution so that the target distribution has a similar support as the distribution of interest points. This is important because in these embodiments the probe placement module 408 is configured to sample the probes by re-sampling (e.g., importance sampling) from the existing set of interest points. To this end, the TDC module 412 is configured to use a mixture model for both the interest point distribution and the target distribution, as discussed below.

In some embodiments, the TDC module 412 provides the target distribution to the PDM module 414, and the PDM module 414 is configured to draw samples from the target distribution to determine the location of probes.

In some embodiments, the PDM module 414 can use an importance sampling technique to draw samples from the target distribution. In other embodiments, the PDM module 414 can be configured to determine a boundary of a pattern, and generate probe samples along the boundary of a pattern. This technique can be useful when drawing only a small number of probes from the target distribution. This technique has the advantage that the set of probes generated by the sampling may not be affected by random fluctuations in the re-sampling process and can guarantee that the probes are dispersed across the full geometric extent of the pattern's boundary.

Target Distribution Computation

When a pattern has two degrees of freedom (e.g., translational movement,) the TDC module 412 can determine a weighting function $f(x,y)$ that satisfies the following relationships:

$$\sum_i x_i f(x_i, y_i) = \sum_i y_i f(x_i, y_i)$$

$$f(x_i, y_i) \geq 0, \forall i$$

and:

$$\sum_i f(x_i, y_i) \neq 0$$

where i indexes the $i^{th}$ interest point. The objective of this optimization routine is to identify a function $f(x,y)$ that equates (1) the weighted summation of gradient vectors' x-components measured at the interest points and (2) the weighted summation of gradient vectors' y-components measured at the interest points. In some cases, the TDC module 412 can balance only the magnitude of the gradient vectors. Therefore, $x_i$ can refer to the absolute value of the x component of the gradient vector measured at the $i^{th}$ interest point; and $y_i$ can refer to the absolute value of the y component of the gradient vector measured at the $i^{th}$ interest point.

Once the TDC module 412 determines the weighting function $f(x,y)$, the TDC module 412 can provide the weighting function $f(x,y)$ to the PDM module 416. In some embodiments the weighting function may take the form of a probability distribution which the PDM module 416 can use to place the probes on one or more interest points. Since the PDM module 416 in this case uses the weighting function $f(x,y)$ as a probability distribution from which to sample probes, it must be constrained to be non-negative and can be positive at least for some gradient components (x,y). For such embodiments the term "target distribution" will be used to refer to the probability distribution here denoted $f(x,y)$.

In some embodiments, the weighting function is used to weight an existing set of probes chosen through some other means, to affect their relative importance in such a way as to minimize:

$$\sum_i |x_i - y_i| f(x_i, y_i)$$

$$f(x_i, y_i) \geq 0, \forall i$$

and:

$$\sum_i f(x_i, y_i) \neq 0.$$

When a pattern has three degrees of freedom (e.g., translational movement and rotational movement,) the TDC module 412 can incorporate, into the target distribution, a rotational variable $\theta$ corresponding to a rotational movement. The TDC module 412 can define the rotational variable $\theta$ with respect to an origin.

In some embodiments, the origin can be the center-of-mass of the plurality of interest points. In some embodiments, the origin can be the center of rotation. The center of rotation can be the point about which the moment of rotation is minimized. The center of rotation corresponds to a unique global minimum, and is independent of the choice of basis vectors (e.g., a coordinate system). Therefore, the center of rotation is a geometric quantity that is intrinsic to the plurality of interest points. The center of rotation can be computed as follows:

$$C_r = [\varphi u u^T ds]^{-1} X^{-1} \varphi u p^T X u ds$$

where p is a reference vector with respect to a reference point (which may be arbitrary), u is a unit normal vector at a particular interest point, and X is a cross product matrix. FIG. 11 illustrates the relationship between the reference vector p and the unit normal vector u in accordance with some embodiments. In an orthonormal basis, $$X = \begin{pmatrix} 0 & 1 \\ -1 & 0 \end{pmatrix}.$$

For computational purposes, the center of rotation in a coordinate system with orthonormal basis can be computed as follows:

$$\begin{pmatrix} c_{rx} \\ c_{ry} \end{pmatrix} = \begin{pmatrix} \oint u_x^2 ds & \oint u_x u_y ds \\ \oint u_x u_y ds & \oint u_y^2 ds \end{pmatrix}^{-1} \begin{pmatrix} \oint (p_y u_x u_y - p_x u_y^2) ds \\ \oint (p_x u_x u_y - p_y u_x^2) ds \end{pmatrix}$$

where the subscripts x and y refer to the x and y components of the corresponding vector.

Figure 12A:
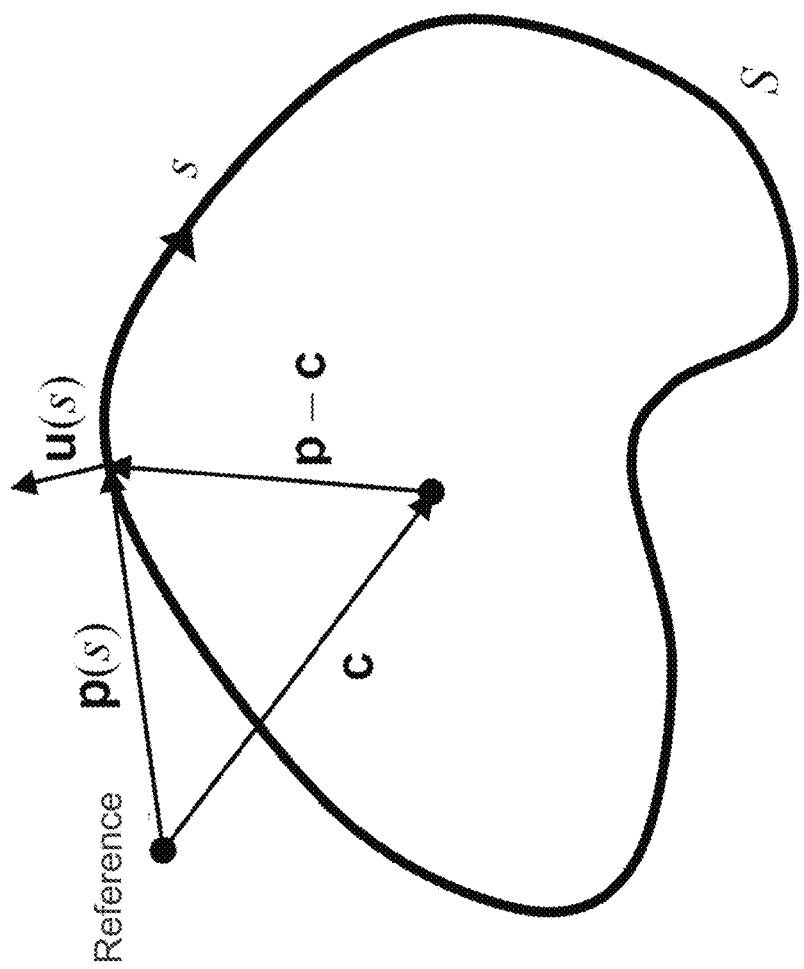
FIG. 12A illustrates a relationship between a reference vector and a unit normal vector in accordance with some embodiments
Figure 12B:
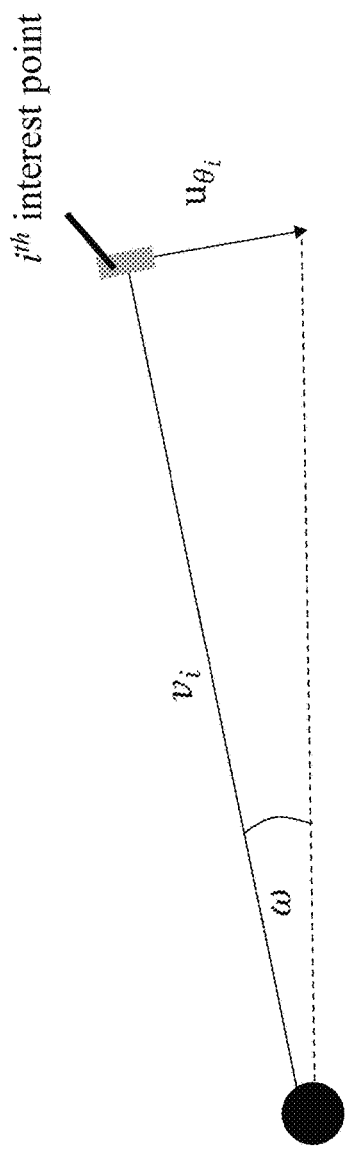
FIG. 12B illustrates a relationship between a position vector $v_i$ and a unit rotational vector $u_{\theta_i}$ in accordance with some embodiments.

Once the origin is determined, the TDC module 412 can determine the rotational variable θ using a position vector $v_i$ of the $i^{th}$ interest point, which is a vector from the origin to the center of the $i^{th}$ interest point, and a rotational unit vector $u_{\theta_i}$ at the center of the $i^{th}$ interest point. FIG. 12 illustrates the relationship between a position vector $v_i$ and a unit rotational vector $u_{\theta_i}$ in accordance with some embodiments.

In some embodiments, the rotational variable $\theta_i$ can be independent of the norm of the position vector $v_i$. The rotational variable $\theta_i$ that is independent of the norm of the position vector $v_i$ can provide a target distribution that would not distinguish probe locations based on the norm of the position vector $v_i$. For example, the TDC module 412 can define the rotational variable $\theta_i$ for the $i^{th}$ interest point as follows:

$$\theta_i = \frac{\|v_i \cdot u_{\theta_i}\|}{\|v_i\|}$$

This representation of the rotational variable $\theta_i$ may be useful for coarsely aligning shapes with large angular step sizes ω.

In some embodiments, the rotational variable $\theta_i$ can take into account the norm of the position vector $v_i$. Since $$\frac{d\omega}{d\|v_i\|} \propto \frac{1}{\|v_i\|^2},$$

the TDC module 412 can emphasize the contribution of interest points that are further away from the origin in order to increase the angular precision. For example, the TDC module 412 can define the rotational variable $\theta_i$ for the $i^{th}$ interest point as follows:

$$\theta_i = \frac{\|v_i\| \times \overline{u}_i^{(\theta)} \cdot \overline{d}_i}{\frac{1}{N}\sum_{i=0}^{N}\|v_i\|} \text{ or,}$$

$$\theta_i = \frac{\|v_i\|^2 \times \overline{u}_i^{(\theta)} \cdot \overline{d}_i}{\frac{1}{N}\sum_{i=0}^{N}\|v_i\|^2}.$$

The rotational variable $\theta_i$ that depends on the norm of the position vector $v_i$ can provide a target distribution that would favor placing probes at locations further away from the origin. This way, the target distribution can cause more probes to be sampled in interest points further away from the origin.

In some embodiments, the TDC module 412 can determine the representation for the rotational variable $\theta_i$ based on the shape of the pattern. For example, the TDC module 412 can determine that the pattern includes a lever arm. In this case, the TDC module 412 can take into account the lever arm in determining which of the representations to use for the rotational variable θ. As another example, the TDC module 412 can determine that the pattern includes concentric circles, or a nut inside of another nut. In this case, the TDC module 412 can take into account the concentric circles or a nut inside of another nut in determining which of the representations to use for the rotational variable θ.

Once the TDC module 412 determines the representation for the rotational variable, the TDC module 412 can use the determine representation to represent each of the interest points. Subsequently, the TDC module 412 can be configured to determine the target distribution based on the representation of the interest points by finding a weighting function $f(x,y,\theta)$ that satisfies the following relationships:

$$f(x, y, \theta) = \operatorname*{argmin}_{g}\left[\sum_i (x_i - y_i)g(x_i, y_i, \theta_i)\right]^2 + \left[\sum_i (x_i - \theta_i)g(x_i, y_i, \theta_i)\right]^2 + \left[\sum_i (y_i - , \theta_i)g(x_i, y_i, \theta_i)\right]^2$$

with the constraints that:

$$f(x_i, y_i, \theta_i) \geq 0, \forall i$$

$$\sum_i f(x_i, y_i, \theta_i) \neq 0$$

where i indexes the $i^{th}$ interest point.

Once the TDC module 412 determines the target distribution $f(x,y,\theta)$, the TDC module 412 can provide the target distribution $f(x,y,\theta)$ to the PDM module 416. Subsequently, the PDM module 416 can use the target distribution $f(x,y,\theta)$ as a probability distribution to sample probes on the pattern.

To facilitate the above optimization process, the probe placement module 408 can assume a functional form for the target distribution $f(x,y,\theta)$.

In some embodiments, the probe placement module 408 can assume that the target distribution $f(x,y,\theta)$ has a linear form. Although a linear function can become negative, the constraint $f(x_i, y_j, \theta_i) \geq 0$, ∀i can force the target distribution to be positive at all interest points. When the target distribution $f(x,y,\theta)$ has a linear form, the optimization routine for finding the target distribution may be simple. However, because the space of linear functions is limited, it may be difficult to find a linear function that satisfies all the constraints.

In some embodiments, the probe placement module 408 can assume that the target distribution $f(x,y,\theta)$ has a non-linear form. When the target distribution $f(x,y,\theta)$ has a non-linear form, the optimization routine for finding the target distribution may be complex. However, because the space of non-linear functions is wide, it may be easier to find a non-linear function that satisfies all the constraints.

In some embodiments, the TDC module 412 can set the target distribution $f(x,y,\theta)$ as an inverse of an interest point distribution $p_p(x,y,\theta|\text{parameter})$. In this case, the TDC module 412 can receive, from the FDC module 414, the interest point distribution $p_p(x,y,\theta)$, and indirectly determine the target distribution $f(x,y,\theta)$ by computing an inverse:

$$f(x, y, \theta) = \frac{1}{p_p(x, y, \theta)}.$$

When the target distribution $f(x,y,\theta)$ defined as an inverse of an interest point distribution $p_p(x,y,\theta)$, the target distribution $f(x,y,\theta)$ will cause more probes to be sampled at locations with interest points that are relatively dissimilar compared to rest of the interest points.

The FDC module 414 can model the interest point distribution $p_p(x,y,\theta)$ as a mixture model. In some embodiments, the mixture model can include a Gaussian Mixture Model (GMM):

$$p_p(x_i, y_i, \theta_i \mid \{\alpha_k, \overline{\mu}_k, \Sigma_k\}, k = 1, \ldots N) = \sum_{k=1\ldots N} \alpha_k N_{X,Y,\theta}(\overline{\mu}_k, \Sigma_k)$$

The GMM has four parameters: the number of Gaussian distributions N, the weight $\alpha_k$ of the $k^{th}$ Gaussian distribution, the mean vector $\overline{\mu}_k$ of the $k^{th}$ Gaussian distribution, and the covariance matrix $\Sigma_k$ of the $k^{th}$ Gaussian distribution. In other embodiments, the mixture model can include a mixtures of triangular distributions. The mixture of triangular distributions can be faster to calculate and can offer a similar desirable property of providing a soft grouping of interest points.

In some embodiments, the FDC module 414 can estimate the number of Gaussian distributions N for the GMM by clustering the interest points and determining the number of clusters that best fit the interest points. For example, the FDC module 414 can perform a k-means clustering operation on the interest points to estimate the number of Gaussian distributions N.

The remaining set of parameters $\{\alpha_k, \overline{\mu}_k, \Sigma_k\}$, k=1, ... N can be determined by maximizing the likelihood of parameters given the interest points. In some embodiments, the FDC module 414 can maximize the likelihood of the parameters given the interest points using an expectation-maximization technique. To perform expectation-maximization, the FDC module 414 can initialize the set of parameters $\{\alpha_k, \overline{\mu}_k, \Sigma_k\}$, k=1, . . . N using the result from the clustering step.

As discussed above, the TDC module 412 can determine the target distribution $f(x,y,\theta)$ by simply inverting the interest point distribution $p_p(x,y,\theta)$. However, this target distribution $f(x,y,\theta)$ may cause most of the probes to be placed on edges with the least common perpendicular orientations. For example, when a pattern is capable of making only 2D translational movements and the pattern has a rectangular boundary with rounded corners, this target distribution $f(x,y)$ may cause the PDM module 416 to sample the mostly around the corner locations.

To address such issues, in some embodiments, the TDC module 412 can transform the interest point distribution $p_p(x,y,\theta)$ and invert the transformed interest point distribution $\tilde{p}_p(x,y,\theta)$ to determine the target distribution $f(x,y,\theta)$. In "the first probe placement mechanism" described previously, this transformation takes the form of applying a smoothing kernel to $p_p(x,y,\theta)$.

In some cases, the TDC module 412 can determine the target distribution by transforming the interest point distribution in ways other than performing an inversion. One such embodiment transforms the interest point distribution $p_p(x_i, y_i, \theta_i \mid \{\alpha_k, \overline{\mu}_k, \Sigma_k\})$, k=1, . . . N) by finding new weights $\tilde{\alpha}_k$ that satisfy certain conditions. In estimating the set of parameters $\{\alpha_k, \overline{\mu}_k, \Sigma_k\}$, the TDC module 412 effectively performed a soft grouping of interest points (e.g., soft grouping into Gaussian distributions.) Now that the TDC module 412 has those groupings, the TDC module 412 can be configured to find the new weight $\tilde{\alpha}_k$ to re-weight each group (e.g., each Gaussian distribution) individually.

For example, the TDC module 412 can denote $$\overline{\mu}_k = \begin{bmatrix} \mu_k^{(x)} \\ \mu_k^{(y)} \\ \mu_k^{(\Theta)} \end{bmatrix}.$$

In this representation, the TDC module 412 can be configured to find the weights $\tilde{\alpha}_k$ that minimize the following relationship:

$$\left[\sum_{k=1,\ldots,N} \tilde{\alpha}_k (\mu_k^{(x)} - \mu_k^{(y)})\right]^2 + \left[\sum_{k=1,\ldots,N} \tilde{\alpha}_k (\mu_k^{(x)} - \mu_k^{(\Theta)})\right]^2 + \left[\sum_{k=1,\ldots,N} \tilde{\alpha}_k (\mu_k^{(y)} - \mu_k^{(\Theta)})\right]^2$$

with the constraint:

$$\sum_{k=1,\ldots,N} \tilde{\alpha}_k = 1$$

Using a Lagrange Multiplier, the TDC module 412 can reduce this problem as a set of linear equations:

$$2\tilde{\alpha}_k \left[(\mu_k^{(x)} - \mu_k^{(y)})^2 + (\mu_k^{(x)} - \mu_k^{(\Theta)})^2 + (\mu_k^{(y)} - \mu_k^{(\Theta)})^2\right] +$$
$$2\sum_{l \neq k} \tilde{\alpha}_l \left[(\mu_k^{(x)} - \mu_k^{(y)})(\mu_l^{(x)} - \mu_l^{(y)}) + (\mu_k^{(x)} - \mu_k^{(\Theta)})(\mu_l^{(x)} - \mu_l^{(\Theta)}) + (\mu_k^{(y)} - \mu_k^{(\Theta)})(\mu_l^{(y)} - \mu_l^{(\Theta)})\right] + \lambda = 0,$$

for $k = 1, \ldots, N$ and, $$\sum_{k=1,\ldots,N} \tilde{\alpha}_k - 1 = 0$$

The TDC module 412 could solve this set of linear equations with respect to $\tilde{\alpha}_k$, but the TDC module 412 is subject to additional constraints. The above set of linear equations does not prevent the transformed weights $\tilde{\alpha}_k$ from turning negative, or prevent a large weight $\tilde{\alpha}_k$ from being assigned to Gaussians that were estimated from small groups of interest points (e.g., whose original weights $\alpha_k$ in the interest point distribution $p_p(x,y,\theta)$ was small). The TDC module 412 can programmatically apply these constraints.

Also, the TDC module 412 is configured to impose the minimum probe distance between adjacent probes by requiring the transformed weight $\tilde{\alpha}_k$ to be greater than a predefined value:

$$\alpha_k \frac{N_{edges}}{N_{probes}} \times \frac{1}{d_{max}} \leq \tilde{\alpha}_k \leq \alpha_k \frac{N_{edges}}{N_{probes}}$$

where $\alpha_k$ is the weight of the $k^{th}$ Gaussian distribution in the interest point distribution $p_p(x,y,\theta)$; $N_{edges}$ is the number of interest points used to estimate the weights $\alpha_k$ in the interest point distribution $p_p(x,y,\theta)$; $N_{probes}$ is the target number of probes (e.g., 64); and $d_{max}$ is the maximum allowable distance between probes in units of interest points or any predetermined units. The above equation can be re-arranged as follows:

$$d_{max} \geq \frac{\alpha_k N_{edges}}{\tilde{\alpha}_k N_{probes}} \leq 1$$

This new relationship illustrates that the ratio of the number of edges to number of probes for mixture component k is bounded by $d_{max}$ units and 1 unit. Therefore, adjacent probes in cluster k can be placed no further apart than $d_{max}$ units and no closer than 1 unit.

When the set of linear equations produces a result with at least one weight $\alpha_k$ violating a constraint, the TDC module 412 can iterate over all possible combinations of boundary cases, calculate the optimal remaining weights, and select the constrained minimum.

For example, the TDC module 412 can determine all possible sets of boundary conditions (e.g., $\{\alpha_0^{low}\}$, $\{\alpha_0^{high}\}$, $\{\alpha_0^{low}, \alpha_1^{low}\}$, $\{\alpha_0^{high}, \alpha_1^{low}\}$, ...) for the linear equations. Each set of boundary conditions may include boundary conditions for a subset of transformed weights $\widetilde{\alpha_k}$. Subsequently, for each set of boundary conditions, the TDC module 412 can fix the value of a subset of weights $\widetilde{\alpha_k}$ to be the value of the corresponding boundary conditions, and solve the set of linear equations for the remaining free weights $\widetilde{\alpha_k}$ without boundary conditions. This way, the TDC module 412 can determine the global solution to the set of linear equations given the constraints by selecting, amongst the solutions under all possible sets of boundary conditions, the solution with the minimum score.

In some cases, when the number of Gaussian distributions in the GMM is greater than the number of dimensions in which the interest points lie, some of the parameters in the GMM may be linearly dependent. For example, mean vectors of Gaussian distributions may become linearly dependent when the number of Gaussian distributions is greater than the number of dimensions in which the interest points lie.

To address this issue, the TDC module 412 can be configured to regularize the parameters for the GMM, for example, using Tikhonov regularization. To this end, the TDC module 412 can reformulate the optimization problem to minimize the following relationship:

$$\left[\sum_{k=1,\ldots,N}(\widetilde{\alpha_k}-\alpha_k)^2\right]+\lambda_0\sum_{k=1,\ldots,N}\widetilde{\alpha_k}(\mu_k^{(x)}-\mu_k^{(y)})+$$
$$\lambda_1\sum_{k=1,\ldots,N}\widetilde{\alpha_k}(\mu_k^{(x)}-\mu_k^{(\Theta)})+\phi\left[\left(\sum_{k=1,\ldots,N}\widetilde{\alpha_k}\right)-1\right]$$

The new Lagrangian formulation seeks to quantify the change in transformed weights $\widetilde{\alpha_k}$ between the interest point distribution $p_p(x,y,\theta)$ and the target distribution $\widetilde{p_p}(x,y,\theta)$, subject to the constraints that the $(x,y,\theta)$ components of the mean vectors are balanced and the sum of the transformed weights is 1.

The TDC module 412 could directly find the weights that satisfy the Lagrangian relationship stated above. However, as before, this relationship does not prevent the weights $\widetilde{\alpha_k}$ from turning negative, or prevent a large weight $\widetilde{\alpha_k}$ from being assigned to Gaussians that were estimated from small groups of interest points (e.g., whose original weights $\alpha_k$ in the interest point distribution $p_p(x,y,\theta)$ was small). The TDC module 412 can programmatically apply these constraints, as illustrated above. This is mathematically valid because the above Lagrangian relationship is quadratic in $\widetilde{\alpha_k}$, so if one of the weights $\widetilde{\alpha_k}$ is negative, then the optimal value should lie on one (or more) of the boundary conditions.

In summary, in order to identify parameters for the target distribution $\widetilde{p_p}(x,y,\theta)$ based on parameters of the interest point distribution $p_p(x,y,\theta)$, the TDC module 412 can use the following procedure:
1. Define $\delta_k^{(xy)}=\mu_k^{(x)}-\mu_k^{(y)}$, $\delta_k^{(x\theta)}=\mu_k^{(x)}-\mu_k^{(\Theta)}$ and $\delta_k^{(y\theta)}=\mu_k^{(y)}-\mu_k^{(\Theta)}$.

2. If $N<=N_{Dim}$, where $N_{Dim}$ is the dimension of the underlying data, use the following equation to solve for $\alpha_k$, $\{k=1\ldots N\}$:

$$\begin{bmatrix} 2(\delta_1^{(xy)2}+\delta_1^{(x\theta)2}+\delta_1^{(y\theta)2}) & \cdots & 2(\delta_1^{(xy)}\delta_k^{(xy)}+\delta_1^{(x\theta)}\delta_k^{(x\theta)}+\delta_1^{(y\theta)}\delta_k^{(y\theta)}) & \cdots & 2(\delta_1^{(xy)}\delta_N^{(xy)}+\delta_1^{(x\theta)}\delta_N^{(x\theta)}+\delta_1^{(y\theta)}\delta_N^{(y\theta)}) & 1 \\ \vdots & \vdots & \vdots & \vdots & \vdots & \vdots \\ 2(\delta_k^{(xy)}\delta_1^{(xy)}+\delta_k^{(x\theta)}\delta_1^{(x\theta)}+\delta_k^{(y\theta)}\delta_1^{(y\theta)}) & \cdots & 2(\delta_k^{(xy)2}+\delta_k^{(x\theta)2}+\delta_k^{(y\theta)2}) & \cdots & 2(\delta_k^{(xy)}\delta_N^{(xy)}+\delta_k^{(x\theta)}\delta_N^{(x\theta)}+\delta_k^{(y\theta)}\delta_N^{(y\theta)}) & 1 \\ \vdots & \vdots & \vdots & \vdots & \vdots & \vdots \\ 2(\delta_N^{(xy)}\delta_1^{(xy)}+\delta_N^{(x\theta)}\delta_1^{(x\theta)}+\delta_N^{(y\theta)}\delta_1^{(y\theta)}) & \cdots & 2(\delta_N^{(xy)}\delta_k^{(xy)}+\delta_N^{(x\theta)}\delta_k^{(x\theta)}+\delta_N^{(y\theta)}\delta_k^{(y\theta)}) & \cdots & 2(\delta_N^{(xy)2}+\delta_N^{(x\theta)2}+\delta_N^{(y\theta)2}) & 1 \\ 1 & \cdots & 1 & \cdots & 1 & 0 \end{bmatrix} \begin{bmatrix} \widetilde{\alpha_1} \\ \vdots \\ \widetilde{\alpha_k} \\ \vdots \\ \widetilde{\alpha_N} \\ \lambda \end{bmatrix} = \begin{bmatrix} 0 \\ 0 \\ 0 \\ 0 \\ 0 \\ 1 \end{bmatrix}$$

If this system is singular, the TDC module 412 can use regularization to solve this system. For example, if the TDC module 412 attempts to solve the matrix equation: $\overline{\overline{A}}\overline{A}=\overline{b}$ but $\overline{\overline{A}}$ is singular, then the TDC module 412 can instead solve $[\overline{\overline{A}}^T\overline{\overline{A}}-kI]\overline{A}=\overline{\overline{A}}^T\overline{b}$. This way, the TDC module 412 can minimize the sum of $L_2$-norm of the solution vector, which, in turn, can prevent solutions with large positive and negative $\alpha_k$'s (summing to unity).

3. If $N>N_{Dim}$, use the following equation to solve for $\alpha_k$, $\{k=1\ldots N\}$:

$$\begin{bmatrix} 2 & \cdots & 0 & \cdots & 0 & \delta_1^{(xy)} & \delta_1^{(x\theta)} & 1 \\ \vdots & \ddots & \vdots & \cdots & \vdots & \vdots & \vdots & \vdots \\ 0 & \cdots & 2 & \cdots & 0 & \delta_k^{(xy)} & \delta_k^{(x\theta)} & 1 \\ \vdots & \cdots & \vdots & \ddots & \vdots & \vdots & \vdots & \vdots \\ 0 & \cdots & 0 & \cdots & 2 & \delta_N^{(xy)} & \delta_N^{(x\theta)} & 1 \\ \delta_1^{(xy)} & \cdots & \delta_k^{(xy)} & \cdots & \delta_N^{(xy)} & 0 & 0 & 0 \\ \delta_1^{(x\theta)} & \cdots & \delta_k^{(x\theta)} & \cdots & \delta_N^{(x\theta)} & 0 & 0 & 0 \\ 1 & \cdots & 1 & \cdots & 1 & 0 & 0 & 0 \end{bmatrix} \begin{bmatrix} \widetilde{\alpha_1} \\ \vdots \\ \widetilde{\alpha_k} \\ \vdots \\ \widetilde{\alpha_N} \\ \lambda_0 \\ \lambda_1 \\ \phi \end{bmatrix} = \begin{bmatrix} 2\alpha_1 \\ \vdots \\ 2\alpha_k \\ \vdots \\ 2\alpha_N \\ 0 \\ 0 \\ 1 \end{bmatrix}$$

4. Check the solution of step 2 or step 3 against the constraints:

$$\alpha_k \frac{N_{edges}}{N_{probes}} \times \frac{1}{d_{max}} \leq \widetilde{\alpha_k} \leq \alpha_k \frac{N_{edges}}{N_{probes}}$$

5. If the solution falls outside the valid range of weights $\widetilde{\alpha_k}$, then for all possible sets of boundary conditions (e.g., constraints), use modified versions of steps 2 or 3 to find solution vectors for non-constrained $\widetilde{\alpha_k}$. Throughout the search, the TDC module 412 can keep track of the minimum values of, $$\left[\sum_{k=1,\dots,N}\widetilde{\alpha_k}(\mu_k^{(x)}-\mu_k^{(y)})\right]^2+$$

$$\left[\sum_{k=1,\dots,N}\widetilde{\alpha_k}(\mu_k^{(x)}-\mu_k^{(\Theta)})\right]^2+\left[\sum_{k=1,\dots,N}\widetilde{\alpha_k}(\mu_k^{(y)}-\mu_k^{(\Theta)})\right]^2$$

and $\left[\sum_{k=1,\dots,N}(\widetilde{\alpha_k}-\alpha_k)\right]^2$.

If the former relationship is greater than zero, then the TDC module 412 can use the former relationship to select the solution vector for $\widetilde{\alpha_k}$. If the former relationship is not greater than zero, the TDC module 412 can use the latter relationship to select the solution vector for $\widetilde{\alpha_k}$.

Sampling of Probes from Target Distribution

Once the TDC module 412 determines the transformed interest point distribution $\widetilde{p_p}(x,y,\theta)$, the TDC module 412 can provide the transformed interest point distribution $\widetilde{p_p}(x,y,\theta)$ (or an inverse of the transformed interest point distribution) to the PDM module 416. Subsequently, the PDM module 416 can sample from the inverse of the transformed interest point distribution $\widetilde{p_p}(x,y,\theta)$ to determine the location of probes one or more interest points in an image.

Intuitively speaking, the TDC module 412 is configured to choose the transformed interest point distribution $\widetilde{p_p}(x,y,\theta)$ such that the expected value of x, y and θ with respect to the transformed interest point distribution $\widetilde{p_p}(x,y,\theta)$ are as similar as possible:

$$\int_{s\in S_{probes}} x\widetilde{p_p}\left(x,y,\theta\middle|\left\{\widetilde{\alpha_k},\overline{\mu}_k,\sum_k\right\},k=1\dots N\right)\cong$$

$$\int_{s\in S_{probes}} y\widetilde{p_p}\left(x,y,\theta\middle|\left\{\widetilde{\alpha_k},\overline{\mu}_k,\sum_k\right\},k=1\dots N\right)\cong$$

$$\int_{s\in S_{probes}} \theta\widetilde{p_p}\left(x,y,\theta\middle|\left\{\widetilde{\alpha_k},\overline{\mu}_k,\sum_k\right\},k=1\dots N\right)$$

Importance sampling allows the PDM module 416 to draw samples from a target distribution by weighting samples drawn from another different distribution with the condition that the samples have similar support. In other words:

$$\overline{x}\cong\sum_{s\in S_{probes}}x_s\,\widetilde{p_p}\left(x_s,y_s,\theta_s\middle|\left\{\widetilde{\alpha_k},\overline{\mu}_k,\sum_k\right\},k=1\dots N\right)\cong$$

$$\sum_{s\in S_{i,p.}}x_s\frac{\widetilde{p_p}\left(x_s,y_s,\theta_s\middle|\left\{\widetilde{\alpha_k},\overline{\mu}_k,\sum_k\right\},k=1\dots N\right)}{p_p\left(x_s,y_s,\theta_s\middle|\left\{\widetilde{\alpha_k},\overline{\mu}_k,\sum_k\right\},k=1\dots N\right)}$$

$$p_p\left(x_s,y_s,\theta_s\middle|\left\{\widetilde{\alpha_k},\overline{\mu}_k,\sum_k\right\},k=1\dots N\right)$$

where $S_{probes}$ is the set of probes and $S_{IP}$ is a set of interest points. Therefore, the PDM module 416 can use this relationship to weigh samples drawn from the interest point distribution $p_p(s|\{\alpha_k,\overline{\mu}_k,\Sigma_k\}$, k=1 ... N) by:

$$\frac{\widetilde{p_p}\left(x,y,\theta\middle|\left\{\widetilde{\alpha_k},\overline{\mu}_k,\sum_k\right\},k=1\dots N\right)}{p_p\left(x,y,\theta\middle|\left\{\alpha_k,\overline{\mu}_k,\sum_k\right\},k=1\dots N\right)}$$

Thus, when the PDM module 416 draws probes by placing probes at every interest point along a boundary of a pattern, then the PDM module 416 can weigh the probes by the above ratio $$\frac{\widetilde{p_p}\left(x,y,\theta\middle|\left\{\widetilde{\alpha_k},\overline{\mu}_k,\sum_k\right\},k=1\dots N\right)}{p_p\left(x,y,\theta\middle|\left\{\alpha_k,\overline{\mu}_k,\sum_k\right\},k=1\dots N\right)}.$$

In some embodiments, the PDM module 416 can achieve similar effects by (1) spacing out adjacent probes by a distance that is the inverse of the above ratio along the pattern boundary and (2) compensating for the desired number of probes and the number of initial edges.

Therefore, in some embodiments, sampling from the inverse of the transformed interest point distribution $\widetilde{p_p}(x,y,\theta|\{\widetilde{\alpha_k},\overline{\mu}_k,\Sigma_k\}$, k=1 ... N) can be equivalent to requiring adjacent probes to be spaced out by the following amount:

$$\text{spacing}=\frac{p_p\left(x,y,\theta\middle|\left\{\alpha_k,\overline{\mu}_k,\sum_k\right\},k=1\dots N\right)}{\widetilde{p_p}\left(x,y,\theta\middle|\left\{\widetilde{\alpha_k},\overline{\mu}_k,\sum_k\right\},k=1\dots N\right)}\times\frac{N_{edges}}{N_{probes}}$$

where $N_{edges}$ indicates a number of interest points used to determine parameters for the interest point distribution $p_p(x,y,\theta|\{\alpha_k,\overline{\mu}_k,\Sigma_k\}$, k=1 ... N), and $N_{probes}$ indicates a target number of probes. This way, the density of probes along under-represented interest points can be increased.

To require the adjacent probes to be spaced out as such, the PDM module 416 can place probes on one or more interest points sequentially. For example, the PDM module 416 starts at an initial interest point (which may be arbitrarily selected) and place a first probe at the initial interest point. Then the PDM module 416 can use the relationship above to determine the distance between the first probe and a second probe to be placed adjacent to the first probe. Subsequently, the PDM module 416 can place the second probe at an interest point that is separated by the determined distance from the first probe. This process can be iterated until the PDM module 416 has considered all the plurality of interest points used in determining the interest point distribution $p_p(x,y,\theta|\{\alpha_k,\overline{\mu}_k,\Sigma_k\}$, k=1 ... N).

Requiring adjacent probes to be spaced out by a certain amount can be interpreted as modifying (e.g., stretching) the arc length of adjacent interest points. As described previously, an interest point can be considered a representation of an initialized probe placed at the center of the interest point. Therefore, requiring adjacent probes to be spaced out by a certain amount can be interpreted as modifying the arc length between the centers of adjacent interest points. Thus, the first mechanism for placing probes (illustrated in regards to FIGS. 5-10) and the second mechanism for placing probes (illustrated in regards to FIGS. 11-12) have similar consequences.

While much of the discussion herein focused on a case in which the probability space spanned by the mixture model included a x-directional component, a y-directional component, and a rotational vector, the disclosed technique can be extended to increase the dimensionality of the probability space spanned by the mixture model. For example, the probe placement module 408 can be configured to balance information in a four-dimensional space:

$$\bar{\mu}_k = \begin{bmatrix} \mu_k^{(x)} \\ \mu_k^{(y)} \\ \mu_k^{(\Theta)} \\ \mu_k^{(\phi)} \end{bmatrix},$$

where φ denotes scale. While the optimization step may be a bit more complicated, the probe placement module 408 can employ the same technique as in the three-dimensional space scenario. For example, the probe placement module 408 can be configured to minimize:

$$\left[\sum_{k=1...N} \widetilde{\alpha_k}(\mu_k^{(x)} - \mu_k^{(y)})\right]^2 + \left[\sum_{k=1...N} \widetilde{\alpha_k}(\mu_k^{(x)} - \mu_k^{(\Theta)})\right]^2 +$$
$$\left[\sum_{k=1...N} \widetilde{\alpha_k}(\mu_k^{(x)} - \mu_k^{(\phi)})\right]^2 + \left[\sum_{k=1...N} \widetilde{\alpha_k}(\mu_k^{(y)} - \mu_k^{(\Theta)})\right]^2 +$$
$$\left[\sum_{k=1...N} \widetilde{\alpha_k}(\mu_k^{(y)} - \mu_k^{(\phi)})\right]^2 + \left[\sum_{k=1...N} \widetilde{\alpha_k}(\mu_k^{(\Theta)} - \mu_k^{(\phi)})\right]^2$$

with the constraint:

$$\sum_{k=1...N} \widetilde{\alpha_k} = 1$$

using a Lagrange multiplier to reduce to a set of linear equations (as before). The probe placement module 408 can be configured to ensure that the weights $\widetilde{\alpha_k}$ do not become negative or cause the probes to be highly concentrated on a few edge locations. To this end, as in the three-dimensional space scenario, the probe placement module 408 can be configured to apply boundary constraints programmatically.

As in the three-dimensional space scenario, the probe placement module 408 can apply Tikhonov regularization when the mean vector set is not linearly independent and when the number of components in the mixture model (N) exceeds the number of dimension (now 4):

$$\left[\sum_{k=1,N}(\widetilde{\alpha_k} - \alpha_k)^2\right] + \lambda_0 \sum_{k=1...N} \widetilde{\alpha_k}(\mu_k^{(x)} - \mu_k^{(y)}) +$$
$$\lambda_1 \sum_{k=1...N} \widetilde{\alpha_k}(\mu_k^{(x)} - \mu_k^{(\Theta)}) + \lambda_2 \sum_{k=1...N} \widetilde{\alpha_k}(\mu_k^{(x)} - \mu_k^{(\phi)}) + \phi\left[\left(\sum_{k=1...N} \widetilde{\alpha_k}\right) - 1\right]$$

FIG. 13 summarizes the process of sampling probes on one or more interest points of a pattern in accordance with some embodiments. In FIG. 13, the probe placement module 408 represents the target distribution as a parametric distribution. However, one of skill in the art can modify the process of FIG. 13 to accommodate a case in which the probe placement module 408 represents the target distribution as a non-parametric distribution.

In step 1302, the IPD module 406 can determine interest points in an image. In some cases, the IPD module 406 can use an edge detection technique to identify the interest points. The edge detection technique can include, for example, a canny edge detection technique or a Hough transform technique. The edge detection technique can use one or more edge detection operators, including, for example, a Sobel operator, a Kirsch operator, a Prewitt operator, a Gabor filter, a Haar wavelet filter, any other filters that can detect a change in a pixel value in an image (e.g., a high frequency component of an image), and/or any combinations thereof.

In some embodiments, the IPD module 406 can provide the location information of interest points to the FDC module 414. The FDC module 414 can represent each interest point using variables that represent the degrees of freedom associated with the interest point. For example, when an interest point is known to move in two dimensions, an interest point can be represented as a two dimensional vector corresponding to (x,y) gradient components of the interest point. As another example, when an interest point is known to move in three dimensions, an interest point can be represented as a three dimensional vector corresponding to (x,y) gradient components of the interest point and a rotational orientation of the interest point (or a function thereof).

In step 1304, the FDC module 414 can be configured to cluster the interest points. For example, the FDC module 414 can cluster the interest points by clustering interest points that are close to one another in the Euclidian distance in their representations. In some embodiments, the FDC module 414 can use k-means clustering technique, a mean-shift clustering technique, a "balanced iterative reducing and clustering using hierarchies" (BIRCH) clustering technique, or any other suitable clustering techniques that are capable of grouping interest points with similar characteristics.

In step 1306, the FDC module 414 can determine the interest point distribution based on the clusters from step 1304. For example, the FDC module 414 can be configured to represent the interest point distribution using a Gaussian Mixture Model. In this case, the FDC module 414 can be configured to determine the number of Gaussian distributions for the Gaussian Mixture Model using the number of clusters from the cluster step. Also, the FDC module 414 can be configured to perform an expectation-maximization operation to determine the maximum likelihood estimates of the set of parameters for the Gaussian Mixture Model. This way, the FDC module 414 can determine the interest point distribution $p_p(x,y,\theta|\{\alpha_k,\bar{\mu}_k,\Sigma_k\}$, k=1 . . . N). The FDC module 414 can provide the interest point distribution $p_p(x, y,\theta|\{\alpha_k,\bar{\mu}_k,\Sigma_k\}$, k=1 . . . N) to the TDC module 412.

In step 1308, the TDC module 412 can determine the transformed interest point distribution $\tilde{p}_p(x,y,\theta|\{\widetilde{\alpha_k},\bar{\mu}_k,\Sigma_k\}$, k=1 . . . N) from the interest point distribution $p_p(x,y,\theta|\{\alpha_k,\bar{\mu}_k,\Sigma_k\}$, k=1 . . . N). To this end, the TDC module 412 can perform constrained optimization, as discussed above, to re-calculate the transformed weights $\widetilde{\alpha_k}$ for the transformed interest point distribution. In some cases, the TDC module 412 can compute the target probe distribution by inverting the transformed interest point distribution $\tilde{p}_p(x,y,\theta|\{\widetilde{\alpha_k},\bar{\mu}_k,\Sigma_k\}$, k=1 . . . N). Subsequently, the TDC module 412 can provide the transformed interest point distribution (or the inverse of the transformed interest point distribution) to the PDM module 416.

In step 1310, the PDM module 416 is configured to sample the target distribution (e.g., the inverse of the transformed interest point distribution) to determine the location of probes on one or more interest points. In some cases, the PDM module 416 can use the following relationship to determine the spacing between two adjacent probes:

$$\text{spacing} = \frac{p_p\left(x, y, \theta \middle| \left\{\alpha_k, \overline{\mu}_k, \sum_k\right\}, k = 1 \ldots N\right)}{\widetilde{p_p}\left(x, y, \theta \middle| \left\{\widetilde{\alpha_k}, \overline{\mu}_k, \sum_k\right\}, k = 1 \ldots N\right)} \times \frac{N_{edges}}{N_{probes}}$$

The PDM module 416 can use the above relationship to determine or modify the distance between centers of all adjacent interest points (or between centers of a subset of adjacent interest points).

Figures 14A, 14B:
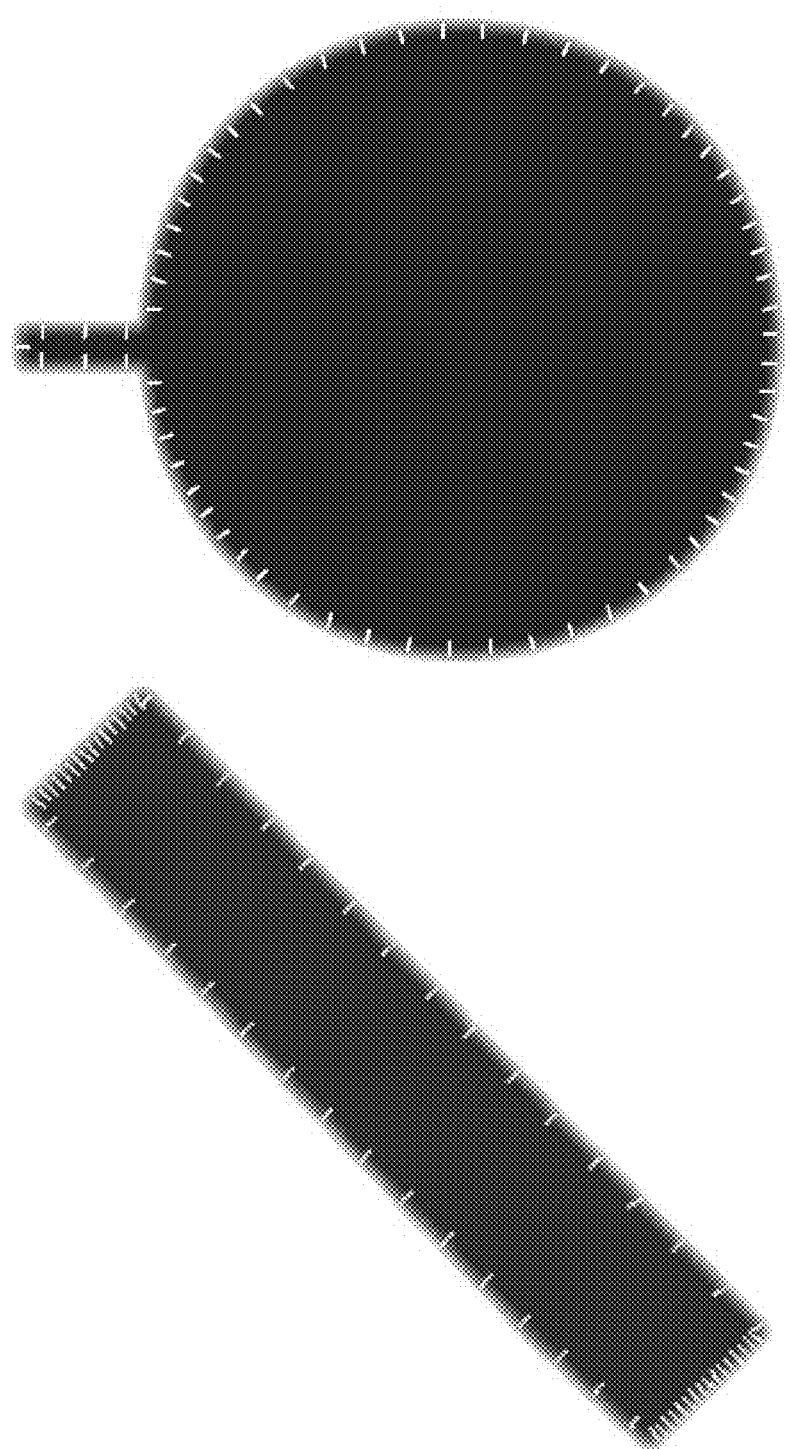
FIG. 14A illustrates placement of probes on a rectangle using the process illustrated in FIG. 13 in accordance with some embodiments.
FIG. 14B illustrates placement of probes on a circular object having a lever arm using the process illustrated in FIG. 13 in accordance with some embodiments.

FIG. 14A illustrates placement of probes on a rectangle using the process illustrated in FIG. 13 in accordance with some embodiments. The rectangle is assumed to have two degrees of freedom (e.g., the rectangle is assumed to make only translational movements). In this case, the PDM module 416 increased the density of probes along the short edge of the rectangle compared to the long edge of the rectangle. This outcome is similar to the result of balancing the histogram of perpendicular orientations, as discussed in regards to FIGS. 5-10.

FIG. 14B illustrates placement of probes on a circular object having a lever arm using the process illustrated in FIG. 13 in accordance with some embodiments. The pattern is assumed to have two degrees of freedom (e.g., the pattern is assumed to make only translational movements.) In this case, the PDM module 416 compensates for the extra x-directional probes on the lever arm by increasing slightly more y-directional probes on the circle.

Figures 15A, 15B:
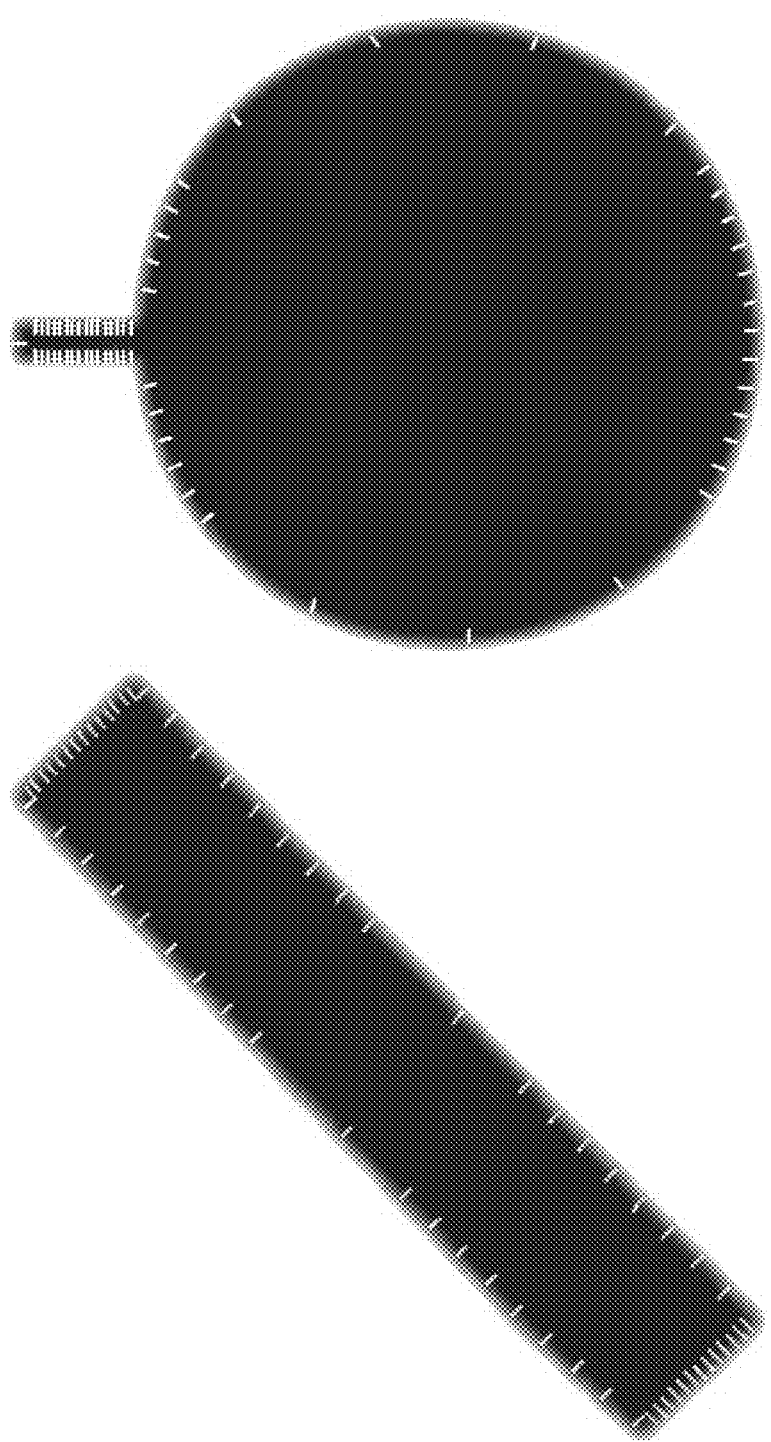
FIG. 15A illustrates placement of probes on a rectangle using the process illustrated in FIG. 13 in accordance with some embodiments.
FIG. 15B illustrates placement of probes on a circular object having a lever arm using the process illustrated in FIG. 13 in accordance with some embodiments.

FIG. 15A illustrates placement of probes on a rectangle using the process illustrated in FIG. 13 in accordance with some embodiments. The rectangle is assumed to have three degrees of freedom (e.g., the rectangle is assumed to make translational movements and a rotational movement.) and the rotational vector is given by $$\theta_i = \frac{\|v_i\| \times \overline{u}_i^{(\theta)} \cdot \overline{d}_i}{\frac{1}{N}\sum_{i=0}^{N}\|v_i\|}.$$

In this case, the PDM module 416 increased the density of probes along the short edge of the rectangle compared to the long edge of the rectangle, as in FIG. 14A. However, the PDM module 416 also modified the distance of probes along the long edge, increasing the number of probes further away from the origin of the rectangle (e.g., the center of mass of the rectangle). This is because the rotational variable θ was dependent on the distance between the origin of the rectangle and the probe.

FIG. 15B illustrates placement of probes on a circular object having a lever arm using the process illustrated in FIG. 13 in accordance with some embodiments. The pattern is assumed to have three degrees of freedom (e.g., the pattern is assumed to make translational movements and a rotational movement). In this case, the PDM module 416 increased the density of probes along the lever because the rotational variable θ was dependent on the distance between the origin of the rectangle and the probe. However, the PDM module 416 decreased the number of probes placed around the circular boundary. In particular, the PDM module 416 decreased the number of probes along the boundary close to the horizontal axis. In this case, the lever arm edges include all the rotational degree of freedom alignment information and thus are given many more probes. These probes are also useful for aligning in the x-direction but completely lack y-directional information. Therefore, the PDM module 416 adds more probes to the top and bottom than the left and right sides of the circle to introduce y-directional information to the model.

Figures 16A, 16B:
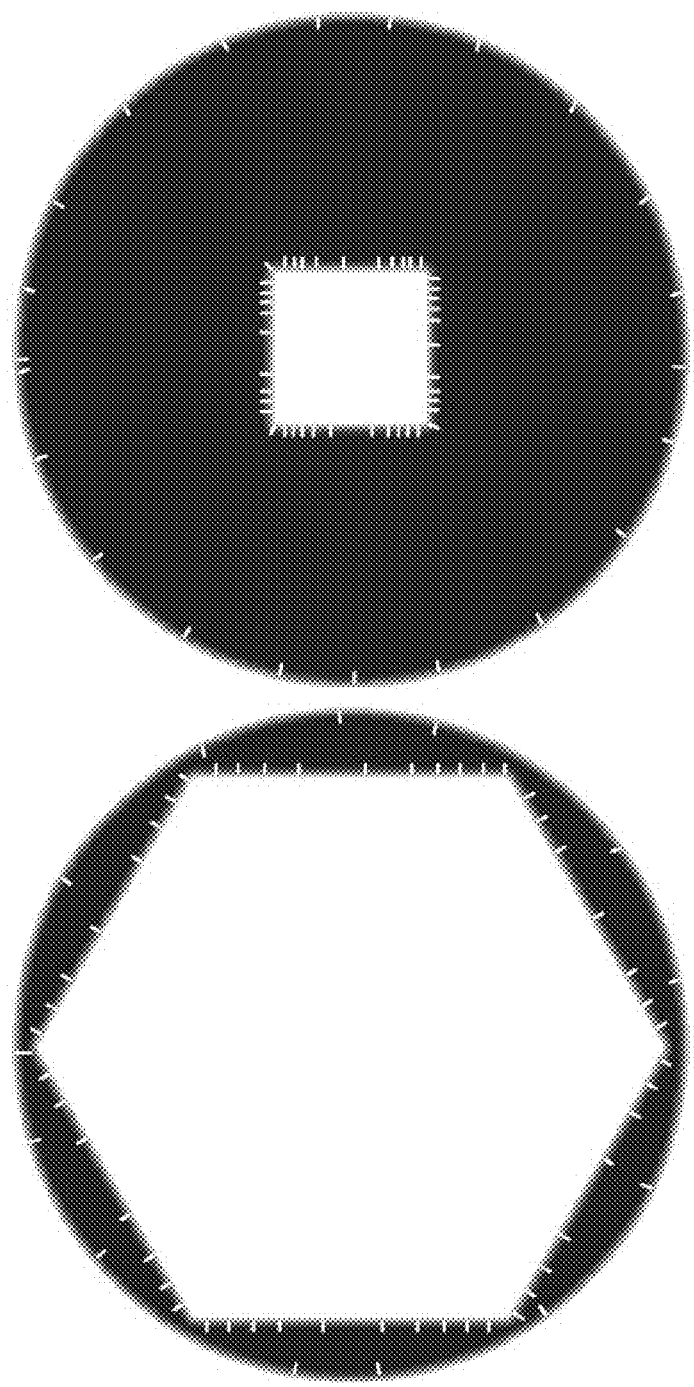
FIGS. 16A-16B illustrate placement of probes on patterns with a hole using the process illustrated in FIG. 13 in accordance with some embodiments.

FIGS. 16A-16B illustrate placement of probes on patterns with a hole using the process illustrated in FIG. 13 in accordance with some embodiments. When a boundary is wholly inside another boundary (e.g., concentric circles or a nut inside another nut), the probe placement module 408 can control whether one of the boundaries should be given more preference for placing probes, and if so, which one of the boundaries should be given more preference. In some embodiments, the probe placement module 408 can encode such a preference in the rotational variable θ.

FIGS. 17A-17C illustrate how the representation of the rotational variable θ changes the probe placement in accordance with some embodiments. FIG. 17A corresponds to probe placement when the rotational variable θ is independent of the norm of the positional vector $$\|v_i\|: \theta_i = \frac{\|v_i \cdot u_{\theta_i}\|}{\|v_i\|};$$

FIG. 17B corresponds to probe placement when the rotational variable θ is dependent on the norm of the positional vector $\|v_i\|$ as follows:

$$\theta_i = \frac{\|v_i\| \times \overline{u}_i^{(\theta)} \cdot \overline{d}_i}{\frac{1}{N}\sum_{i=0}^{N}\|v_i\|},$$

which incorporates radius in a linear fashion to model a quantity that could be thought of as angular momentum; and FIG. 17C corresponds to probe placement when the rotational variable θ is dependent on the norm of the positional vector $\|v_i\|$ as follows:

$$\theta_i = \frac{\|v_i\|^2 \times \overline{u}_i^{(\theta)} \cdot \overline{d}_i}{\frac{1}{N}\sum_{i=0}^{N}\|v_i\|^2},$$

which uses the square to form a quantity akin to angular moment of inertia. Depending on the application, one of these formulations can be more preferable. The increase in order of the radius term tends to push the probes whose angular component is highest to the outermost regions of the pattern. This has implications when picking a spacing over which to apply the probes when searching for the pattern in an image. It also has implications to the angular alignment accuracy.

Figures 18A, 18B:
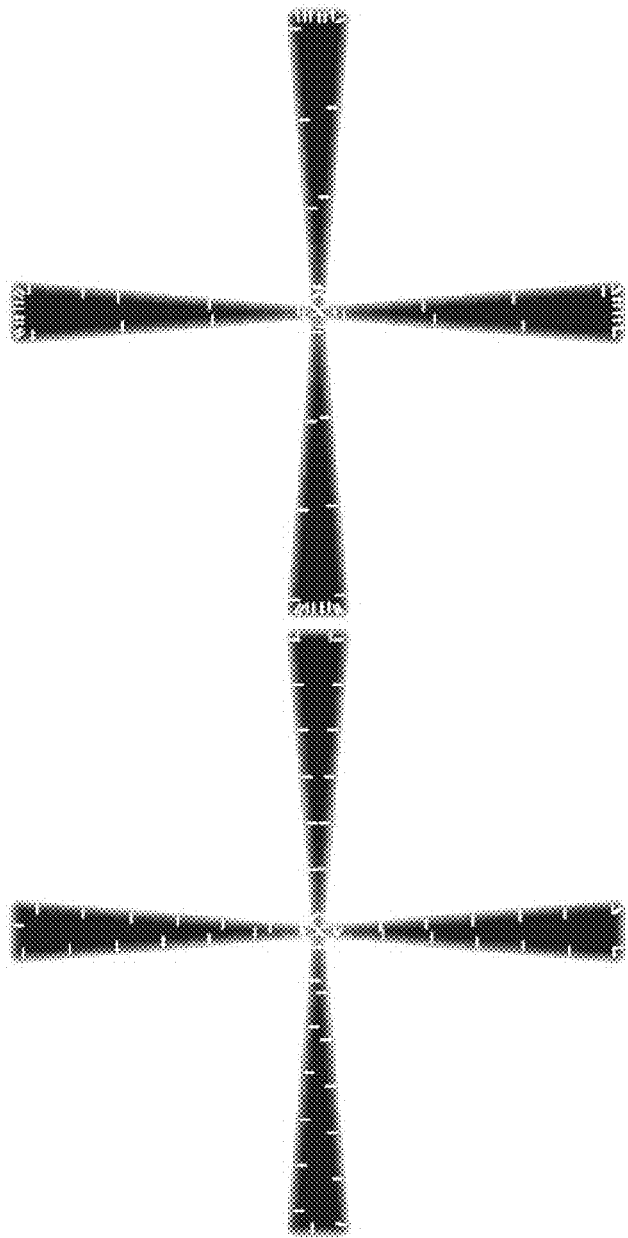
FIGS. 18A-18B illustrate placement of probes on patterns with elongated arms using the process illustrated in FIG. 13 in accordance with some embodiments.

FIGS. 18A-18B illustrate placement of probes on patterns with elongated arms using the process illustrated in FIG. 13 in accordance with some embodiments. In FIG. 18A, the probe placement module 408 assumes that the pattern has three degrees of freedom (e.g., the pattern is assumed to make translational movements and a rotational movement);

in FIG. 18B, the probe placement module 408 assumes that the pattern has four degrees of freedom (e.g., the pattern is assumed to make translational movements, a rotational movement, and a movement towards/away from the imaging device).

These figures illustrate an interesting case because the four Gaussian distributions in the interest point distribution have dependent mean vectors:

$$\mu_0 \cong \begin{bmatrix} 1 \\ 0 \\ 0 \\ 1 \end{bmatrix}, \mu_1 \cong \begin{bmatrix} 0 \\ 1 \\ 0 \\ 1 \end{bmatrix}, \mu_2 \cong \begin{bmatrix} 0 \\ 1 \\ 1 \\ 0 \end{bmatrix}, \mu_3 \cong \begin{bmatrix} 1 \\ 0 \\ 1 \\ 0 \end{bmatrix}.$$

In this case, the unregularized optimization can provide a solution in which the weights may have large values (e.g., $\alpha_0 \cong +$large, $\alpha_1 \cong -$large, $\alpha_2 \cong +$large $\alpha_3 \cong -$large,) but can add up to one. To address such singularities, the TDC module 412 can regularize the optimization problem.

The probe placement module 408 can be used in a variety of applications. For example, the probe placement module 408 can be useful in aligning and inspecting patterns, such as electronic devices. Also, the probe placement module 408 can be useful in robot guidance. For example, when a robot is configured to pick up a long, skinny battery, the probe placement module 408 can be configured to place probes to improve the accuracy of the model representing the skinny battery.

A machine vision system can also be configured to determine the absence or presence of one or more instances of a predetermined pattern in a 3D image, and determine the location of each found instance. This information can be used in subsequent inspection (or other) operations to search for defects and/or perform other operations, such as part rejection.

3D images are acquired using 3D cameras which may be based on a variety of technologies—for example, a laser displacement sensor (profiler), a stereoscopic camera, a sonar, laser or LIDAR range-finding camera, and a variety of other passive or active range-sensing technologies. Such cameras can produce a range image wherein an array of image pixels (typically characterized as positions along orthogonal x and y axes) is produced that also contain a third (height) dimension for each pixel (typically characterized along a z axis perpendicular to the x-y plane). Alternatively, for example, such cameras can generate a point cloud representation of an imaged object. A point cloud is a collection of 3D points in space where each point i can, for example, be represented as $(x_i, y_i, z_i)$. A point cloud can represent a complete 3D object including the object's back and sides, top and bottom. 3D points $(x_i, y_i, z_i)$ can represent locations in space where the object is visible to the camera. In this representation, empty space can be represented by the absence of points.

By way of comparison, in some embodiments, a 3D range image representation Z(x,y) is analogous to a 2D image representation I(x,y) where the depth or height Z replaces what would be the brightness/intensity I at a location (x,y) in an image. In some embodiments, a range image can exclusively represent the front face of an object that is directly facing a camera, because only a single depth is associated with any point location (x,y). The range image typically does not represent an object's back or sides, top or bottom, although in some embodiments in can represent an object's back or sides, top or bottom. A range image typically has data at every location (x,y) even if the camera is free of information at such locations, however it is also possible to represent the absence of data at any point location (x,y). It is possible to convert a range image to a 3D point cloud in a manner clear to those of skill in the art.

To determine the absence or presence of one or more instances of a predetermined 3D pattern in a 3D image, a machine vision system can represent the 3D pattern to be found using a model. The machine vision system can generate a model for a 3D pattern from one or more 3D training images or one or more synthesized 3D images from a geometric description that contain examples of the 3D pattern to be located and/or inspected. Once the model is available, the machine vision system can compare the model to a test 3D image at each of an appropriate set of poses, compute a match score at each pose, and determine candidate poses that correspond to a local maximum in match score. The machine vision system can consider candidate poses whose match scores are above a suitable threshold to be instances of the 3D pattern in the 3D image.

The process of locating 3D patterns occurs within a multidimensional space that can include, but is not limited to, x-y-z position (also called translational), location, orientation, size, and/or rotational degrees of freedom (e.g., pitch, roll, and yaw).

A model can include a set of data elements called 3D probes. Each 3D probe represents a relative position at which certain measurements and tests are to be made in a 3D image at a given pose, each such test contributing evidence that the 3D pattern exists at the associated pose. A 3D probe can be placed in a manner substantially normal to a structure (e.g., surface) of the underlying 3D pattern.

During the training stage, machine vision systems can place the 3D probes on the surface of a 3D pattern in a uniform manner. For example, in some embodiments a machine vision system can be configured to place 3D probes on the 3D pattern surface so that the distance between adjacent 3D probes is roughly identical for all pairs of adjacent 3D probes. This strategy, which is herein referred to as a "uniform placement strategy," can be effective in modeling 3D patterns with a balanced orientation profile (e.g., a 3D pattern with orthogonal surfaces and the proportions of the surfaces pointing to various orientations are similar). For example, the uniform placement strategy can be useful in modeling cubic 3D patterns because the number of 3D probes pointing to different orientations (e.g., up, down, left, and right) is roughly the same on each edge of the 3D pattern in the 3D image, which can lead to accurate information on the location and orientation of the 3D pattern.

Figure 19:
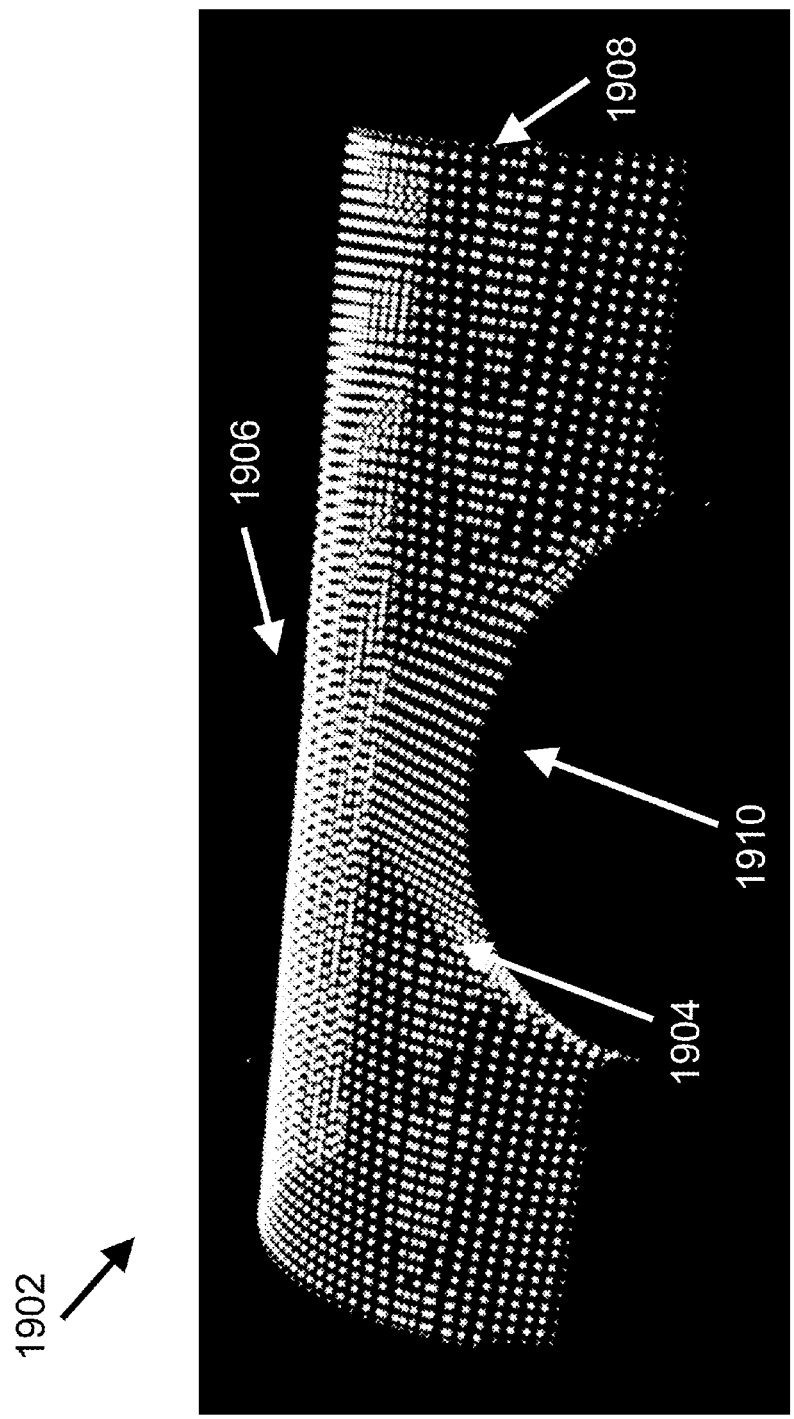
FIG. 19 illustrates a 3D pattern having an elongated and irregular pipe shape and the 3D probes placed uniformly on the 3D pattern in accordance with some embodiments.

Unfortunately, a uniform placement strategy may be ineffective in modeling 3D patterns with an unbalanced orientation profile (e.g., patterns whose surface normals do not provide alignment information in all considered degrees of freedom). For example, the uniform placement strategy is generally not as effective in aligning 3D patterns with an elongated and irregular pipe shape. FIG. 19 illustrates a 3D pattern having an elongated and irregular pipe shape and the 3D probes placed uniformly on the 3D pattern. Because the boundary 1902 has an elongated and irregular pipe shape, under the uniform placement strategy, most of the 3D probes 1904 would be placed on the surface of the long tube 1906. Only a small number of 3D probes 1904 would be placed on the short tube 1910. Also few probes would be place closed to the ends of the long tube. Because the number of 3D probes near the end of the long tube 1908 is small, it is difficult to determine, based on the 3D probes, the position of the long tube along its central axis. Furthermore, it is difficult to determine the angle of rotation about this axis as the number of probes on the surface of the intersecting short tube 1910 is relatively small. Additionally, if 3D probes are placed evenly over the surface of an object, then the ability to align the object in all degrees of freedom will not be equal. The even distribution of 3D probes 1904 over the pipe in FIG. 19, for example, gives comparatively less information in the longitudinal direction and in the rotational direction about the center axis of the cylinder. This may make an alignment algorithm more prone to error when the amount of information available to align one particular degree of freedom is comparatively small.

The techniques described herein can provide for an automated probe placement module for placing 3D probes on a 3D pattern in three dimensions. In some embodiments, probe placements may be distributed to balance their ability to resolve in x, y and z. In some embodiments, the 3 translational degrees of freedom are jointly balanced along with the three rotational degrees of freedom. Additionally, in some embodiments, x, y, and z are balanced while maximizing the smallest rotational component. In some embodiments, limitations imposed by the geometry of 3D pattern can make it difficult to achieve absolute balance in resolving ability between the considered degrees of freedom. In such cases the absolute difference between the resolving abilities in the considered degrees of freedom can be minimized. This can have the effect of increasing the resolving ability of the 3D pattern in the degrees of freedom least represented in a model where probes were placed evenly over the 3D pattern's surface. The probe placement module is configured to place 3D probes on interest points of a 3D image so that the 3D probes can accurately represent a 3D pattern depicted in the 3D image. The probe placement module can be configured to place the 3D probes so that the 3D probes can extract balanced information on all degrees of freedom associated with the 3D pattern's movement, which improves the accuracy of the model generated from the 3D probes. For example, when an object associated with the 3D pattern is known to move in three dimensions, the probe placement module can place the 3D probes so that the 3D probes can extract balanced information in the three dimensions. The probe placement module can also take into account the shape of the 3D pattern so that the 3D probes can extract balanced information regardless of the shape of the 3D pattern. This is in contrast to techniques that may extract unbalanced information, such as extracting more information in the degrees of freedom orthogonal to the long axis compared to along that axis when 3D probes are placed uniformly over the surface of the 3D pattern shown in FIG. 19. Various exemplary figures and examples are used in conjunction with the description that follows (e.g., based on the 3D pattern shown in FIG. 19). One of skill in the art will appreciate that this is done for exemplary purposes, and that any 3D pattern can be processed using the techniques described herein.

Figure 20:
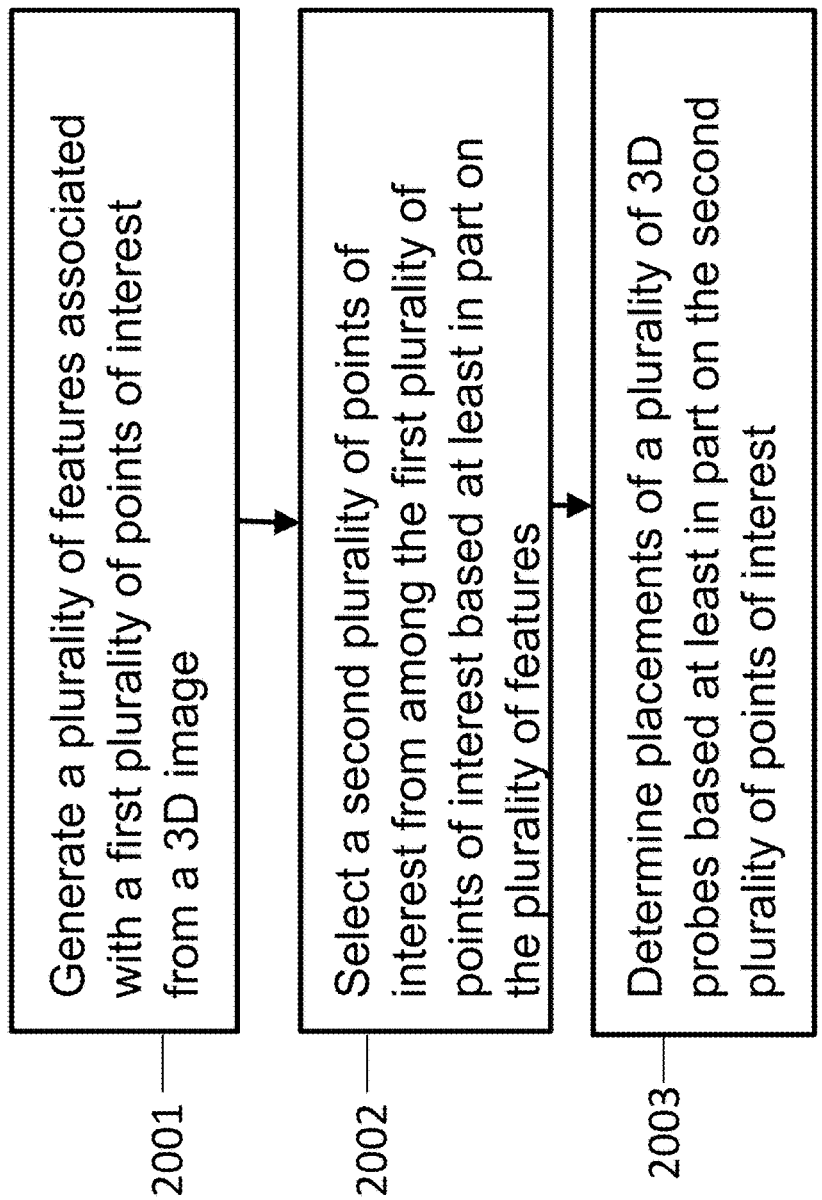
FIG. 20 illustrates a high level process for placing 3D probes on interest points in a 3D image in accordance with some embodiments.

FIG. 20 illustrates a high level process for placing 3D probes on interest points in a 3D image in accordance with some embodiments. Interest points can indicate candidate locations for 3D probes. For example, the probe placement module 408 can be configured to select a subset of interest points in an image and place 3D probes on the selected subset of interest points.

In step 2001, the probe placement module 408 can be configured to generate a plurality of features associated with a first plurality of points of interest from a 3D image. For example, the probe placement module 408 can receive, from an interest point detection module 406, the surface of a 3D pattern in a 3D image represented by a first plurality of points of interest. The probe placement module 408 can then generate a plurality of features associated with the first plurality of points of interest from a 3D image.

In step 2002, the probe placement module 408 can select a second plurality of points of interest from among the first plurality of points of interest based at least in part on the plurality of features. In some embodiments, a goal of the selection process is for the second plurality of points of interest to exhibit some desired ensemble property with regard to a 3D alignment system. In some embodiments the probe placement module 408 can select a second plurality points using the statistical model fitting and Monte-Carlo sampling techniques described in further detail herein. However, other selection techniques might be utilized, for example sorting the first plurality of points into bins pertaining to their features then selecting points from those bins in an even manner.

In step 2003, the probe placement module 408 can determine placements of a plurality of 3D probes based at least in part on the second plurality of points of interest. For example, the probe placement module 408 can place probes on each of the second plurality of points of interest. Alternatively, in a further embodiment the probe placement model may, for example, place probes by interpolating between neighboring points of interest from the second plurality of points of interest.

In some embodiments, to allow the point selection process in step 2002 to select a second plurality of points of interest that achieve a desired ensemble property, features generated in step 2001 may be used. In some embodiments, for each point of interest, its features should be descriptive of its contribution to the desired ensemble property. For example, if the algorithm is trying to balance the ability to align the 3D pattern in each of the three translational degrees of freedom, then the feature vector for each point might have three components, each component of which would be indicative of the point's contribution to an alignment algorithm's ability to resolve the 3D pattern in each of the three translational degrees of freedom. In another example, the desired ensemble property might be to maximize the ability to resolve in a single particular rotational degree of freedom while simultaneously ensuring the ability to align in each of the translational degrees of freedom. In this case the features will also include information descriptive of each point's contribution to the resolving ability in the particular rotational degree of freedom.

Figure 21A:
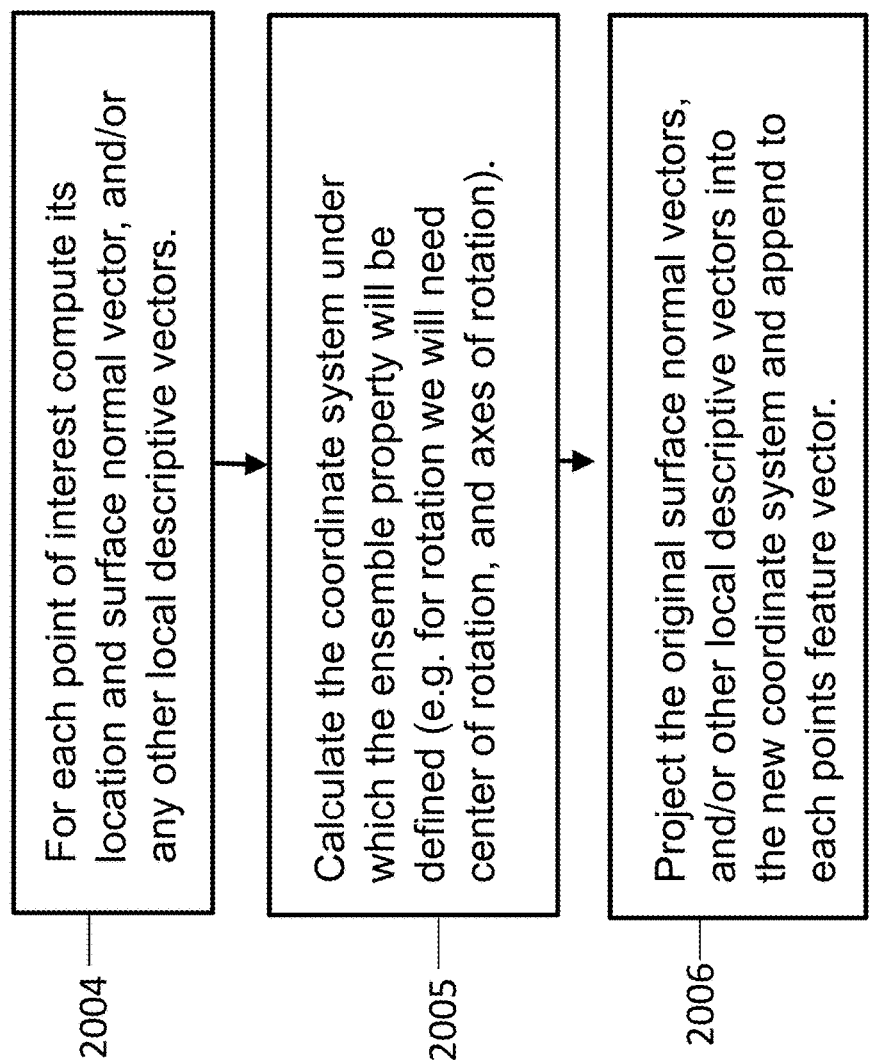
FIGS. 21A and 21B illustrate feature generation processes in accordance with some embodiments.

In some embodiments, the feature generation step 2001 of FIG. 20 can be performed according to a method comprising the steps illustrated in FIG. 21A. In some embodiments, depending on the selection of desired ensemble property the chosen features calculated in step 2001 will vary. In addition, these features may be quantified in many different ways and be calculated using many different methods.

For example, in some embodiments, the feature generation process may use the location and/or surface normal direction of a point of interest to quantify its contribution to an ensemble property. In a particular embodiment the ensemble property might be to ensure the alignment ability in the 3 translational degrees of freedom is identical. To achieve this, in some embodiments, the step 2004 would comprise calculating the surface normals for each point, step 2005 would take these feature vectors and calculate a rotation of the Euclidean coordinate system (possibly using principal components analysis), and step 2006 would project the plurality of surface normals onto the unit vectors defining the new coordinate system to produce the values for the plurality of feature vectors.

In another embodiment the ensemble property might be chosen to ensure the difference in alignment ability between each of the 3 rotational coordinate systems was minimized. To achieve this, the feature vectors might comprise 3 components, each of which would be set equal to the projection of the point of interest's surface normal onto one of the rotational unit vectors defined by the 3D pattern's rotational coordinate system. Thus, in this example, step 2005 would comprise calculating the 3D pattern's center of rotation and axes of rotation.

Figure 21B:
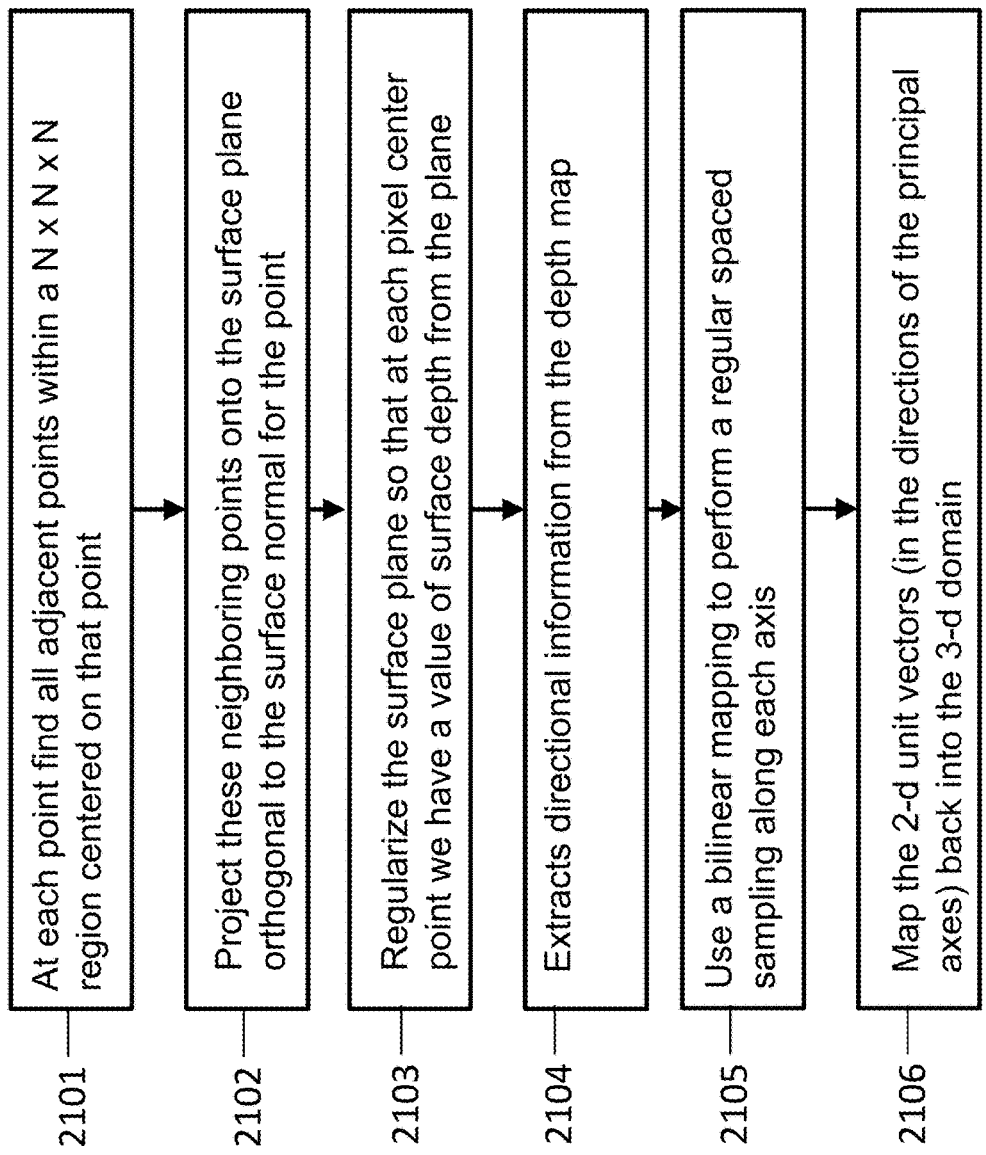

In a further embodiment it may be useful to quantify a point's contribution in directions orthogonal to the surface normal direction. This can allow the comparative usefulness of probe sites close to the edge of a plane (as opposed to those at its center) when aligning in directions parallel to that plane to be quantified. By contrast, in some embodiments, simply using the surface normal vectors gives no information for alignment in the degrees of freedom parallel to the surface of the plane. In a further example, placement of probes at the end of the pipe shown in FIG. 19 will allow alignment in the direction along the long axis, but probes placed in the center may give no information in this direction, thus in this case the feature generation process may want to quantify a point's proximity to the end of the pipe and the direction to the closest edge or end. To this end, in some embodiments, the feature generation step 2001 can be performed according to the steps shown as FIG. 21B.

In step 2101, the probe placement module 408 locates at each point of interest, all adjacent points within a N×N×N region centered on that point. For example, a point $p_{center}$ could have four points p1, p2, p3, and p4 within an N×N×N region centered on the point $p_{center}$.

In step 2102, the probe placement module 408 projects these neighboring points onto the surface plane orthogonal to the surface normal for the point. For example, the points p1, p2, p3, and p4 within an N×N×N region centered on the point $p_{center}$ can be projected onto the surface plane orthogonal to the surface normal for the point.

Figure 23A:
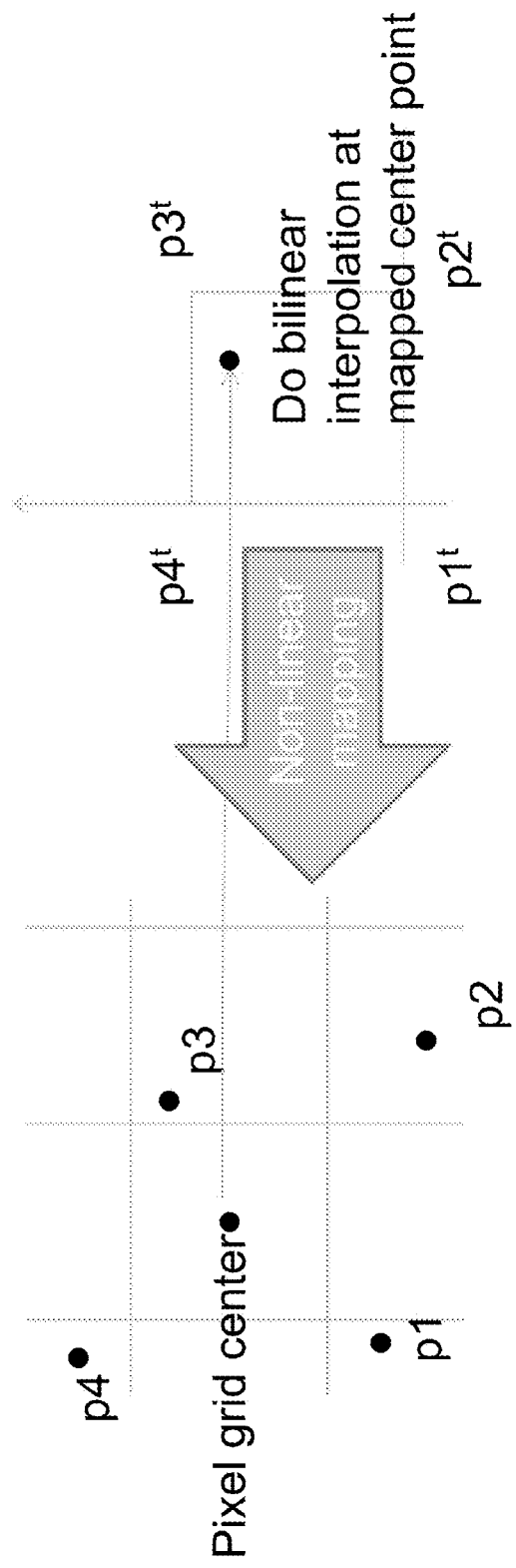
FIG. 23A illustrates a bilinear mapping from a unit square onto the closest four surrounding points (spaced arbitrarily) and an inverse of this mapping where the pixel grid center point is placed into the unit square in accordance with some embodiments and FIG. 23B illustrates the angle of the principal axes in accordance with some embodiments.

In step 2103, the probe placement module 408 regularizes the surface plane into a pixel grid so that each pixel's value equates the surface depth from the plane at the pixel center. To do this, the probe placement module 408 finds a 2D bilinear mapping from the unit square onto the closest four surrounding projected points (spaced arbitrarily), and then uses the inverse of this mapping to place the pixel grid center point into the unit square as illustrated in FIG. 23A. At this point bilinear interpolation using this inverse mapped center point can be used to find the depth value for the pixel grid location. As shown in FIG. 23A, points $p_{center}^t$, p1$^t$, p2$^t$, p3$^t$ and p4$^t$ are obtained through a bilinear interpolation at the mapped center point of points $p_{center}$, p1, p2, p3 and p4. In particular, if $p_i=(x_i, y_i)$, then the mapping may be parameterized in terms of eight coefficients, $a_1, a_2, a_3, a_4, b_1, b_2, b_3, b_4$:

$$x_i = a_1 + a_2 u_i + a_3 v_i + a_4 u_i v_i$$

$$y_i = b_1 + b_2 u_i + b_3 v_i + b_4 u_i v_i$$

where u and v are the components of $p_i^t = (u_i, v_i)$. In matrix form:

$$\begin{bmatrix} x_1 \\ x_2 \\ x_3 \\ x_4 \end{bmatrix} = \begin{bmatrix} 1 & 0 & 0 & 0 \\ 1 & 1 & 0 & 0 \\ 1 & 1 & 1 & 1 \\ 1 & 0 & 1 & 0 \end{bmatrix} \begin{bmatrix} a_1 \\ a_2 \\ a_3 \\ a_4 \end{bmatrix}$$

-continued $$\begin{bmatrix} y_1 \\ y_2 \\ y_3 \\ y_4 \end{bmatrix} = \begin{bmatrix} 1 & 0 & 0 & 0 \\ 1 & 1 & 0 & 0 \\ 1 & 1 & 1 & 1 \\ 1 & 0 & 1 & 0 \end{bmatrix} \begin{bmatrix} b_1 \\ b_2 \\ b_3 \\ b_4 \end{bmatrix}$$

There are two sets of linear equation that are solvable for the mapping parameters. Once the mapping is obtained from the unit square to the set of points, the inverse mapping is computed to find the location of the pixel grid center mapped into the unit square. The inverse mapping is non-linear, first define:

$$\alpha = a_4 b_3 - a_3 b_4$$

$$\beta = a_4 b_1 - a_1 b_4 + a_2 b_3 - a_3 b_2 + x_{center} b_4 - y_{center} a_4$$

$$\gamma = a_2 b_1 - a_1 b_2 + x_{center} b_2 - y_{center} a_2$$

Then, $$v_{center} = \frac{-\beta + \sqrt{\beta^2 - 4\alpha\gamma}}{2\alpha}$$

$$u_{center} = \left( \frac{x - a_1 - a_3 v_{center}}{a_2 + a_4 v_{center}} \right)$$

Continuing with step 2103, having obtained the location of $p_{center}^t$, the location can now be used to do a bilinear interpolation between the values of depth at each of the four locations, p1, p2, p3 and p4 to get a depth value for the pixel grid center.

In step 2103, if a surrounding point is not available (e.g., because the point might be at the edge of the surface) then a depth value equal to N can be used.

Figure 22:
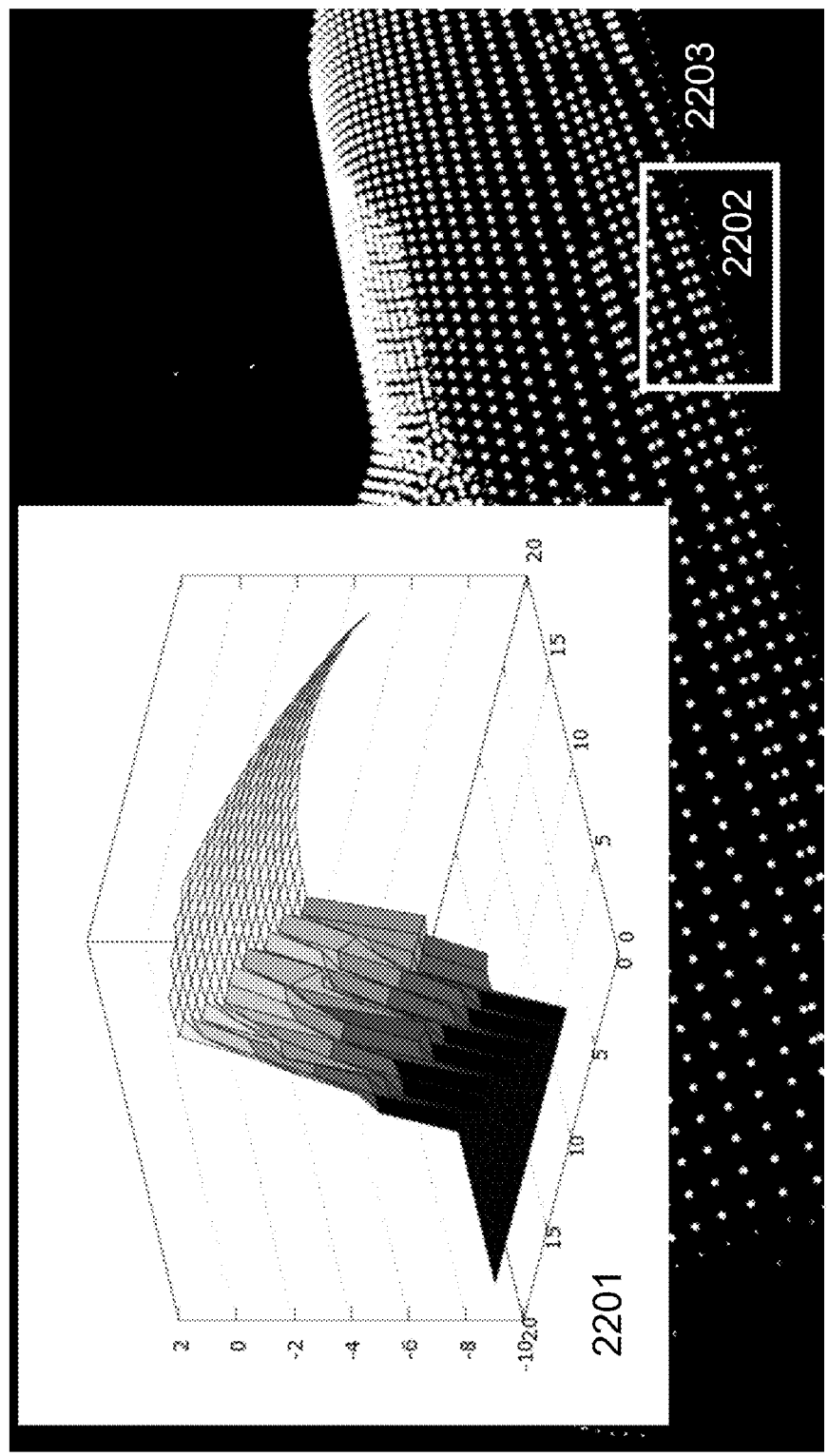
FIG. 22 illustrates a pixel grid regularized depth map in accordance with some embodiments.

Thus, step 2103 can produce a pixel grid regularized depth map. For example the depth map 2201 shown in FIG. 22 can be generated using the techniques described herein for a region 2202 near the visible horizon of a cylinder 2203.

Figure 23B:
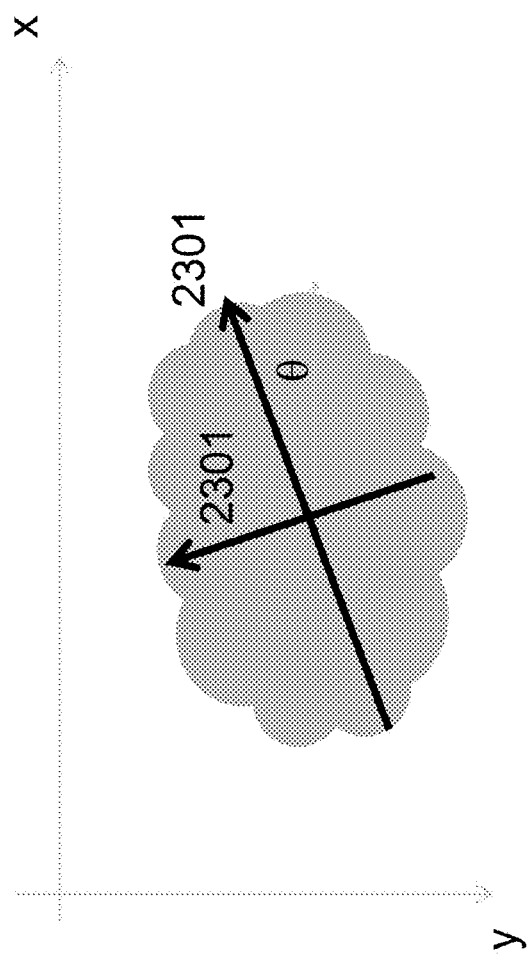

In step 2104, the probe placement module 408 extracts directional information from the depth map. The probe placement module 408 can perform this step by finding the angle of the principal axes 2301 (e.g., shown in FIG. 23B) using the second moments given by:

$$\delta_{i,j} = N - d_{i,j}$$

$$I_{XX} = \Sigma_{i,j} \delta_{i,j} x_{i,j}^2$$

$$I_{YY} = \Sigma_{i,j} \delta_{i,j} y_{i,j}^2$$

$$I_{XY} = \Sigma_{i,j} \delta_{i,j} x_{i,j} y_{i,j}$$

$$\theta = a\tan 2(2 I_{XY}, I_{YY} - I_{XX})$$

Figure 24:
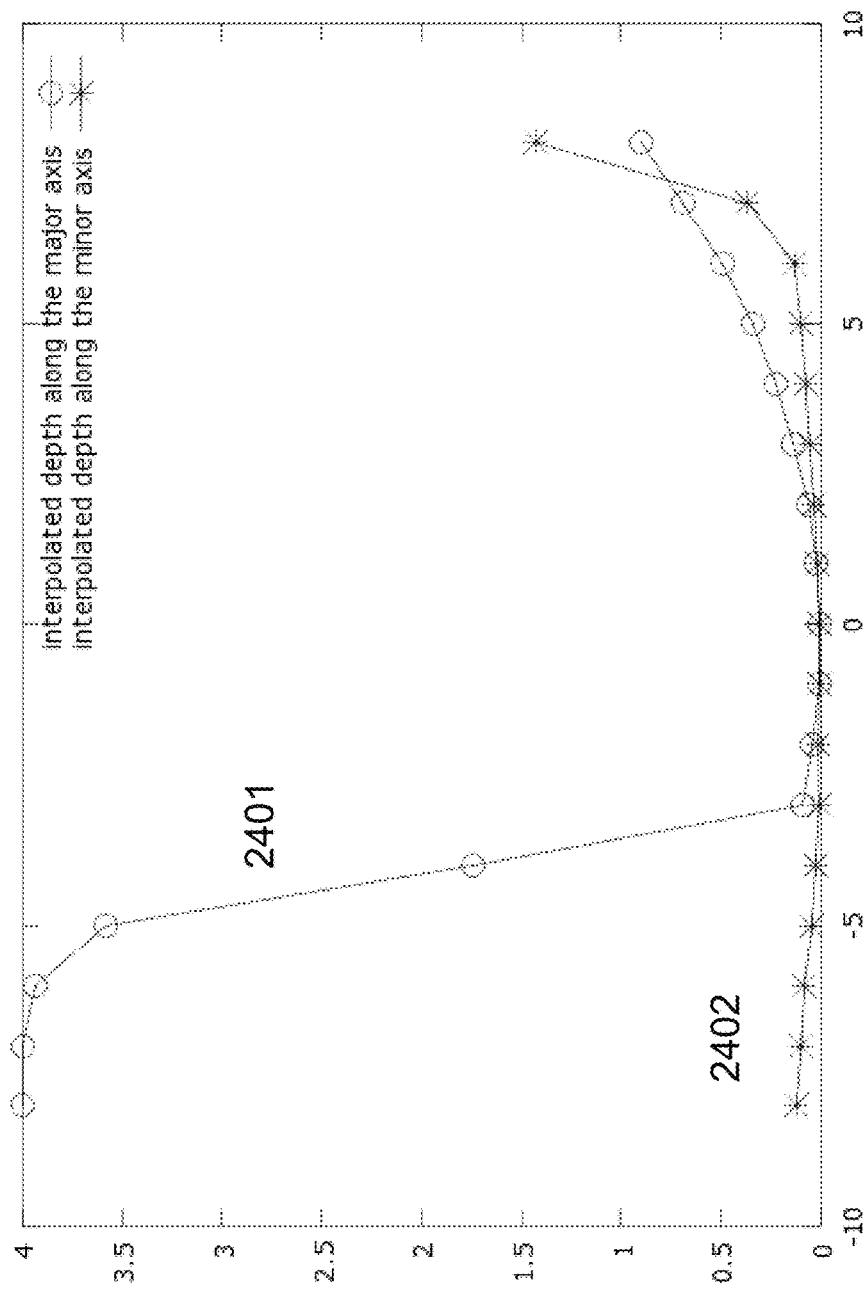
FIG. 24 illustrates regular spaced sampling along major and minor axes in accordance with some embodiments.

In step 2105, having obtained the principal axes (e.g., the principle axes 2301 shown in FIG. 23B), the probe placement module 408 performs a regular spaced sampling along each axis, as illustrated in FIG. 24. FIG. 24 shows the interpolated depth along the major axis with line 2401 and along the minor axis with line 2402. The sampling is then scored with an ad-hoc formula to give a numerical value to quantify the resolving power along the axes (where resolving power can refer to the amount of alignment information in this direction, e.g., a point at the center of a flat surface has no useful alignment information in any direction contained in the tangent plane, a point at the edge of a surface yields much information in the direction perpendicular to the edge). For example, continuing the example described previously (in step 2103), the major axis will be orientated from left to right. Sampling values along this axis will show a large divergence from the tangent plane towards the left hand side, indicative of an edge location. To score the resolving power in this example, the probe placement module 408 can be configured to choose the maximum of the average of the absolute depth values to the left of the center point and the average of the depth values to the right of the center point. So if we consider the interpolated absolute depths along one of the axes, i.e. $d_i$, $\forall i=-N \rightarrow +N$, then we define the resolving power in the direction of the considered axis as, $$\max\left[\frac{1}{N+1}\sum_{i=-N}^{0} d_i, \frac{1}{N+1}\sum_{i=-N}^{0} d_i\right]$$

Figure 25:
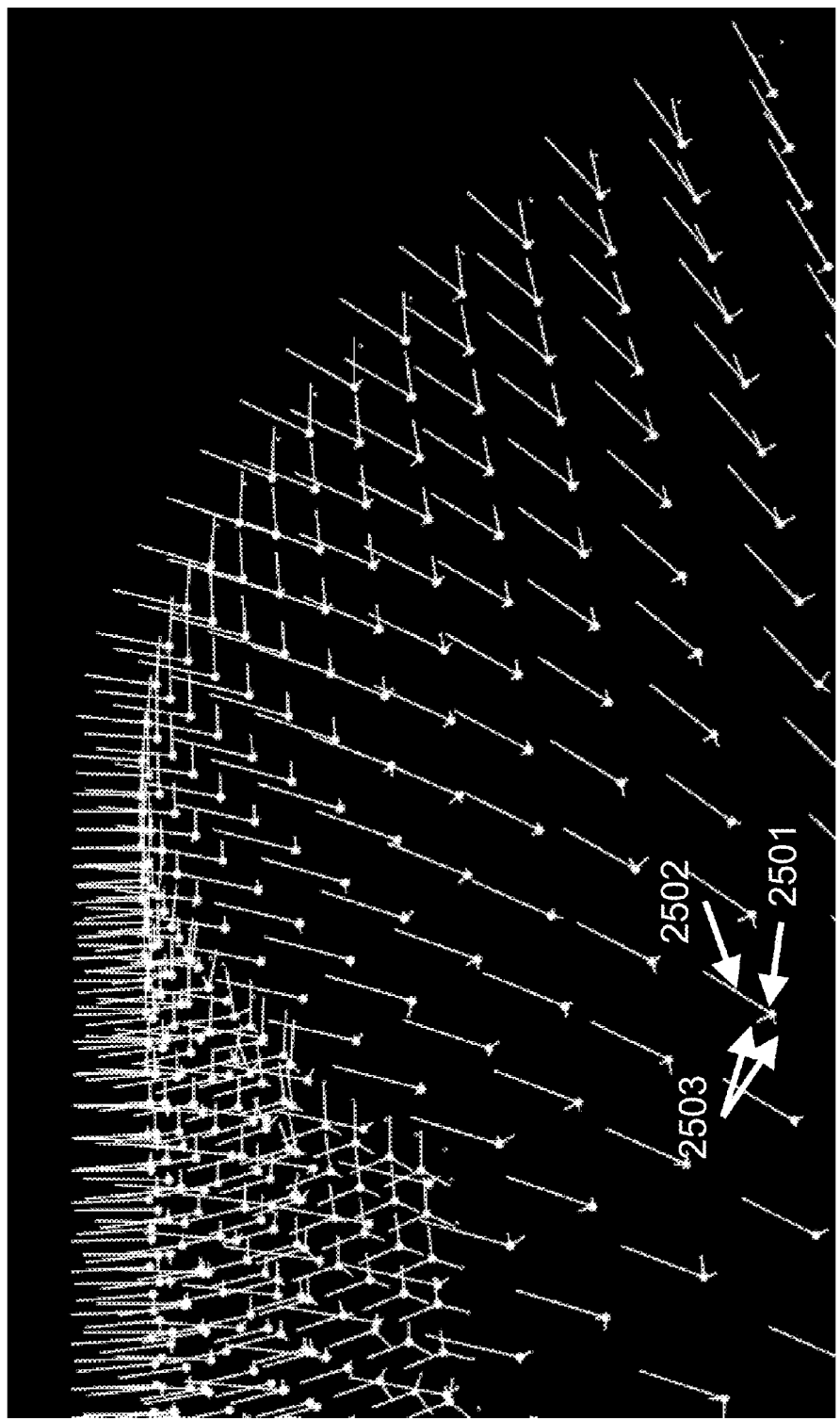
FIG. 25 illustrates the results of a feature generation process in accordance with some embodiments.

In step 2106, the probe placement module 408 maps the 2-d unit vectors (in the directions of the principal axes) back into the 3-d domain. The probe placement module 408 can be configured to perform this step by first scaling these vectors by the resolving powers calculated in the previous step 2016 (e.g., multiplying the 2-d unit vectors by their respective resolving powers). The final results for this example are shown in FIG. 25, where at each point 2501 there is a line 2502 denoting a surface normal vector, and two orthogonal lines 2503 in the tangent plane whose length indicates the principal and secondary components of resolving power.

Continuing with the above procedure, for each point, there are now three vectors $u_0$, $u_1$ and $u_2$, whose magnitudes are indicative of the point's contribution to being able to resolve the object in space. The overall goal of the process in this example is to pick a subset of these points that will allow a registration process to resolve the 3D object with equal determination and robustness in each of the translational degrees of freedom and/or rotational degrees of freedom. To do this, the probe placement module 408 can be configured to construct two probability distributions. The first is fitted to the set of points and is indicative of their relative frequency in the data set. The second "target" distribution is constructed in such a way that it models the relative frequency of a set of points having the desired property. That property could, for example, be that the set of points when combined would give equal resolving power in the three translational degrees of freedom. In another embodiment the property might be that the ability to resolve in the rotational degrees of freedom be improved while simultaneously minimizing the differences between the resolving powers in the translational degrees of freedom.

Sampling Probes from a Distribution

In some embodiments, the probe placement module 408 can be configured to place probes on one or more interest points by sampling probes from a target distribution of probes. The target distribution of probes can include random variables corresponding to degrees of freedom associated with the pattern. For example, when an object associated with the pattern is allowed to move in three dimensions (e.g., translational movement), the target distribution can have three random variables: x coordinate, y coordinate and z coordinate (or other equivalent representations.) As another example, when a 3D object associated with the pattern is allowed to make a translational movement and rotational movement, the target distribution will have six random variables: x coordinate, y coordinate, z coordinate and three for rotation (e.g. pitch $\theta_p$, roll $\theta_r$, and yaw $\theta_y$).

In some embodiments, the probe placement module 408 can determine the target distribution using a TDC module 412. The TDC module 412 can be configured to determine the target distribution of probes based on features associated with the interest points. For example, the TDC module 412 can determine the target distribution based on one or more of, for example, the coordinate of the interest points, the perpendicular orientation associated with the interest points, and/or the rotation of the interest points.

In some embodiments, the TDC module 412 is configured to determine the target distribution such that the distribution of perpendicular orientations sampled from the target distribution is substantially balanced. For instance, suppose that the object of interest is a thin pipe. A set of points evenly distributed on the surface of such an object contain far more resolving information in the plane of its cross section as opposed to the longitudinal direction (e.g., along it central axis). Therefore, the target distribution for the object should be such that the set of probes drawn from the target distribution would in combination have a more equal resolving information in the cross sectional direction as the longitudinal direction. The majority of probe positions in such a set would be positioned toward the two ends of the pipe.

In some embodiments, the TDC module 412 is configured to determine the target distribution so that the target distribution has a similar support as the distribution of interest points. This can be important because, e.g., in these embodiments, the probe placement module 408 can be configured to sample the probes by re-sampling (e.g., importance sampling) from the existing set of interest points. To this end, the TDC module 412 can be configured to use a mixture model for both the interest point distribution and the target distribution, as discussed below.

In some embodiments, the TDC module 412 provides the target distribution to the PDM module 416, and the PDM module 416 is configured to draw samples from the target distribution to determine the location of probes.

In some embodiments, the FDC 414 module is configured to transform the x, y, z random variables into a new coordinate space. To this end, in some embodiments, the FDC 414 finds the principal 3D spatial axes using PCA without mean centering. This determines the 3D spatial coordinate system for the remainder of the process in this example. The coordinate system in this example is denoted (x̂,ŷ,ẑ), which is a rotation of the original Cartesian coordinate system denoted (x,y,z) such that the unit vectors for the new coordinate system in Cartesian coordinates are x̂, ŷ, ẑ. In this example, the FDC 414 may not be configured to use mean centering because it may not be necessary to pick the axes in directions of maximum variance of resolving power. Rather, in some embodiments, it may be desirable to align the axes in the directions of maximum and minimum resolving power (e.g., to choose a balanced set of probes later). In other words, the FDC 414 in this example can be configured to find the rotation of the coordinate system whose first axis is orientated in the direction of maximum resolving power for the object (principal direction). By definition, one of the other two axes will be in the direction of minimum resolving power, and thus the probe placement module 408 will later be able to select probes sites that tend to increase the overall resolving power in this direction (e.g., at the expense of resolving in the principal direction). In some other embodiments, this process can also be performed with mean-centering.

In some embodiments, once the probe placement module 408 determines the axes that will define the probability distribution, the probe placement module 408 projects out points onto this space before fitting to a distribution. For example, for a single point, its feature vector would be:

$$\begin{bmatrix} x_i \\ y_i \\ z_i \end{bmatrix} = \begin{bmatrix} u_0 \cdot \hat{x} + u_1 \cdot \hat{x} + u_2 \cdot \hat{x} \\ u_0 \cdot \hat{y} + u_1 \cdot \hat{y} + u_2 \cdot \hat{y} \\ u_0 \cdot \hat{z} + u_1 \cdot \hat{z} + u_2 \cdot \hat{z} \end{bmatrix}.$$

For consistency with the 2D examples discussed above, $x_i$ can be considered a measure of the point's contribution to the ability to resolve the object in the x direction, $y_i$ is the measure in they direction, and $z_i$ the measure in the z direction.

Target Distribution Computation

In some embodiments, when an object is to be aligned using three degrees of freedom (e.g., translational movement in three dimensions), it may be desirable for the TDC module 412 to determine a weighting function $f(x,y,z)$ that satisfies the following relationships:

$$\sum_i x_i f(x_i, y_i, z_i) = \sum_i y_i f(x_i, y_i, z_i) = \sum_i z_i f(x_i, y_i, z_i)$$

$$f(x_i, y_i, z_i) \geq 0, \forall i$$

and:

$$\sum_i f(x_i, y_i, z_i) \neq 0$$

where i indexes the $i^{th}$ interest point. The objective of this optimization routine is to identify a function $f(x,y,z)$ that equates (1) the weighted summation of feature vectors' x-components measured at the interest points and (2) the weighted summation of feature vectors' y-components measured at the interest points, and (3) the weighted summation of feature vectors' z-components measured at the interest points.

In some embodiments, once the TDC module 412 determines the weighting function $f(x,y,z)$, the TDC module 412 can provide the weighting function $f(x,y,z)$ to the PDM module 416. In some embodiments, the weighting function may take the form of a probability distribution which the PDM module 416 can use to place the probes on one or more interest points. Since the PDM module 416 in this case uses the weighting function $f(x,y,z)$ as a probability distribution from which to sample probes, it must be constrained to be non-negative and can be positive at least for some of the supported domain. The target distribution can be the probability distribution here denoted $f(x,y,z)$.

In some embodiments, the weighting function is used to weight an existing set of probes chosen through some other means, to affect their relative importance in such a way as to minimize:

$$\sum_i \{|x_i - y_i| + |x_i - z_i| + |y_i - z_i|\} f(x_i, y_i, z_i)$$

$$f(x_i, y_i, z_i) \geq 0, \forall i$$

and:

-continued $$\sum_i f(x_i, y_i, z_i) \neq 0$$

In some embodiments, when a pattern has six degrees of freedom (e.g., translational movement and rotational movement in three dimensions), the TDC module 412 can incorporate, into the target distribution, three rotational variables $\theta_p$, $\theta_r$, and $\theta_y$ corresponding to a rotational movement. The TDC module 412 can define the rotational variables $\theta_p$, $\theta_r$ and $\theta_y$ with respect to an origin and set of axes.

In some embodiments, to apply a balancing technique to the three rotational degrees of freedom, the center and axes of rotation are found. For example, the probe placement module 408 can be configured to find the center of rotation by finding the point that minimizes the sum of the rotation moments of the normal vectors and then finds the individual axes using the same criteria.

Figure 26:
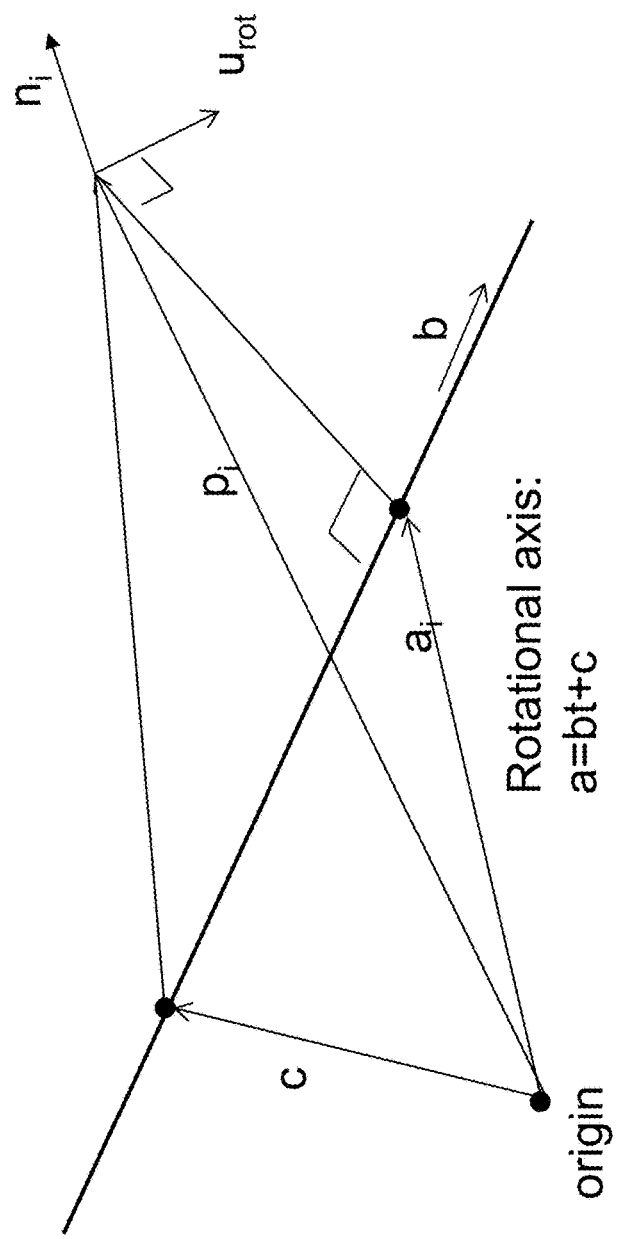
FIG. 26 illustrates the point that minimizes the moment of rotation of all the surface normal vectors in the point cloud, $n_i$ in accordance with some embodiments.

For example, as illustrated in FIG. 26, in some embodiments, to find the center of rotation c, the probe placement module 408 finds the point that minimizes the moment of rotation of all the surface normal vectors in the point cloud, $n_i$. The moment of rotation about a point c for a single normal vector $n_i$ is given by:

$$[n_i \times (p_i - c)]$$

Thus, to find the center of rotation, the techniques can minimize:

$$\Sigma_i \| n_i \times (p_i - c) \| = \Sigma_i [n_i \times (p_i - c)]^T [n_i \times (p_i - c)]$$

Setting:

$$N_i = \begin{bmatrix} 0 & n_i^{(z)} & -n_i^{(y)} \\ -n_i^{(z)} & 0 & n_i^{(x)} \\ n_i^{(y)} & -n_i^{(x)} & 0 \end{bmatrix}$$

The previous equation can be re-written:

$$\Sigma_i [p_i - c]^T N_i^T N_i [p_i - c]$$

Which after differentiating with respect to c and setting to zero yields the following solution for the center of rotation:

$$c = [\Sigma_i N_i^T N_i]^{-1} [\Sigma_i N_i N_i^T p_i]$$

Now, with the center of rotation c, the moment of the normal vector $n_i$ about the rotational axis given by a=bt+c is given by:

$$b \cdot [n_i \times (p_i - c)]$$

The axes of rotation can therefore be found by finding the null space of the symmetric matrix given by:

$$\Sigma_i [n_i \times (p_i - c)] [n_i \times (p_i - c)]^T$$

However, it may be the case that there are objects that are largely rotational symmetric (e.g. the image in FIG. 19). In such cases, the probe selection process can assign probes to points that break this symmetry. In some embodiments, it is therefore desirable in the first example that the principal axis of rotation be placed through the center of the tube and not be biased towards the extraneous features of the intersecting element. In some embodiments, a RANSAC algorithm can be employed to find the axes of rotation (but based on the same criterion as previously described), as is known to a person of skill in the art. In other embodiments Monte Carlo techniques, for example, may be utilized with the center of rotation and axes estimation being posed as a Bayesian parameter estimation problem.

Figure 27:
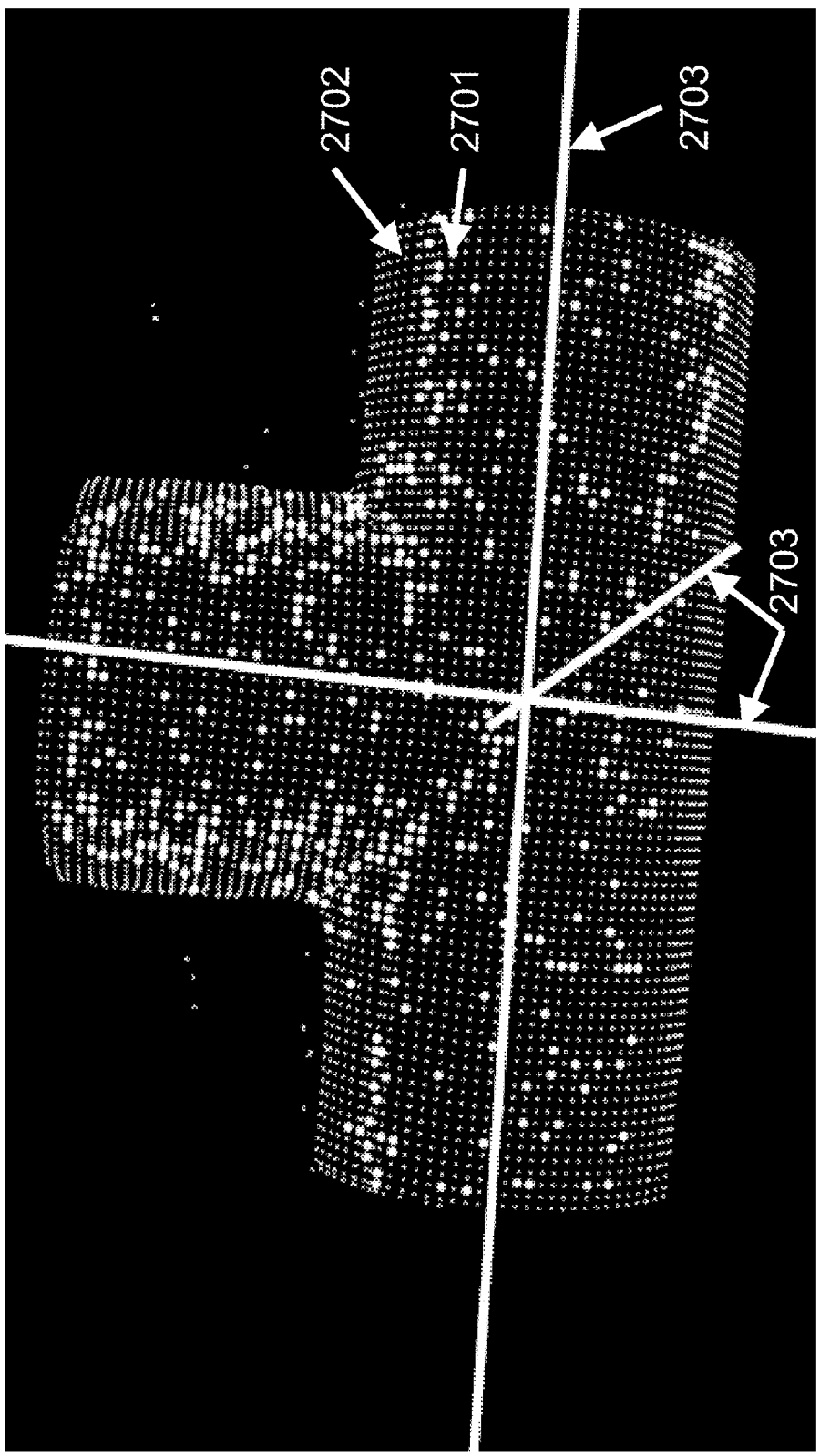
FIG. 27 illustrates an example of an object where a RANSAC algorithm is used to find the axes of rotation in accordance with some embodiments.

FIG. 27 illustrates an example of an object where a RANSAC algorithm is used to find the axes of rotation 2703. FIG. 27 shows probes 2701 and points 2702. Each iteration of the RANSAC algorithm randomly chooses a subset of 4 points. These points are used to calculate a proposed center of a rotation and set of rotational axes. If the center of rotation is found to be outside the bounding box of points, dilated 1×, then the proposal is rejected. Inliers can be detected by thresholding the normalized dot product:

$$\frac{n_i \cdot [p_i - a_i]}{\|p_i - a_i\|}$$

where $a_i$ lies on the proposed principal rotational axis (as illustrated in FIG. 26). Once the set of inliers is obtained, a new center of rotation and set of rotational axes can be generated and used to measure the fit of the model. The fit of the model can be calculated by summing the above normalized dot product for all candidate and inlier points.

In applications where an alignment model is being trained from an image recorded from a single field-of-view, curved surfaces may have horizon points apparent to the imaging device. For example, only a fraction of a cylinder's surface may be visible to a camera. Placing probes close to these horizon edges is not very desirable. For example, if the cylinder is rotated about its central axis, all the probes along one bottom edge will disappear from view. Since an alignment algorithm will likely be searching over rotational as well as translational degrees of freedom, in some embodiments, it can be desirable to have as many of the probe sites be visible across the entire search range as possible.

In some embodiments, horizon points can be removed from consideration when selecting probe sites. In some embodiments, one or both of two conditions can be used to determine if a point is in fact a horizon point. For example, with reference to FIG. 26, the first condition for point $p_i$ to be a horizon point is that the dot product of its surface normal with one of the rotational unit vector must be less than a pre-defined threshold, e.g. cos(85.0). In other words, in this example, only points whose surface normals are roughly parallel to $[p_i-a_i]$ in FIG. 19 would be considered. Continuing with this example, the second condition is that the point must be close to the edge of the surface in the direction of rotation, e.g., $u_{rot}$. To ascertain this, for each potential horizon point (e.g., those meeting the first condition) steps 2001-2003 can be applied to get a regularized grid of surface depth values to the tangent plane at point $p_i$. A bilinear mapping can be used to perform a regular spaced sampling along the direction $u_{rot}$. This is similar to the sampling done in step 2005, the difference being the direction. By applying a threshold to the 1-d signal, a determination can be made as to whether $p_i$ is close to the edge of a visible surface. The threshold will depend on the values used for the missing pixel values, but if we use N (as proposed in step 2003) then 0.9 N would be reasonable in this example. In further embodiments, other values could be used. For example, the threshold could be between 0.7 N and N, and more preferably between 0.85 N and 0.95 N. In still further embodiments, other thresholds can be used.

Figure 28A:
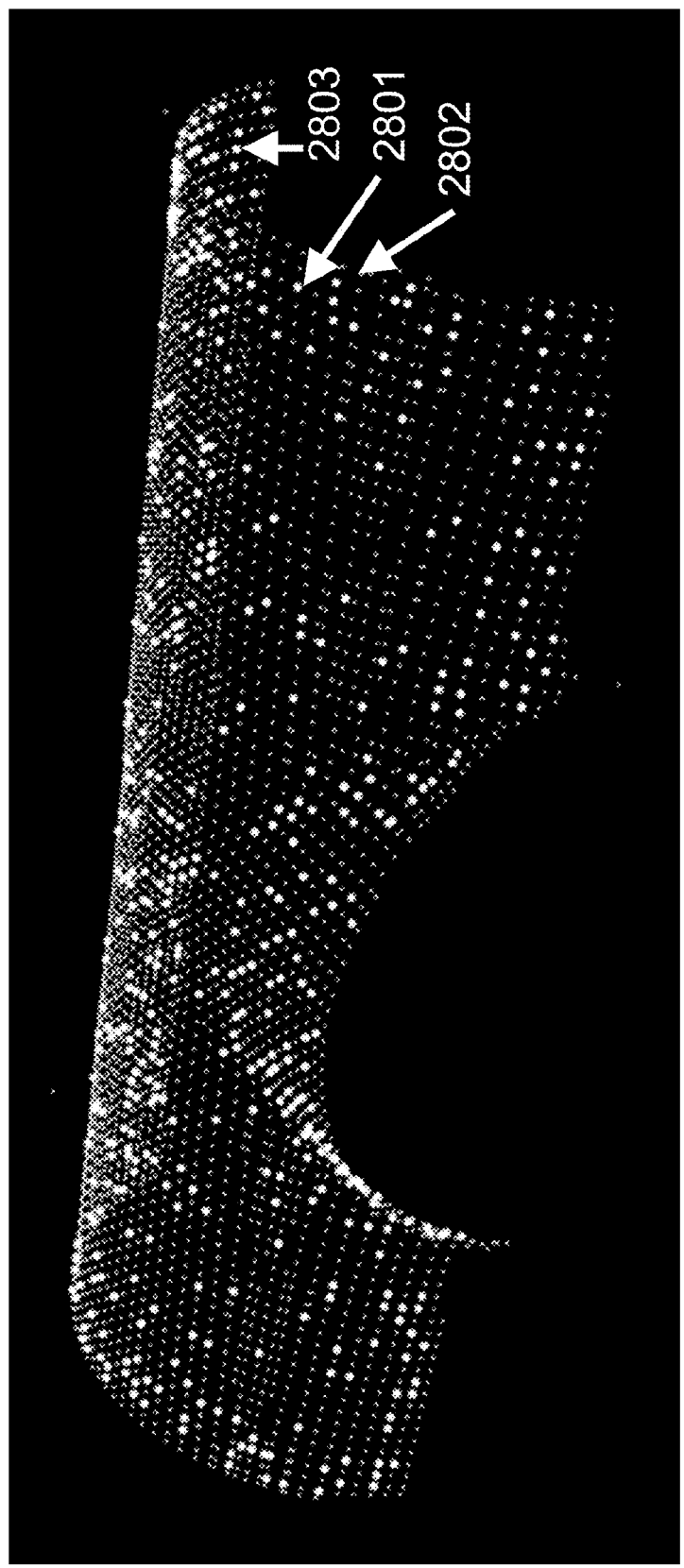
FIG. 28A illustrates probe placement without horizon point removal and FIG. 28B illustrates probe placement with horizon point removal according to some embodiments.
Figure 28B:
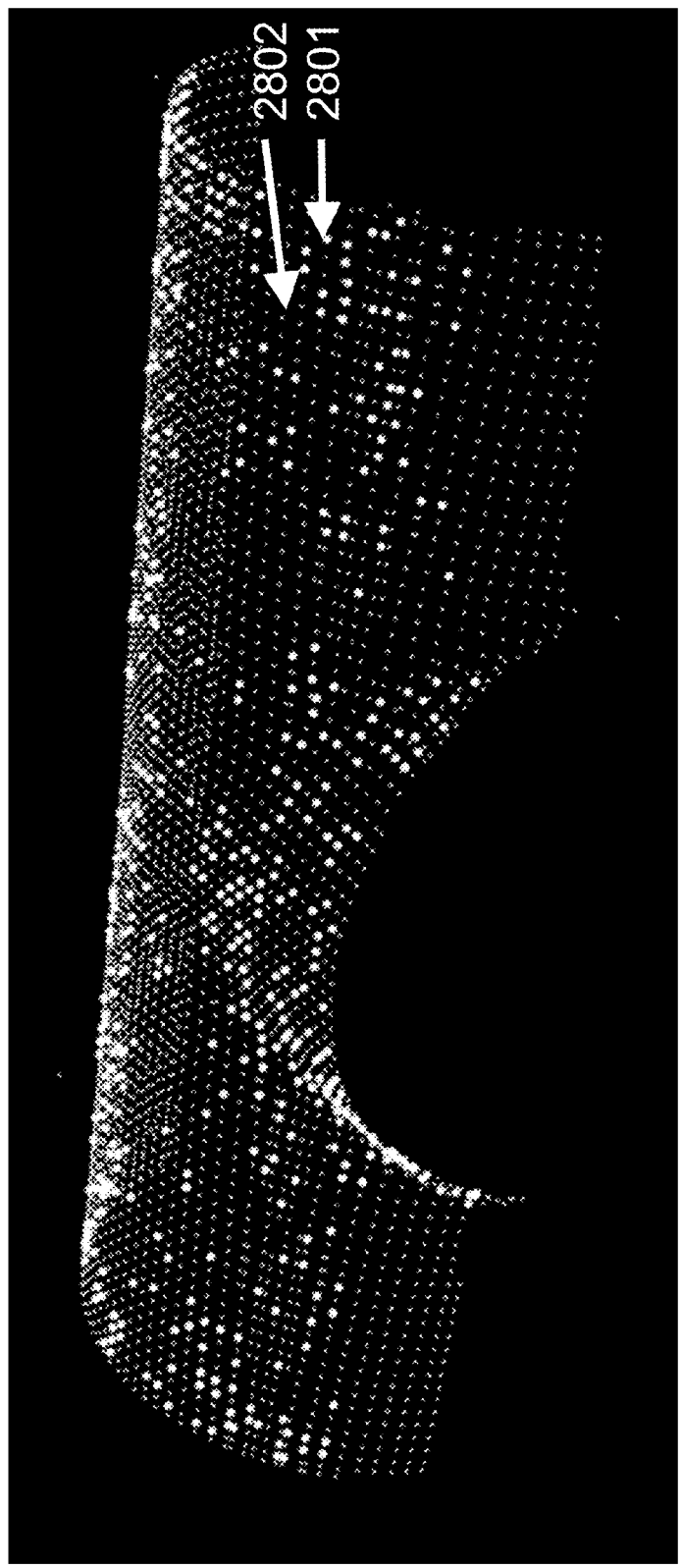

FIGS. 28A and 28B illustrate examples of probe placement with and without horizon point removal according to some embodiments. In particular, FIG. 28A illustrates probe placement without horizon point removal, and FIG. 28B illustrates probe placement with horizon point removal according to some embodiments. FIGS. 28A and 28B show probes 2801 and points 2802. Note that FIG. 28B does not include, for example, the horizon points 2803 in FIG. 28A.

In some embodiments, once the center of rotation and rotational axes are determined (parameterized by their respective unit vectors $\hat{r}_{\theta_p}$, $\hat{r}_{\theta_r}$ and $\hat{r}_{\theta_y}$), the TDC module 412 can determine the rotational variables $\theta_p$, $\theta_r$ and $\theta_y$ using a position vector $p_i$ of the $i^{th}$ interest point, which is a vector from the origin to the center of the $i^{th}$ interest point, and the previously calculated resolving power vectors $u_0^i$, $u_1^i$ and $u_2^i$.

$$\theta_p^i = \hat{r}_{\theta_p} \cdot [(u_0^i + u_1^i + u_2^i) \times (p_i - c)]$$

$$\theta_r^i = \hat{r}_{\theta_r} \cdot [(u_0^i + u_1^i + u_2^i) \times (p_i - c)]$$

$$\theta_y^i = \hat{r}_{\theta_y} \cdot [(u_0^i + u_1^i + u_2^i) \times (p_i - c)]$$

Figure 29:
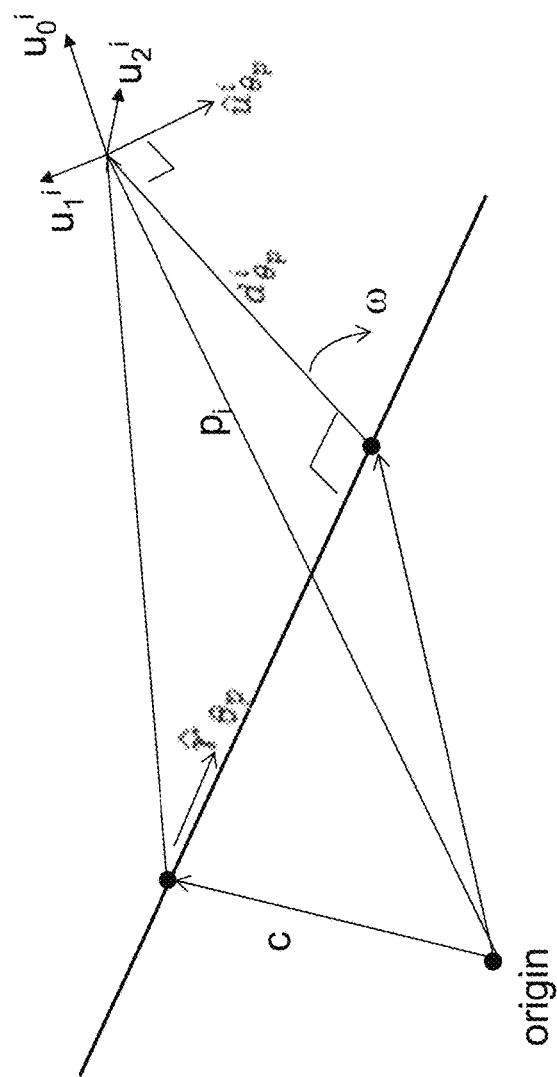
FIG. 29 shows the relevant vectors for the computation of $\theta_p^i$ which can be considered as the magnitude of the sum of projections of $u_0^i$, $u_1^i$ and $u_2^i$ onto the rotation unit vector $\hat{u}_{\theta_p}^i$ in accordance with some embodiments.

FIG. 29 shows the relevant vectors for the computation of $\theta_p^i$ which can be considered as the magnitude of the sum of projections of $u_0^i$, $u_1^i$ and $u_2^i$ onto the rotation unit vector $\hat{u}_{\theta_p}$.

In some embodiments, the rotational variable $\theta_p^i$ can take into account the norm of the distance between the point and the rotation axes, i.e. vector $d_{\theta_p}^i$. Since, $$\frac{d\omega}{d\|d_{\theta_p}^i\|} \propto \frac{1}{\|d_{\theta_p}^i\|^2}$$

the TDC module 412 can emphasize the contribution of interest points that are further away from the origin in order to increase the angular precision. For example, the TDC module 412 can define the rotational variable $\theta_p^i$ for the $i^{th}$ interest point as follows:

$$\theta_p^i = \frac{\|d_{\theta_p}^i\| \cdot [(u_0^i + u_1^i + u_2^i) \times (p_i - c)]}{\sum_i \|d_{\theta_p}^i\|}$$

or, $$\theta_p^i = \frac{\|d_{\theta_p}^i\|^2 \cdot [(u_0^i + u_1^i + u_2^i) \times (p_i - c)]}{\sum_i \|d_{\theta_p}^i\|^2}.$$

The rotational variable $\theta_p^i$ that depends on the norm of the position vector $v_i$ can provide a target distribution that would favor placing probes at locations further away from the axes of rotation. This way, the target distribution can cause more probes to be sampled in interest points further away from the center of rotation.

In some embodiments, once the TDC module 412 determines the representation for the rotational variable, the TDC module 412 can use the determined representation to represent each of the interest points. Subsequently, the TDC module 412 can be configured to determine the target distribution based on the representation of the interest points by finding a weighting function $f(x,y,z,\theta_p,\theta_r,\theta_y)$ that satisfies the following relationships:

$$f(x, y, z, \theta_p, \theta_r, \theta_y) = \underset{g}{\arg\min}\{[(x_i - y_i)g(x_i, y_i, z_i, \theta_p^i, \theta_r^i, \theta_y^i)]^2 +$$

-continued $$[(x_i - z_i)g(x_i, y_i, z_i, \theta_p^i, \theta_r^i, \theta_y^i)]^2 +$$
$$[(x_i - z_i)g(x_i, y_i, z_i, \theta_p^i, \theta_r^i, \theta_y^i)]^2 +$$
$$[(\theta_p^i - \theta_r^i)g(x_i, y_i, z_i, \theta_p^i, \theta_r^i, \theta_y^i)]^2 +$$
$$[(\theta_p^i - \theta_y^i)g(x_i, y_i, z_i, \theta_p^i, \theta_r^i, \theta_y^i)]^2 +$$
$$[(\theta_r^i - \theta_y^i)g(x_i, y_i, z_i, \theta_p^i, \theta_r^i, \theta_y^i)]^2\}$$

with the constraints that:

$$f(x_i, y_i, z_i, \theta_p^i, \theta_r^i, \theta_y^i) \geq 0, \forall i$$
$$\sum_i f(x_i, y_i, z_i, \theta_p^i, \theta_r^i, \theta_y^i) \neq 0$$

where i indexes the $i^{th}$ interest point. This can have the effect of jointly balancing the ability to resolve the part in both translational and rotation degrees of freedom.

In some embodiments, the TDC module 412 can be configured to determine the target distribution based on the representation of the interest points by finding a weighting function $f(x,y,z,\theta_p,\theta_r,\theta_y)$ that jointly balances the resolving ability in the translational degrees of freedom while maximizing the resolving ability in the rotational degree of freedom that is found to have the least resolving information using the full set of interest points, i.e. pitch if $\Sigma_i \theta_p^i > \Sigma_i \theta_r^i$ and $\Sigma_i \theta_p^i > \Sigma_i \theta_y^i$, yaw if $\Sigma_i \theta_y^i > \Sigma_i \theta_r^i$ and $\Sigma_i \theta_y^i > \Sigma_i \theta_p^i$, otherwise roll. This may be advantageous under conditions where, for example, one rotational variable is small causing the previously described optimization to reduce the discrepancy between the three rotational variables by minimizing the contributions of other two. This can have the undesirably effect of placing most of the probes near the center of rotation.

In some embodiments, the TDC module 412 can be configured to determine a weighting function $f(x,y,z,\theta_p,\theta_r,\theta_y)$ that balances the resolving ability in the translational degrees of freedom while maximizing the resolving ability in the rotational degree of freedom by carrying out the following optimization:

$$f(x, y, z, \theta_p, \theta_r, \theta_y) = \underset{g}{\arg\min} \Big\{ w_S \big( [(x_i - y_i)g(x_i, y_i, z_i, \theta_p^i, \theta_r^i, \theta_y^i)]^2 +$$
$$[(x_i - z_i)g(x_i, y_i, z_i, \theta_p^i, \theta_r^i, \theta_y^i)]^2 + [(x_i - z_i)g(x_i, y_i, z_i, \theta_p^i, \theta_r^i, \theta_y^i)]^2 \big) +$$
$$w_R \left[ \frac{g(x_i, y_i, z_i, \theta_p^i, \theta_r^i, \theta_y^i)}{\theta_{smallest}^i} \right]^2 \Big\}$$

with the constraints that:

$$f(x_i, y_i, z_i, \theta_p^i, \theta_r^i, \theta_y^i) \geq 0, \forall i$$
$$\sum_i f(x_i, y_i, z_i, \theta_p^i, \theta_r^i, \theta_y^i) \neq 0$$

and where the parameters $w_S$ and $w_R$ prescribe a relative bias in the optimization between the minimization of the difference between the translational components and the maximization of smallest rotation component.

In some embodiments, once the TDC module 412 determines the target distribution $f(x,y,z,\theta_p,\theta_r,\theta_y)$, the TDC module 412 can provide the target distribution $f(x,y,z,\theta_p,\theta_r,\theta_y)$ to the PDM module 416. Subsequently, the PDM module 416 can use the target distribution $f(x,y,z,\theta_p,\theta_r,\theta_y)$ as a probability distribution to sample probes on the pattern.

In some embodiments, to facilitate the above optimization process, the probe placement module 408 can assume a functional form for the target distribution $f(x,y,z,\theta_p,\theta_r,\theta_y)$.

In some embodiments, the probe placement module 408 can assume that the target distribution $f(x,y,z,\theta_p,\theta_r,\theta_y)$ has a linear form. Although a linear function can become negative, the constraint $f(x_i,y_i,z_i,\theta_p^i,\theta_r^i,\theta_y^i) \geq 0, \forall i$ can force the target distribution to be positive at all interest points. When the target distribution $f(x,y,z,\theta_p,\theta_r,\theta_y)$ has a linear form, the optimization routine for finding the target distribution can be configured to use the linear form. However, because the space of linear functions is limited, it may be difficult to find a linear function that satisfies all the constraints.

In some embodiments, the probe placement module 408 can assume that the target distribution $f(x,y,z,\theta_p,\theta_r,\theta_y)$ has a non-linear form. When the target distribution $f(x,y,z,\theta_p,\theta_r,\theta_y)$ has a non-linear form, the optimization routine for finding the target distribution may be configured differently to use the non-linear form. However, because the space of non-linear functions is wide, it may be easier to find a non-linear function that satisfies all the constraints.

In some embodiments, the TDC module 412 can set the target distribution $f(x,y,z,\theta_p,\theta_r,\theta_y)$ as an inverse of an interest point distribution $p_p(x,y,\theta|\text{parameter})$. In this case, the TDC module 412 can receive, from the FDC module 414, the interest point distribution $p_p(x,y,z,\theta_p,\theta_r,\theta_y)$, and indirectly determine the target distribution $f(x,y,z,\theta_p,\theta_r,\theta_y)$ by computing an inverse:

$$f(x, y, z, \theta_p, \theta_r, \theta_y) = \frac{1}{p_p(x, y, z, \theta_p, \theta_r, \theta_y)}.$$

When, for example, the target distribution $f(x,y,z,\theta_p,\theta_r,\theta_y)$ defined as an inverse of an interest point distribution $p_p(x,y,z,\theta_p,\theta_r,\theta_y)$, the target distribution $f(x,y,z,\theta_p,\theta_r,\theta_y)$ will cause more probes to be sampled at locations with interest points that are relatively dissimilar compared to rest of the interest points.

In some embodiments, the FDC module 414 can model the interest point distribution $p_p(x,y,z,\theta_p,\theta_r,\theta_y)$ as a mixture model. In some embodiments, the mixture model can include a Gaussian Mixture Model (GMM):

$$p_p\left(x, y, z, \theta_p, \theta_r, \theta_y \middle| \left\{\alpha_k, \overline{\mu}_k, \sum_k\right\}, k = 1, \dots N\right) =$$
$$\sum_{k=1 \dots N} \alpha_k N_{X,Y,Z,\Theta_P,\Theta_R,\Theta_Y}\left(\overline{\mu}_k, \sum_k\right)$$

The GMM has four parameters: the number of Gaussian distributions N, the weight $\alpha_k$ of the $k^{th}$ Gaussian distribution, the mean vector $\overline{\mu}_k$ of the $k^{th}$ Gaussian distribution, and the covariance matrix $\overline{\Sigma}_k$ of the $k^{th}$ Gaussian distribution. In other embodiments, the mixture model can include a mixture of triangular distributions. In some embodiments, the mixture of triangular distributions can be faster to calculate and can offer a similar desirable property of providing a soft grouping of interest points.

In some embodiments, the FDC module 414 can estimate the number of Gaussian distributions N for the GMM by clustering the interest points and determining the number of clusters that best fit the interest points. For example, the FDC module 414 can perform a k-means clustering operation on the interest points to estimate the number of Gaussian distributions N.

The remaining set of parameters $\{\alpha_k, \bar{\mu}_k, \Sigma_k\}$, k=1, ... N can be determined by maximizing the likelihood of parameters given the interest points. In some embodiments, the FDC module 414 can maximize the likelihood of the parameters given the interest points using an expectation-maximization technique. To perform expectation-maximization, the FDC module 414 can initialize the set of parameters $\{\alpha_k, \bar{\mu}_k, \Sigma_k\}$, k=1, ... N using the result from the clustering step.

As discussed above, the TDC module 412 can determine the target distribution $f(x,y,z,\theta_p,\theta_r,\theta_y)$ by simply inverting the interest point distribution $p_p(x,y,z,\theta_p,\theta_r,\theta_y)$. However, this target distribution $f(x,y,z,\theta_p,\theta_r,\theta_y)$ may cause most of the probes to be placed on edges with the least common values of x, y, z, $\theta_p$, $\theta_r$, $\theta_y$. For example, when an object is capable of making only 3D translational movements and the object is box shaped with rounded corners, this target distribution $f(x,y,z)$ may cause the PDM module 416 to sample the mostly around the corner locations. In such scenarios, an alignment model with probes placed only on the corner locations will be vulnerable to occlusion and noise.

To address such issues, in some embodiments, the TDC module 412 can transform the interest point distribution $p_p(x,y,z,\theta_p,\theta_r,\theta_y)$ and invert the transformed interest point distribution to determine the target distribution $f(x,y,z,\theta_p, \theta_r,\theta_p)$. This transformation may take the form of applying a smoothing kernel to $p_p(x,y,z,\theta_p,\theta_r,\theta_y)$.

In some embodiments, the TDC module 412 can determine the target distribution by transforming the interest point distribution in ways other than performing an inversion. One such embodiment transforms the interest point distribution $p_p(x,y,z,\theta_p,\theta_r,\theta_y|\{\alpha_k,\bar{\mu}_k,\Sigma_k\}$, k=1, ... N) by finding new weights $\widetilde{\alpha_k}$ that satisfy certain conditions. In estimating the set of parameters $\{\alpha_k,\bar{\mu}_k,\hat{\Sigma}_k\}$, the TDC module 412 can perform a soft grouping of interest points (e.g., soft grouping into Gaussian distributions). Once the TDC module 412 has performed those groupings, the TDC module 412 can be configured to find the new weight $\widetilde{\alpha_k}$ to re-weight each group (e.g., each Gaussian distribution) individually.

For example, the TDC module 412 can denote: $\bar{\mu}_k^T=[\mu_k^{(x)},\mu_k^{(y)},\mu_k^{(z)},\mu_k^{(\theta_p)},\mu_k^{(\theta_r)},\mu_k^{(\theta_y)}]$. In this representation, the TDC module 412 can be configured to find the weights $\widetilde{\alpha_k}$ that minimize the following relationship:

$$w_R \left[\sum_k \frac{\alpha_k}{\mu_k^{(\theta_{smallest})}}\right]^2 + w_S \left[\sum_k \widetilde{\alpha_k}(\mu_k^{(x)}-\mu_k^{(y)})\right]^2 +$$
$$w_S \left[\sum_k \widetilde{\alpha_k}(\mu_k^{(x)}-\mu_k^{(z)})\right]^2 + w_S \left[\sum_k \widetilde{\alpha_k}(\mu_k^{(y)}-\mu_k^{(z)})\right]^2$$

with the constraint:

$$\sum_{k=1...,N} \widetilde{\alpha_k} = 1$$

The minimization can reduce to a linear programming problem through the use of a Lagrange multiplier $\varphi$ to form the Lagrangian:

$$L(\widetilde{\alpha_k},\phi) = w_R\left[\sum_k \frac{\alpha_k}{\mu_k^{(\theta_{smallest})}}\right]^2 + w_S\left[\sum_k \widetilde{\alpha_k}(\mu_k^{(x)}-\mu_k^{(y)})\right]^2 +$$
$$w_S\left[\sum_k \widetilde{\alpha_k}(\mu_k^{(x)}-\mu_k^{(z)})\right]^2 + w_S\left[\sum_k \widetilde{\alpha_k}(\mu_k^{(y)}-\mu_k^{(z)})\right]^2 + \phi\left[\left(\sum_k \widetilde{\alpha_k}\right)-1\right]$$

In some embodiments, the relative weighting between translational and rotational components of the optimization can be set using a single parameter $R_{BIAS}$ and using the following formulas for the weights:

$$w_R = R_{Bias} \bigg/ \left(\sum_k \frac{\alpha_k}{\mu_k^{(\theta_{smallest})}}\right)^2$$

and, $$w_S = \frac{1}{R_{Bias}\left(\left[\sum_k \alpha_k(\mu_k^{(x)}-\mu_k^{(y)})\right]^2 + \left[\sum_k \alpha_k(\mu_k^{(x)}-\mu_k^{(z)})\right]^2 + \left[\sum_k \alpha_k(\mu_k^{(y)}-\mu_k^{(z)})\right]^2\right)}$$

Figure 30A:
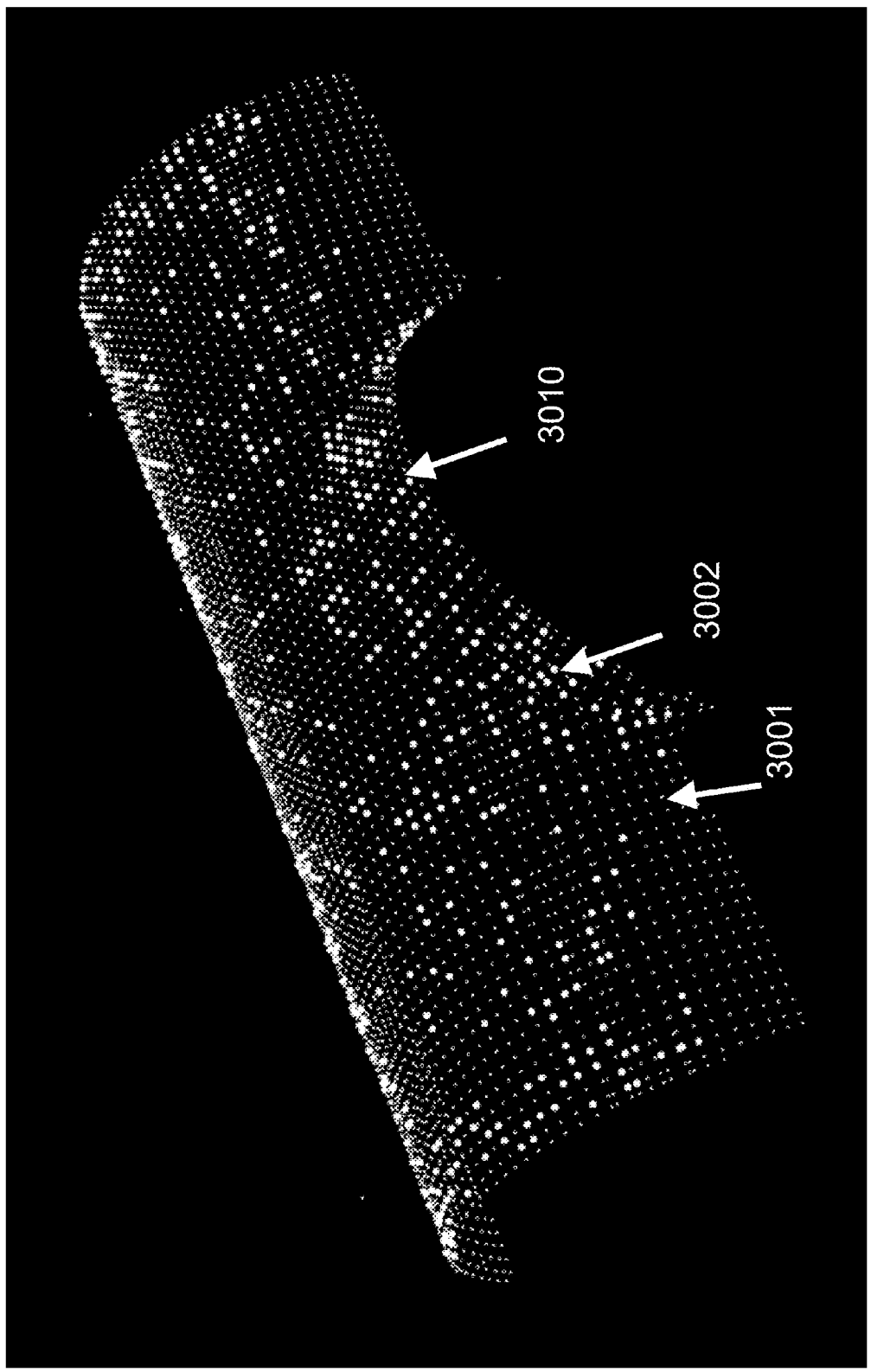
FIG. 30A shows an example of probes where no bias is applied.
Figure 30B:
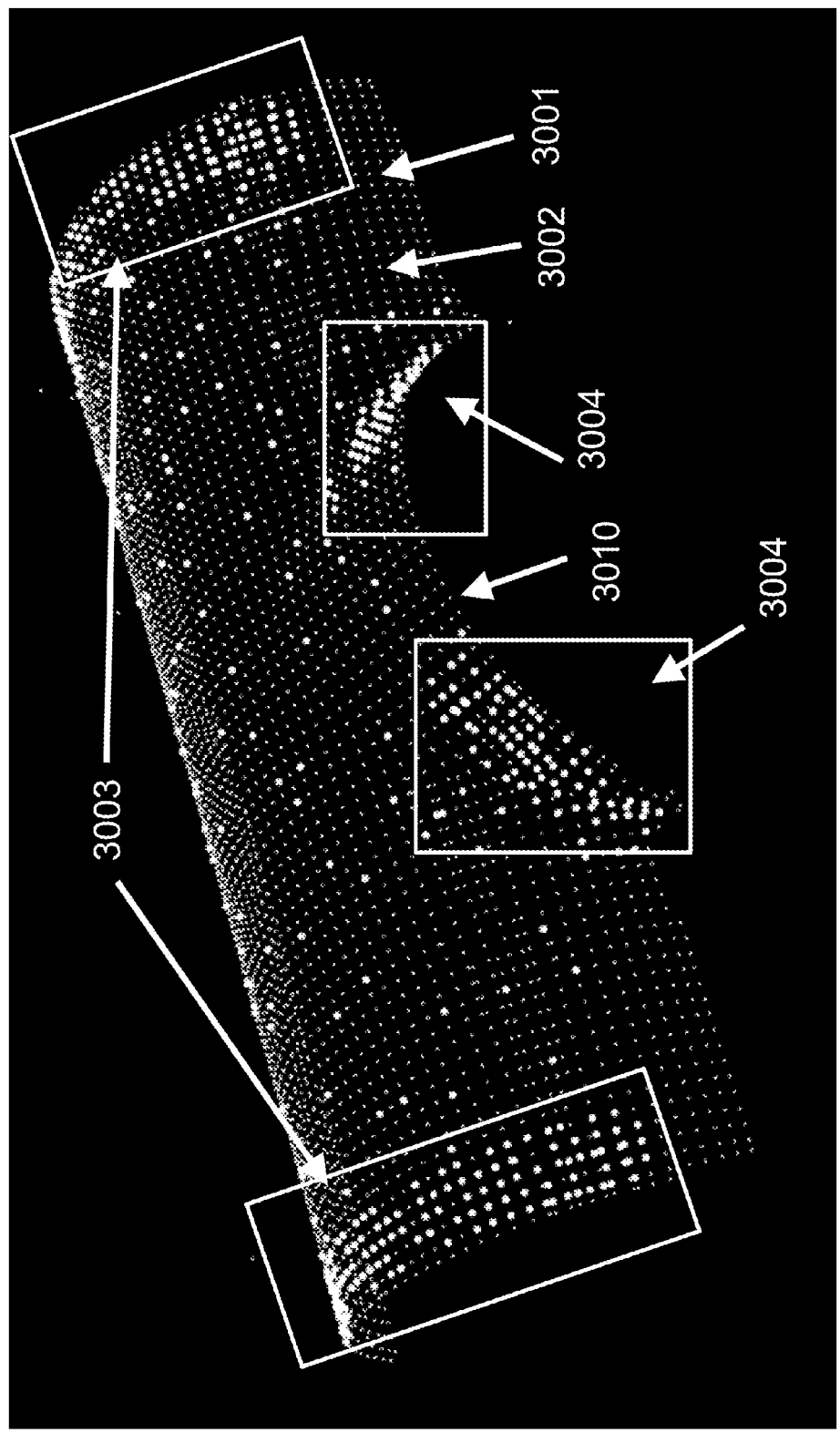
FIG. 30B shows an example of probes where spatial bias is applied.
Figure 30C:
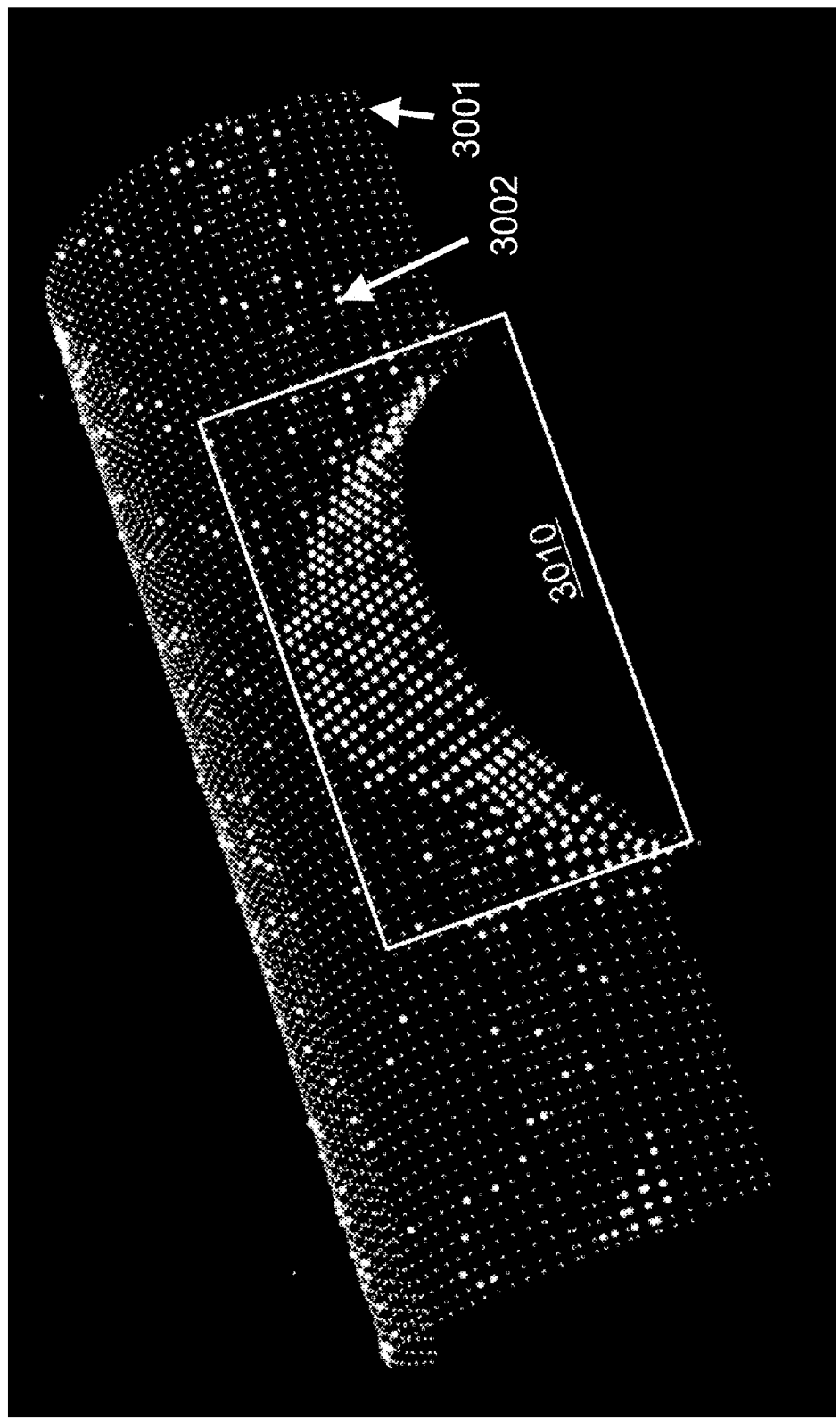
FIG. 30C shows an example of probes where rotational Bias is applied in accordance with some embodiments.

The effect of varying $R_{BIAS}$ on probe placement is illustrated in the examples shown in FIGS. 30A through 30C. FIG. 30A shows an example where no bias is applied, FIG. 30B shows an example where translational bias is applied, and FIG. 30C shows an example where rotational Bias is applied on placement of probes 3001 on points 3002. Compared to FIG. 30A, FIG. 30B includes more probes near the ends 3003 and areas 3004 which increases the model's resolving power in the direction parallel to the tube's central axis. Compared to FIG. 30A, FIG. 30C includes more probes at the top of the small intersecting tube 3010. These probe locations increase the model's ability to resolve in the rotational degree of freedom around the main tube's central axis.

In some embodiments, the TDC module 412 could solve the minimization with respect to $\widetilde{\alpha_k}$ using additional constraints. For example, the above-described technique does not prevent the transformed weights $\widetilde{\alpha_k}$ from turning negative, or prevent a large weight $\widetilde{\alpha_k}$ from being assigned to Gaussians that were estimated from small groups of interest points (e.g., whose original weights $\alpha_k$ in the interest point distribution $p_p(x,y,z,\theta_p,\theta_r,\theta_y)$ was small). The TDC module 412 can programmatically apply these and/or other constraints.

Also, in some embodiments, the TDC module 412 is configured to limit the amount an individual cluster may be over or under-represented in the final set of probes. This can be achieved by adding a set of constraints:

$$\alpha_k C_{lim} > \widetilde{\alpha_k} > \alpha_k / C_{lim}, \forall k$$

where $C_{lim}$ is a constant that provides the limiting factor.

Figure 31A:
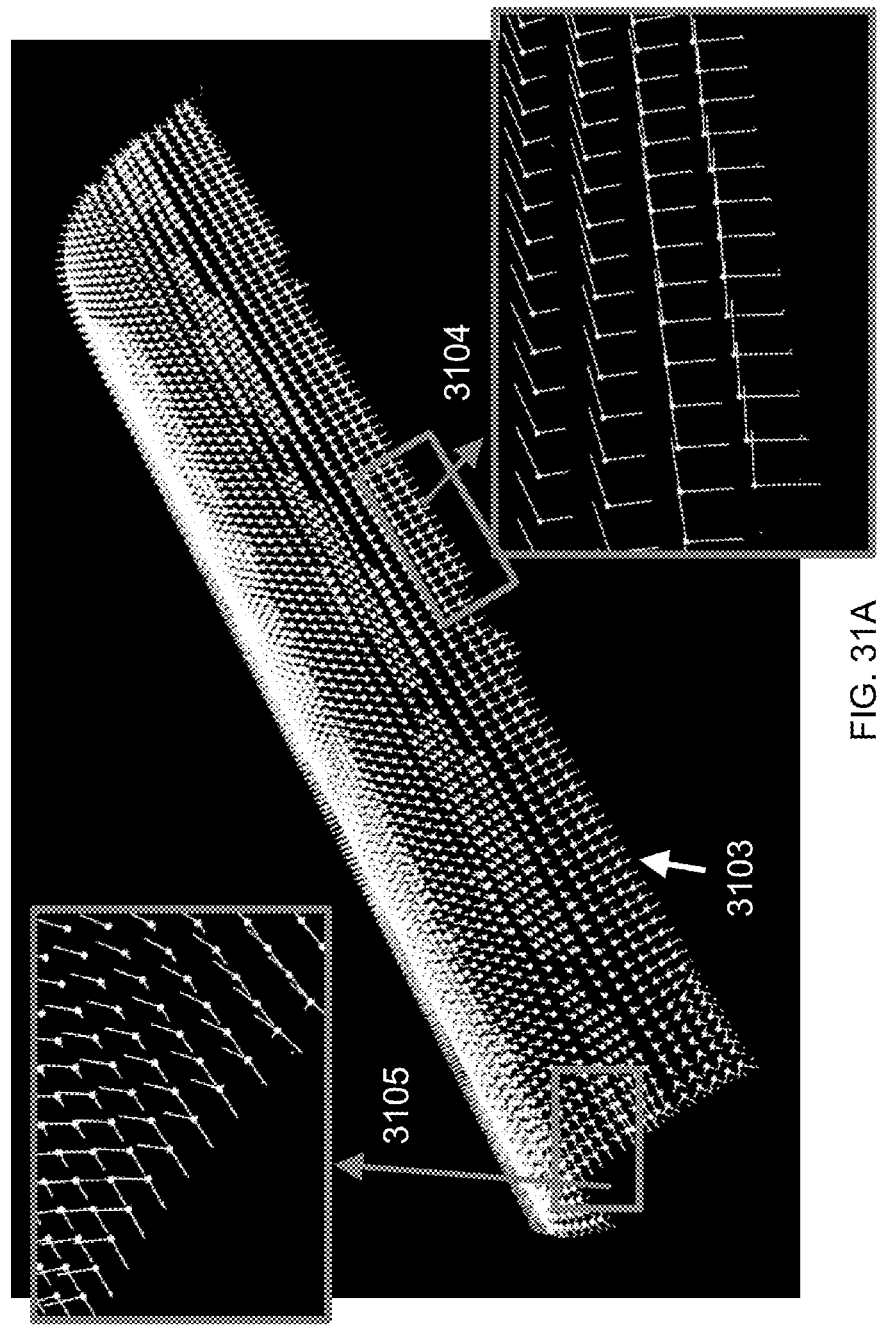
FIG. 31A illustrates an example of the points and their resolving powers.

Examples of the effects of varying the limiting factor are illustrated in FIGS. 31A through 31D. FIG. 31A illustrates an example of the points 3103 with resolving powers. The area of detail 3104 shows the increasing resolving rotational resolving power around tubes central axis as the points approach the visible horizon; these "horizon points" will be removed from consideration when selecting probe locations.

Figure 31B:
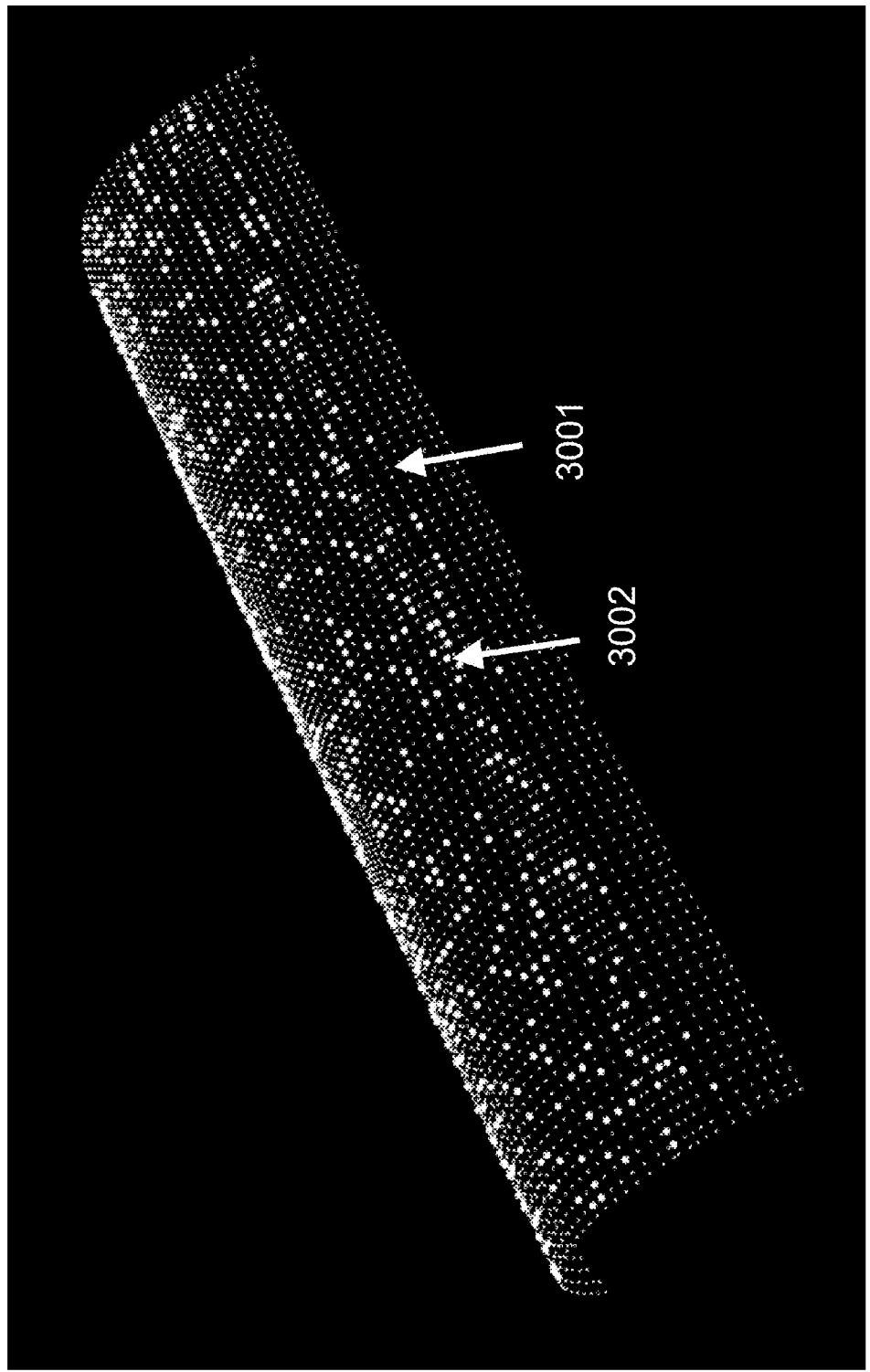
FIG. 31B shows an example of the result of probe selection with $C_{lim}=2$.
Figure 31C:
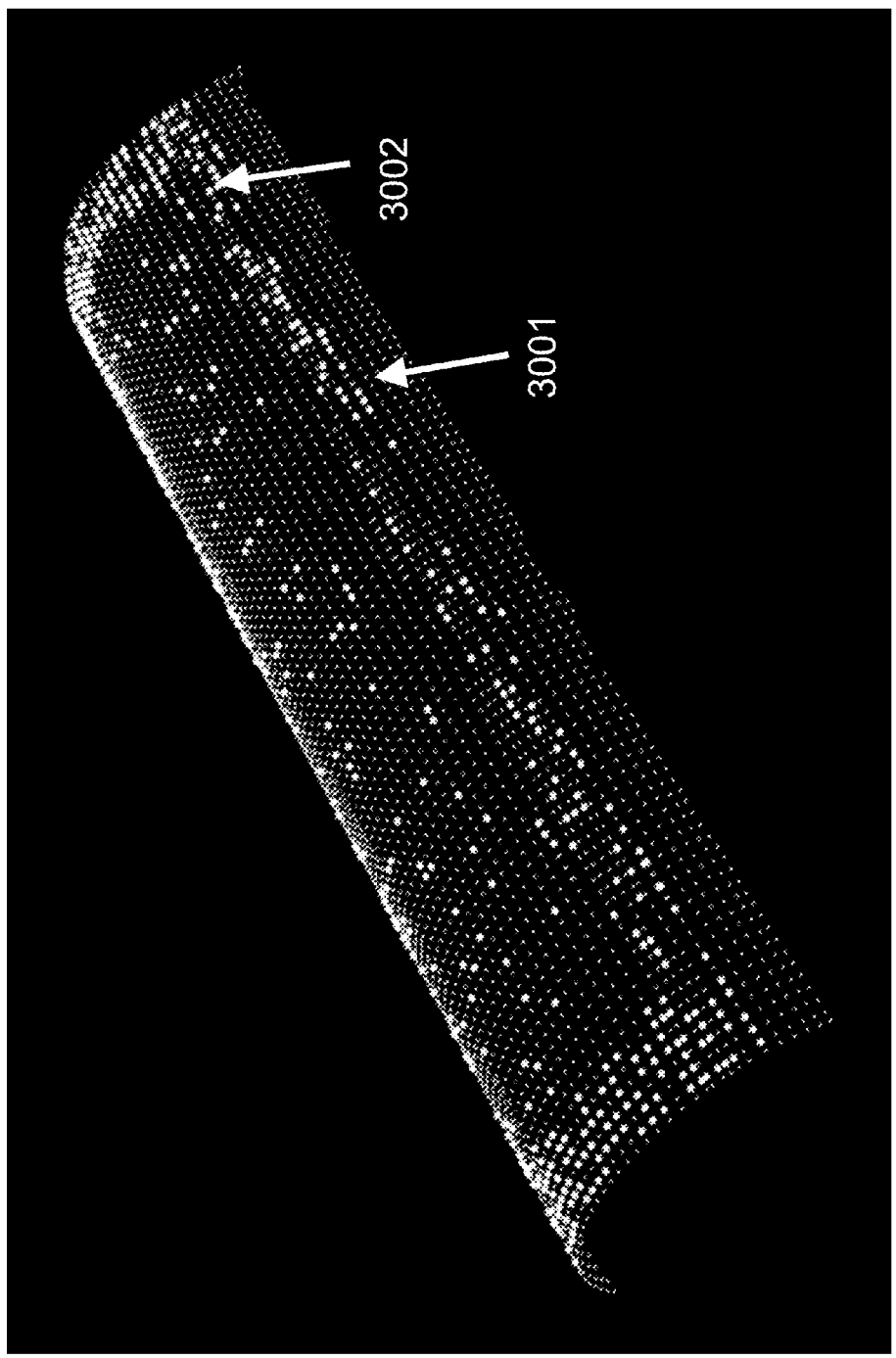
FIG. 31C shows an example of the result of probe selection with $C_{lim}=4$.
Figure 31D:
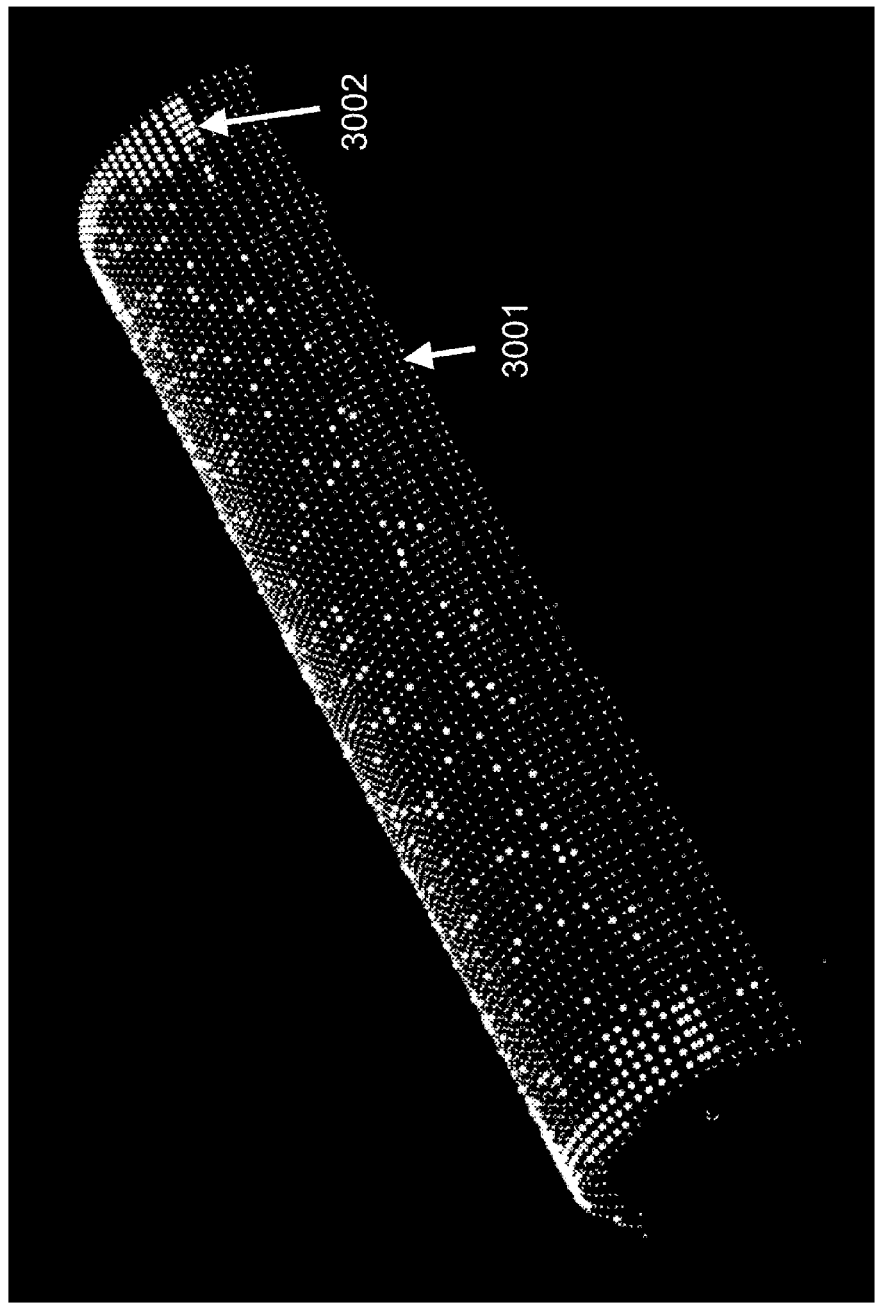
FIG. 31D shows an example of the result of probe selection with $C_{lim}=8$.

The second area of detail 3105 shows the increase in resolving power parallel the tubes central axis as the points of interest approach the ends of the tube. FIG. 31B shows an example of the result of probe selection with $C_{lim}=1.2$; this probe set is only slightly more balanced than a randomly chosen set of probes. FIG. 31C shows an example of the result of probe selection with $C_{lim}=4$; we can see the probe sites are more weighted towards the ends and the sides of the tube. FIG. 31D shows an example of the result of probe selection with $C_{lim}=10$ on probes 3101 and points 3102; here the large majority of the probe sites are at the ends of the tube. As can be seen in FIGS. 31A-31D, increasing the limiting factor causes the probe sites to be more concentrated towards the ends of the tube. Although increasing the limiting factor produces a set of probes that is more balanced, the robustness of the model can become increasing vulnerable to regions of occlusion (for example one of the tube ends might be obscured in at runtime.

In some embodiments, when the set of linear equations (e.g., formed by differentiation of the Lagrangian and equating to zero) produces a result with at least one weight $\alpha_k$ violating a constraint, the TDC module 412 can be configured to iterate over all possible combinations of boundary cases, calculate the optimal remaining weights, and select the constrained minimum.

For example, the TDC module 412 can determine all possible sets of boundary conditions (e.g., $\{\alpha_0^{low}\}$, $\{\alpha_0^{high}\}$, $\{\alpha_0^{low}, \alpha_1^{low}\}$, $\{\alpha_0^{high}, \alpha_1^{low}\}$, ...) for the linear equations. Each set of boundary conditions may include boundary conditions for a subset of transformed weights $\widetilde{\alpha_k}$. Subsequently, for each set of boundary conditions, the TDC module 412 can fix the value of a subset of weights $\widetilde{\alpha_k}$ to be the value of the corresponding boundary conditions, and solve the set of linear equations for the remaining free weights $\widetilde{\alpha_k}$ without boundary conditions. This way, the TDC module 412 can determine the global solution to the set of linear equations given the constraints by selecting, amongst the solutions under all possible sets of boundary conditions, the solution with the minimum score.

In some cases, when the number of Gaussian distributions in the GMM is greater than the number of dimensions in which the interest points lie, some of the parameters in the GMM may be linearly dependent. For example, mean vectors of Gaussian distributions may become linearly dependent when the number of Gaussian distributions is greater than the number of dimensions in which the interest points lie.

To address this issue, the TDC module 412 can be configured to regularize the parameters for the GMM, for example, using Tikhonov regularization. Should such an approach fail, the TDC module 412 can reformulate the optimization problem to minimize the following function $$L(\widetilde{\alpha_k}, \lambda_0, \lambda_1, \phi) = \left[\sum_k \frac{\widetilde{\alpha_k}}{\mu_k^{(\theta_{smallest})}}\right]^2 + \lambda_0\left[\sum_k \widetilde{\alpha_k}(\mu_k^{(x)} - \mu_k^{(y)})\right] + \lambda_1\left[\sum_k \widetilde{\alpha_k}(\mu_k^{(x)} - \mu_k^{(z)})\right] + \phi\left[\left(\sum_k \widetilde{\alpha_k}\right) - 1\right]$$

This new Lagrangian formulation seeks to maximize the resolving power in the rotational degree of freedom with the smallest fitted resolving power while constraining the solution to be perfectly balance in the translational degrees of freedom and the sum of the transformed weights to be 1.

In some embodiments, the TDC module 412 could directly find the weights that satisfy the Lagrangian relationship stated above. However, this relationship may not prevent the weights $\widetilde{\alpha_k}$ from turning negative, or prevent a large weight $\widetilde{\alpha_k}$ from being assigned to Gaussians that were estimated from small groups of interest points (e.g., whose original weights $\alpha_k$ in the interest point distribution $p_p(x,y,z,\theta_p,\theta_r,\theta_y)$ was small). The TDC module 412 can programmatically apply these constraints, as illustrated above. This is mathematically valid because the above Lagrangian relationship is quadratic in $\widetilde{\alpha_k}$, so if one of the weights $\widetilde{\alpha_k}$ is negative, then the optimal value should lie on one (or more) of the boundary conditions.

In summary, in some exemplary embodiments, in order to identify parameters for the target distribution $\widetilde{p}_p(x,y,z,\theta_p,\theta_r,\alpha_y)$ based on parameters of the interest point distribution $p_p(x,y,z,\theta_p,\theta_r,B_y)$ the TDC module 412 can use the following procedure:

1. Solve the linear system of equations formed by differentiating the Lagrangian and equating to zero:

$$L(\widetilde{\alpha_k}, \phi) = w_R\left[\sum_k \frac{\widetilde{\alpha_k}}{\mu_k^{(\theta_{smallest})}}\right]^2 + w_S\left[\sum_k \widetilde{\alpha_k}(\mu_k^{(x)} - \mu_k^{(y)})\right]^2 + w_S\left[\sum_k \widetilde{\alpha_k}(\mu_k^{(x)} - \mu_k^{(z)})\right]^2 + w_S\left[\sum_k \widetilde{\alpha_k}(\mu_k^{(y)} - \mu_k^{(z)})\right]^2 + \phi\left[\left(\sum_k \widetilde{\alpha_k}\right) - 1\right]$$

2. If this system is singular, the TDC module 412 can use regularization to solve this system. For example, if the TDC module 412 attempts to solve the matrix equation: $\overline{\overline{A}}\overline{A}=\overline{b}$ but $\overline{\overline{A}}$ is singular, then the TDC module 412 can instead solve $[\overline{\overline{A}}^T\overline{\overline{A}}-kI]\overline{A}=\overline{\overline{A}}^T\overline{b}$. This way, the TDC module 412 can minimize the sum of $L_2$-norm of the solution vector, which, in turn, can prevent solutions with large positive and negative $\alpha_k$'s (summing to unity).

3. If step 2 fails, solve the linear system of equations formed by differentiating the alternative Lagrangian an equating to zero:

$$L(\widetilde{\alpha_k}, \lambda_0, \lambda_1, \lambda_2, \phi) = \sum_k(\widetilde{\alpha_k} - \alpha_k)^2 + \lambda_0\sum_k\frac{\widetilde{\alpha_k}}{\mu_k^{(\theta_{smallest})}} + \lambda_1\sum_k\widetilde{\alpha_k}(\mu_k^{(x)} - \mu_k^{(y)}) + \lambda_2\sum_k\widetilde{\alpha_k}(\mu_k^{(x)} - \mu_k^{(z)}) + \phi\left[\left(\sum_k \widetilde{\alpha_k}\right) - 1\right]$$

4. Check the solution of step 2 or step 3 against the constraints:

$$\alpha_k C_{lim} > \widetilde{\alpha_k} > \alpha_k/C_{lim}, \forall k$$

5. If the solution falls outside the valid range of weights $\widetilde{\alpha_k}$, then for all possible sets of boundary conditions (e.g., constraints), use modified versions of steps 2 or 3 to find solution vectors for non-constrained $\widetilde{\alpha_k}$. Throughout the search, the TDC module 412 can keep track of the minimum values of, $$w_R\left[\sum_k \frac{\widetilde{\alpha_k}}{\mu_k^{(\theta_{smallest})}}\right]^2 + w_S\left[\sum_k \widetilde{\alpha_k}(\mu_k^{(x)} - \mu_k^{(y)})\right]^2 +$$

$$w_S \left[\sum_k \widetilde{\alpha_k}(\mu_k^{(x)} - \mu_k^{(z)})\right]^2 + w_S \left[\sum_k \widetilde{\alpha_k}(\mu_k^{(y)} - \mu_k^{(z)})\right]^2$$

$$\text{and } \left[\sum_{k=1,\ldots,N}(\widetilde{\alpha_k} - \alpha_k)\right]^2.$$

If the former relationship is greater than zero, then the TDC module 412 can use the former relationship to select the solution vector for $\widetilde{\alpha_k}$. If the former relationship is not greater than zero, the TDC module 412 can use the latter relationship to select the solution vector for $\widetilde{\alpha_k}$.

Sampling of Probes from Target Distribution

Once the TDC module 412 determines the transformed interest point distribution $\widetilde{p_p}(x,y,z,\theta_p,\theta_r,\theta_y)$, the TDC module 412 can provide the transformed interest point distribution $\widetilde{p_p}(x,y,z,\theta_p,\theta_r,\theta_y)$ (or an inverse of the transformed interest point distribution) to the PDM module 416. Subsequently, the PDM module 416 can sample from the inverse of the transformed interest point distribution $\widetilde{p_p}(x,y,z,\theta_p,\theta_r,\theta_y)$ to determine the location of probes on one or more interest points in an image.

The TDC module 412 can be configured to choose the transformed interest point distribution $\widetilde{p_p}(x,y,z,\theta_p,\theta_r,\theta_y)$ such that the expected value of x, y and z with respect to the transformed interest point distribution $\widetilde{p_p}(x,y,z,\theta_p,\theta_r,\theta_y)$ are as similar as possible:

$$\int_{s \in S_{probes}} x \widetilde{p_p}\left(x,y,z,\theta_p,\theta_r,\theta_y \mid \left\{\widetilde{\alpha_k},\overline{\mu}_k,\sum_k\right\}, k=1 \ldots N\right) \cong$$

$$\int_{s \in S_{probes}} y \widetilde{p_p}\left(x,y,z,\theta_p,\theta_r,\theta_y \mid \left\{\widetilde{\alpha_k},\overline{\mu}_k,\sum_k\right\}, k=1 \ldots N\right) \cong$$

$$\int_{s \in S_{probes}} z \widetilde{p_p}\left(x,y,z,\theta_p,\theta_r,\theta_y \mid \left\{\widetilde{\alpha_k},\overline{\mu}_k,\sum_k\right\}, k=1 \ldots N\right)$$

Importance sampling can be used to allow the PDM module 416 to draw samples from a target distribution by weighting samples drawn from another different distribution with the condition that the samples have similar support. In other words:

$$\overline{x} \cong \sum_{s \in S_{probes}} x_s \widetilde{p_p}\left(x_s,y_s,z_s,\theta_{p_s},\theta_{r_s},\theta_{y_s} \mid \left\{\widetilde{\alpha_k},\overline{\mu}_k,\sum_k\right\}, k=1 \ldots N\right) \cong$$

$$\sum_{s \in S_{i,p}} x_s \frac{\widetilde{p_p}\left(x_s,y_s,z_s,\theta_{p_s},\theta_{r_s},\theta_{y_s} \mid \left\{\widetilde{\alpha_k},\overline{\mu}_k,\sum_k\right\}, k=1 \ldots N\right)}{p_p\left(x_s,y_s,z_s,\theta_{p_s},\theta_{r_s},\theta_{y_s} \mid \left\{\widetilde{\alpha_k},\overline{\mu}_k,\sum_k\right\}, k=1 \ldots N\right)} \times$$

$$p_p\left(x_s,y_s,z_s,\theta_{p_s},\theta_{r_s},\theta_{y_s} \mid \left\{\widetilde{\alpha_k},\overline{\mu}_k,\sum_k\right\}, k=1 \ldots N\right)$$

where $S_{probes}$ is the set of probes and $S_{IP}$ is a set of interest points. Therefore, the PDM module 416 can use this relationship to weigh samples drawn from the interest point distribution $p_p(s \mid \{\alpha_k,\overline{\mu}_k,\Sigma_k\}, k=1 \ldots N)$ by:

$$\frac{\widetilde{p_p}\left(x,y,z,\theta_p,\theta_r,\theta_y \mid \left\{\widetilde{\alpha_k},\overline{\mu}_k,\sum_k\right\}, k=1 \ldots N\right)}{p_p\left(x,y,z,\theta_p,\theta_r,\theta_y \mid \left\{\alpha_k,\overline{\mu}_k,\sum_k\right\}, k=1 \ldots N\right)}$$

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and apparatus for carrying out the several purposes of the disclosed subject matter. It is important, therefore, that the claims be regarded as including such equivalent constructions insofar as they do not depart from the spirit and scope of the disclosed subject matter. For example, some of the disclosed embodiments relate one or more variables. This relationship may be expressed using a mathematical equation. However, one of ordinary skill in the art may also express the same relationship between the one or more variables using a different mathematical equation by transforming the disclosed mathematical equation. It is important that the claims be regarded as including such equivalent relationships between the one or more variables.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A system for choosing placement of three-dimensional (3D) probes used for evaluating a 3D alignment pose of a runtime 3D image inside a 3D alignment system for estimating the pose of a trained 3D model image in that 3D runtime image, comprising:
   a processor in communication with a memory, wherein the processor is configured to run a computer program stored in the memory that is configured to:
   generate a plurality of features associated with a first plurality of points of interest from a 3D image, wherein each feature comprises data indicative of 3D properties of an associated point from the plurality of points of interest;
   determine a target distribution of placements of a plurality of 3D probes based on the plurality of features associated with the first plurality of points of interest;
   select a second plurality of points of interest from among the first plurality of points of interest, based at least in part on the target distribution; and
   determine placements of the plurality of 3D probes based at least in part on the second plurality of points of interest.

2. The system of claim 1, wherein each of the plurality of features incorporates at least one measure of usefulness of an associated point from among the first plurality of points for alignment in at least one translational degree of freedom.

3. The system of claim 1, wherein each of the plurality of features incorporates at least one measure of usefulness of an associated point from among the first plurality of points for alignment in at least one rotational degree of freedom.

4. The system of claim 1, wherein the placement of the plurality of 3D probes provides an increase in ensemble alignment ability in at least one less represented translational degree of freedom provided by a placement on each of the first plurality of points of interest.

5. The system of claim 1, wherein the placement of the plurality of 3D probes provides an increase in ensemble alignment ability in at least one less represented translational degree of freedom and in a less represented rotational degree of freedom provided by a placement on each of the first plurality of points of interest.

6. The system of claim 1, wherein the placement of the plurality of 3D probes provides an increase in ensemble alignment ability in at least one less represented rotational degree of freedom provided by placement on each of the first plurality of points of interest.

7. The system of claim 1, wherein the processor is further configured to:
 determine a center of rotation that minimizes a sum of rotational moments of the plurality of features; and
 determine a first, second, and third axis of rotation that minimizes the sum of rotational moments of the plurality of features.

8. The system of claim 1, wherein a center of rotation and rotational axes that fit a subset of the first plurality of points are determined such that the center of rotation and rotational axes are associated with rotationally symmetric features of a pattern.

9. The system of claim 8, where finding the center of rotation and rotational axes from a subset of the first plurality of points comprises using a RANSAC technique.

10. The system of claim 8, where finding the center of rotation and rotational axes from a subset of the first plurality of points comprises using a Monte Carlo technique.

11. The system of claim 1, wherein the plurality of features includes a plurality of surface normal vectors.

12. The system of claim 1, wherein the plurality of features includes a plurality of edge proximity vectors.

13. The system of claim 1, wherein the plurality of features includes a plurality of edge direction vectors.

14. The system of claim 1, wherein the plurality of features includes a plurality of surface curvature vectors.

15. The system of claim 1, wherein selecting the second plurality of points of interest from among the first plurality of points of interest based at least in part on the target distribution comprises fitting a probability distribution to the first plurality of points and determining the target distribution, wherein the target distribution is indicative of a desired placement of the plurality of 3D probes on one or more of the first plurality of points of interest; and
 wherein determining the placements of the plurality of 3D probes based at least in part on the second plurality of points of interest comprises determining placements of the plurality of 3D probes at least in part by utilizing relative probabilities of the fitted probability distribution and the target distribution.

16. The system of claim 15, wherein fitting the probability distribution to the first plurality of points comprises fitting the first plurality of interest points to the probability distribution comprising a mixture model, wherein the probability distribution is indicative of at least a distribution of orientations measured at the first plurality of interest points.

17. The system of claim 16, wherein the processor is further configured to determine a number of components of the mixture model of the probability distribution by clustering the first plurality of interest points into at least one cluster.

18. The system of claim 1, wherein the processor is further configured to:
 identify one or more horizon points from the first plurality of interest points; and
 remove from consideration the one or more horizon points such that the second plurality of interest points does not comprise the one or more horizon points.

19. The system of claim 1, wherein selecting the second plurality of points of interest comprises using a Monte Carlo technique.

20. A method for choosing placement of three-dimensional (3D) probes used for evaluating a 3D alignment pose of a runtime 3D image inside a 3D alignment system for estimating the pose of a trained 3D model image in that 3D runtime image, the method comprising:
 generating a plurality of features associated with a first plurality of points of interest from a 3D image, wherein each feature comprises data indicative of 3D properties of an associated point from the plurality of points of interest;
 determining a target distribution of placements of a plurality of 3D probes based on the plurality of features associated with the first plurality of points of interest;
 selecting a second plurality of points of interest from among the first plurality of points of interest, based at least in part on the target distribution; and
 determining placements of the plurality of 3D probes based at least in part on the second plurality of points of interest.

21. The method of claim 20, wherein each of the plurality of features incorporates at least one measure of usefulness of an associated point from among the first plurality of points for alignment in at least one translational degree of freedom.

22. The method of claim 20, wherein each of the plurality of features incorporates at least one measure of usefulness of an associated point from among the first plurality of points for alignment in at least one rotational degree of freedom.

23. The method of claim 20, wherein the placement of the plurality of 3D probes provides an increase in ensemble alignment ability in at least one less represented translational degree of freedom provided by a placement on each of the first plurality of points of interest.

24. The method of claim 20, wherein the placement of the plurality of 3D probes provides an increase in ensemble alignment ability in at least one less represented translational degree of freedom and in a less represented rotational degree of freedom provided by a placement on each of the first plurality of points of interest.

25. The method of claim 20, wherein the placement of the plurality of 3D probes provides an increase in ensemble alignment ability in at least one of the less represented rotational degrees of freedom provided by placement on each of the first plurality of points of interest.

26. The method of claim 20, wherein a center of rotation is determined such that the sum of rotational moments of the plurality of features is minimized; and first, second, and third axes of rotation are determined such that the sum of rotational moments of the plurality of features is minimized.

27. The method of claim 20, wherein a center of rotation and rotational axes that fit a subset of the first plurality of points are determined such that the center of rotation and rotational axes are associated with rotationally symmetric features of a pattern.

28. The method of claim 20, where finding the center of rotation and rotational axes from a subset of the first plurality of points comprises using a RANSAC technique.

29. The method of claim 20, where finding a center of rotation and rotational axes from a subset of the first plurality of points comprises using a Monte Carlo technique.

30. The method of claim 20, wherein the plurality of features includes a plurality of surface normal vectors.

31. The method of claim 20, wherein the plurality of features includes a plurality of edge proximity vectors.

32. The method of claim 20, wherein the plurality of features includes a plurality of edge direction vectors.

33. The system of claim 20, wherein the plurality of features includes a plurality of surface curvature vectors.

34. The method of claim 20, wherein selecting the second plurality of points of interest from among the first plurality of points of interest based at least in part on the target distribution comprises fitting a probability distribution to the first plurality of points and determining the target distribution, wherein the target distribution is indicative of a desired placement of the plurality of 3D probes on one or more of the first plurality of points of interest; and wherein determining the placements of the plurality of 3D probes based at least in part on the second plurality of points of interest comprises determining placements of the plurality of 3D probes at least in part by utilizing relative probabilities of the fitted probability distribution and the target distribution.

35. The method of claim 34, wherein fitting the probability distribution to the first plurality of points comprises fitting the first plurality of interest points to the probability distribution comprising a mixture model, wherein the probability distribution is indicative of at least a distribution of orientations measured at the first plurality of interest points.

36. The method of claim 35, further comprising determining a number of components of the mixture model of the probability distribution by clustering the first plurality of interest points into at least one cluster.

37. The method of claim 34, further comprising:
identifying one or more horizon points from the first plurality of interest points; and
removing from consideration the one or more horizon points such that the second plurality of interest points does not comprise the one or more horizon points.

38. The method of claim 34, wherein selecting the second plurality of points of interest comprises using a Monte Carlo technique.

39. A non-transitory computer readable medium having executable instructions associated with a system for choosing placement of three-dimensional (3D) probes used for evaluating a 3D alignment pose of a runtime 3D image inside a 3D alignment system for estimating the pose of a trained 3D model image in that 3D runtime image, operable to cause the system to:
generate a plurality of features associated with a first plurality of points of interest from a 3D image, wherein each feature comprises data indicative of 3D properties of an associated point from the plurality of points of interest;
determine a target distribution of placements of a plurality of 3D probes based on the plurality of features associated with the first plurality of points of interest;
select a second plurality of points of interest from among the first plurality of points of interest, based at least in part on the target distribution; and
determine placements of the plurality of 3D probes based at least in part on the second plurality of points of interest.

* * * * *